(12) United States Patent
Zahdeh et al.

(10) Patent No.: US 12,398,029 B2
(45) Date of Patent: Aug. 26, 2025

(54) AUTONOMOUS TRANSPORT VEHICLE

(71) Applicant: Symbotic LLC, Wilmington, MA (US)

(72) Inventors: Akram Zahdeh, Wilmington, MA (US); Todd Kepple, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 246 days.

(21) Appl. No.: 17/664,944

(22) Filed: May 25, 2022

(65) Prior Publication Data

US 2023/0069056 A1  Mar. 2, 2023

Related U.S. Application Data

(60) Provisional application No. 63/236,591, filed on Aug. 24, 2021.

(51) Int. Cl.
*B66F 9/06* (2006.01)
*B66F 9/18* (2006.01)

(52) U.S. Cl.
CPC ............... *B66F 9/063* (2013.01); *B66F 9/18* (2013.01)

(58) Field of Classification Search
CPC .... B66F 9/063; B66F 9/18; B66F 9/10; B66F 9/143; B65G 1/0492
See application file for complete search history.

(56) References Cited

U.S. PATENT DOCUMENTS

| 2009/0074545 A1* | 3/2009 | Lert, Jr. ............... B65G 1/1378 |
| | | 414/267 |
| 2010/0316468 A1 | 12/2010 | Lert et al. |
| 2014/0277692 A1* | 9/2014 | Buzan ................. B65G 1/0492 |
| | | 700/218 |
| 2019/0202635 A1 | 7/2019 | Conrad et al. |
| 2019/0283239 A1 | 9/2019 | Skaaksrud et al. |
| 2019/0359436 A1 | 11/2019 | Cyrulik et al. |

* cited by examiner

*Primary Examiner* — Navid Z. Mehdizadeh
*Assistant Examiner* — Caitlin R McCleary
(74) *Attorney, Agent, or Firm* — Perman & Green, LLP

(57) ABSTRACT

An autonomous transport vehicle includes a frame forming a transport payload area of the vehicle. The payload area includes a payload contact support surface that defines a payload support plane that supports the payload. The payload area further includes an articulated underpick end effector that engages and underpicks the payload with respect to the support plane, and extends and retracts with respect to the payload area effecting payload transfer. Payload registration facets are mounted to the frame to engage the payload. The registration facets are disposed to provide, upon engagement with the payload, at least two degrees of registration capturing and securing the payload in a predetermined position in the payload area, and are configured to effect payload engagement with the at least two degrees of registration registering the payload substantially coincident with seating of the payload on the payload support plane of the payload area.

20 Claims, 57 Drawing Sheets

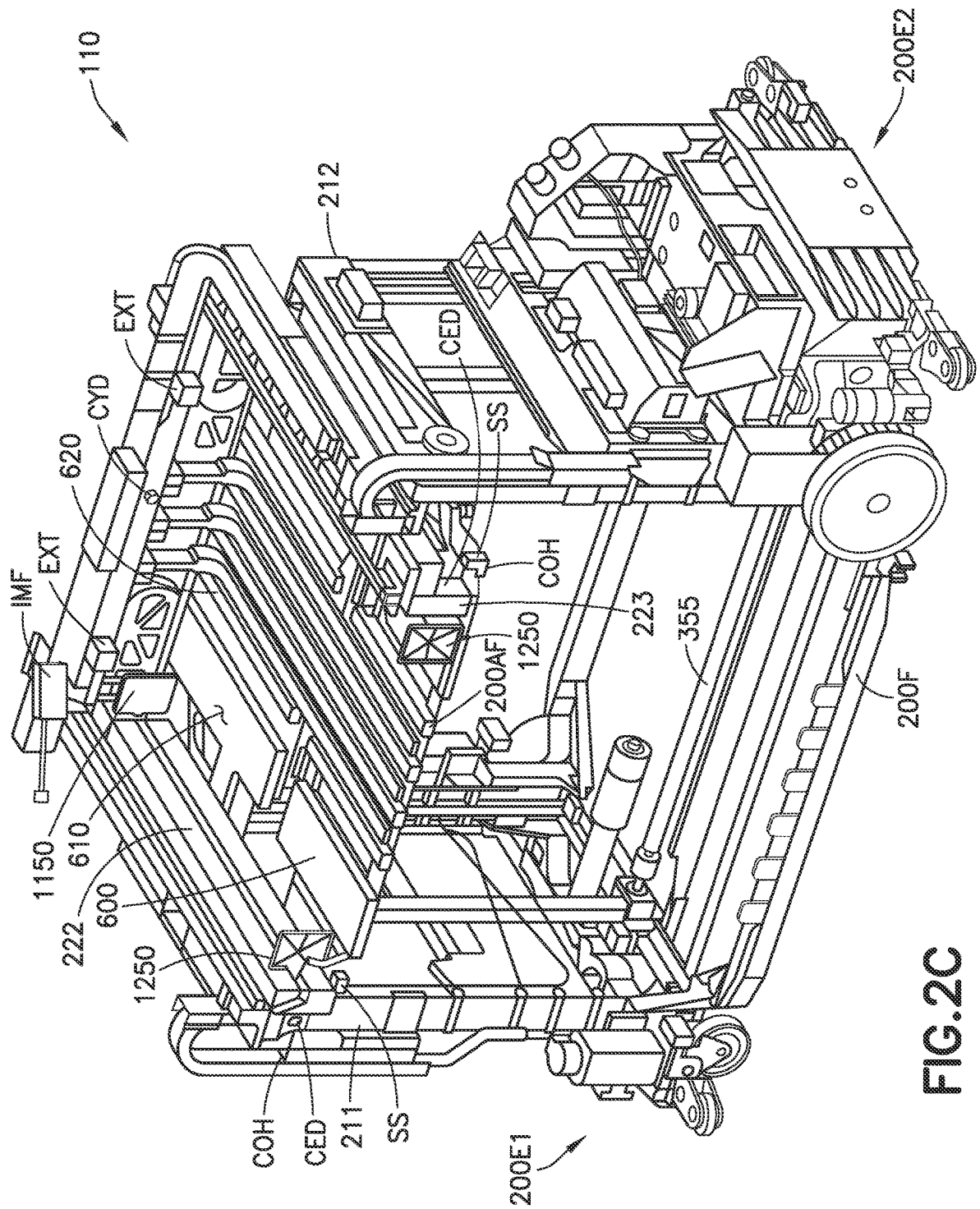

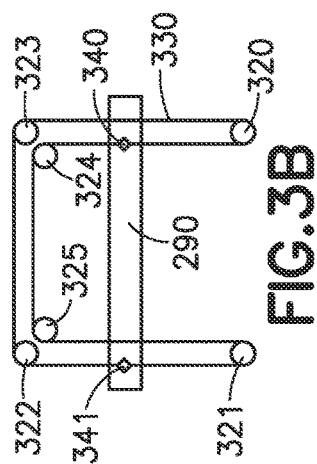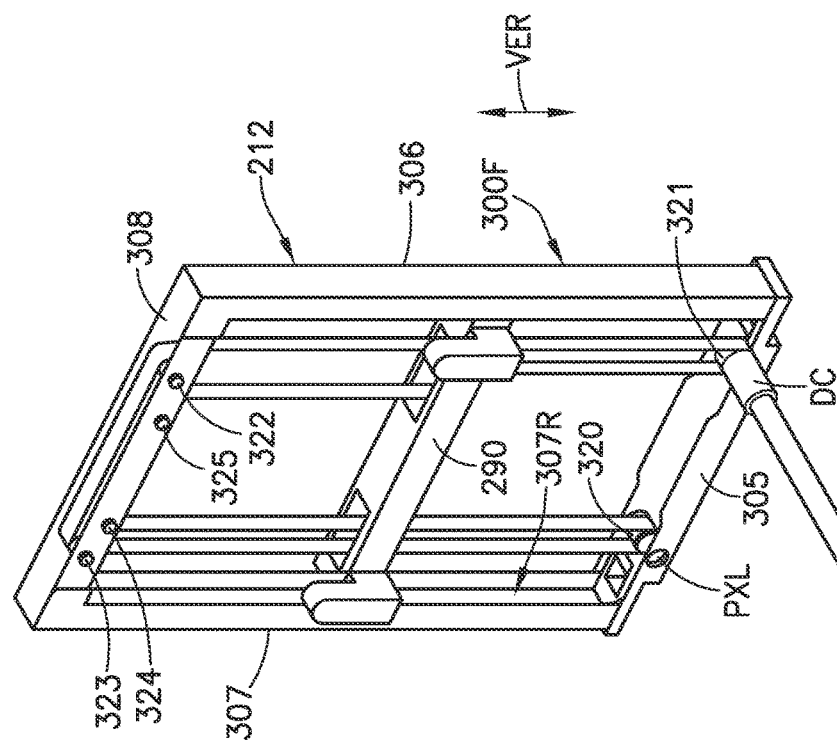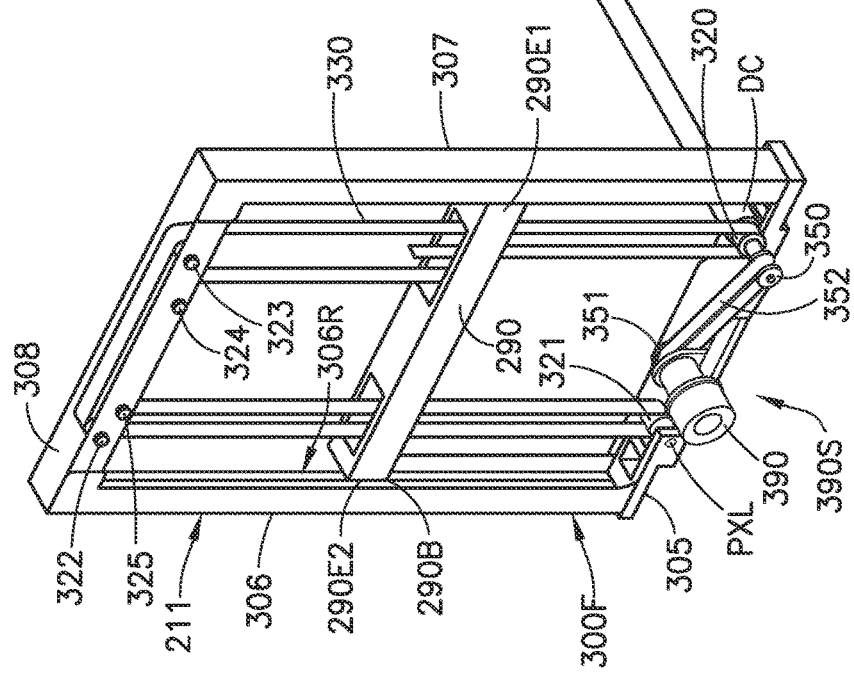

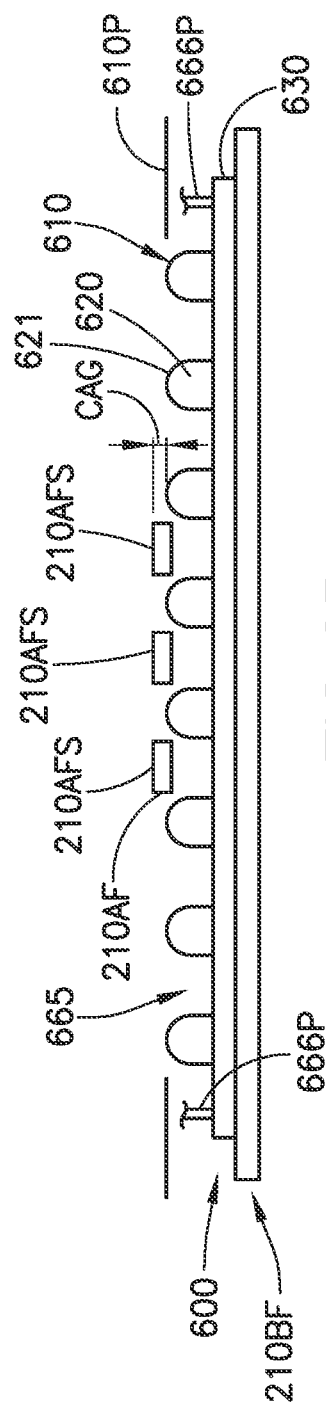
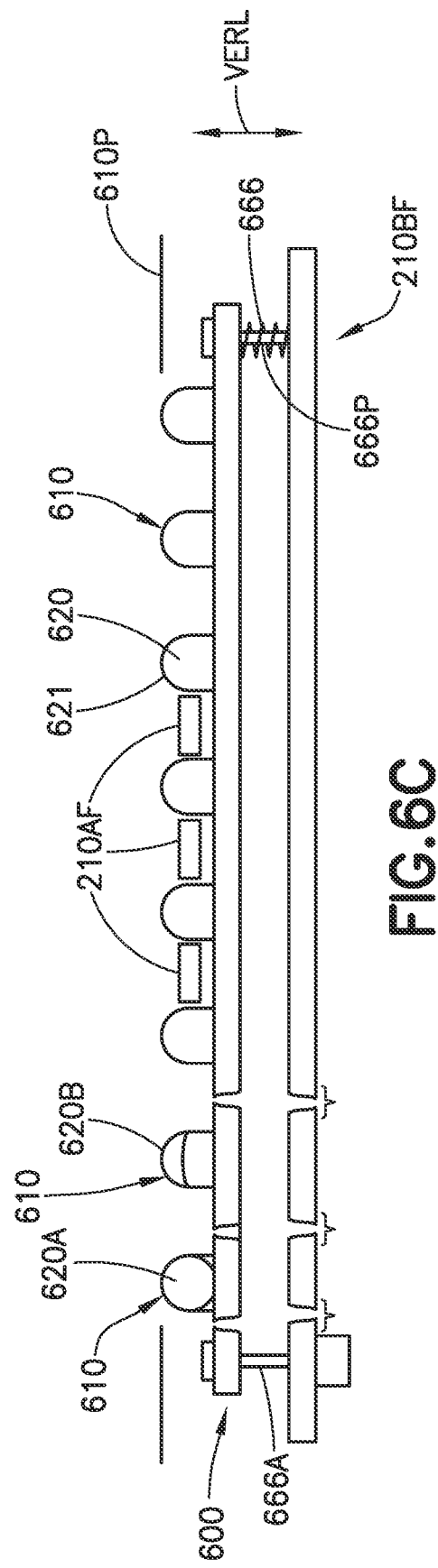

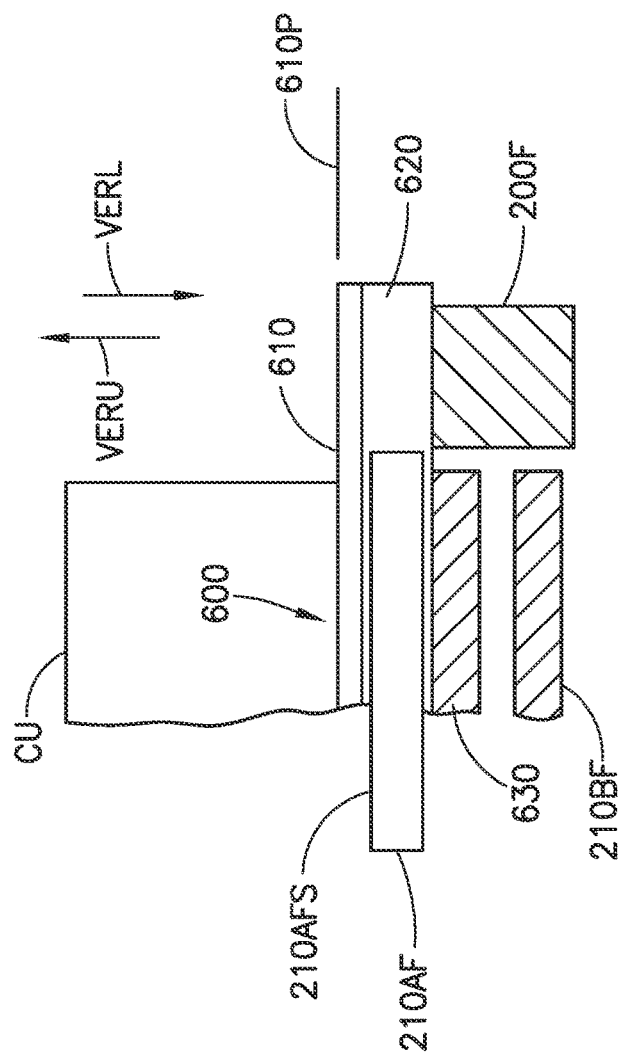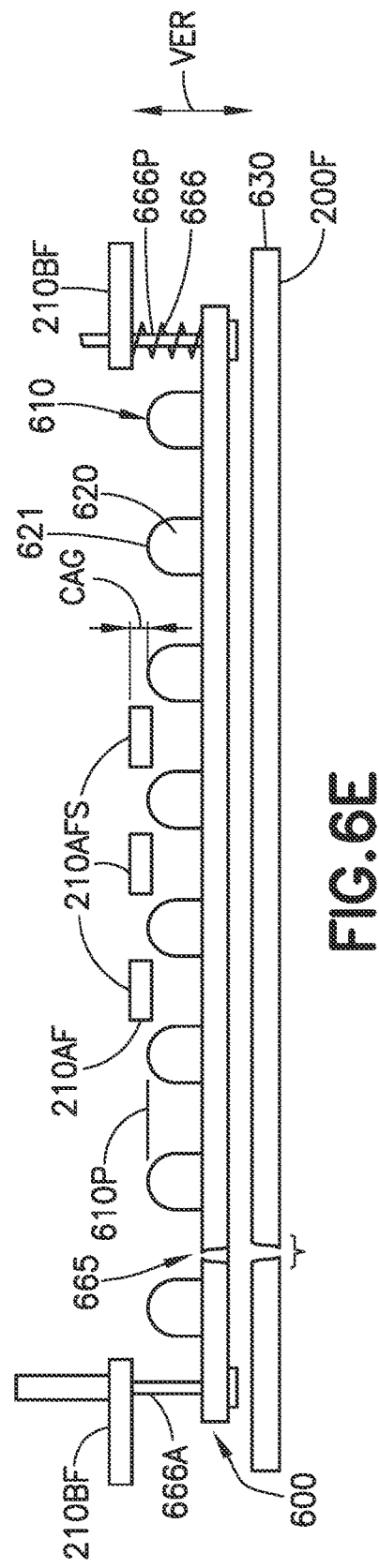

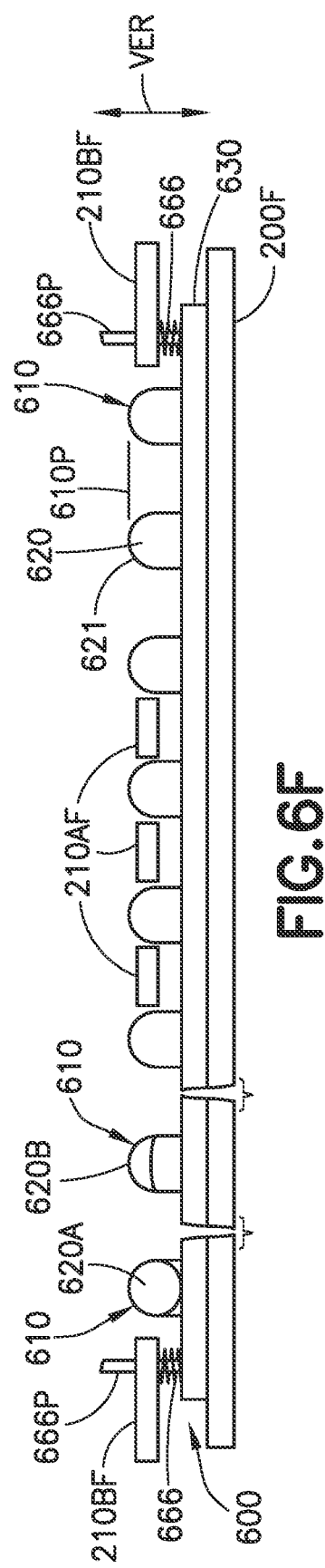
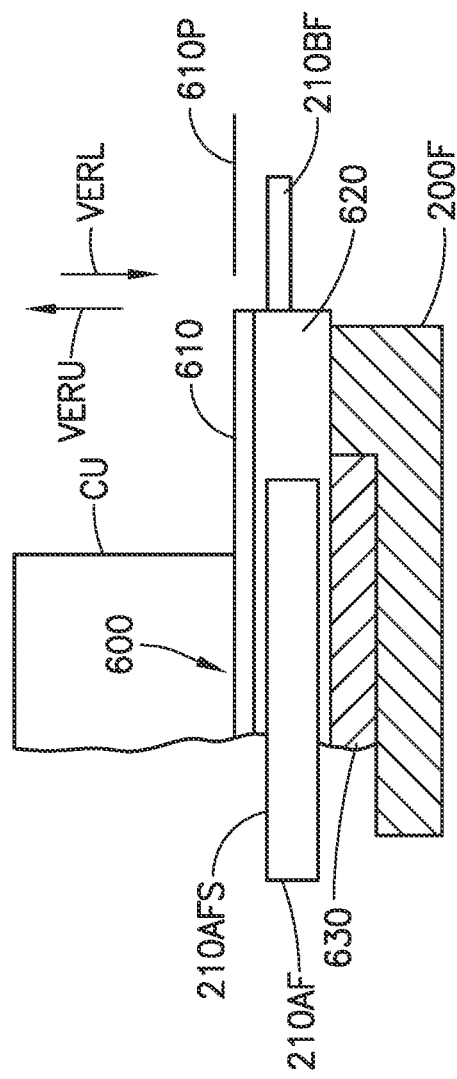

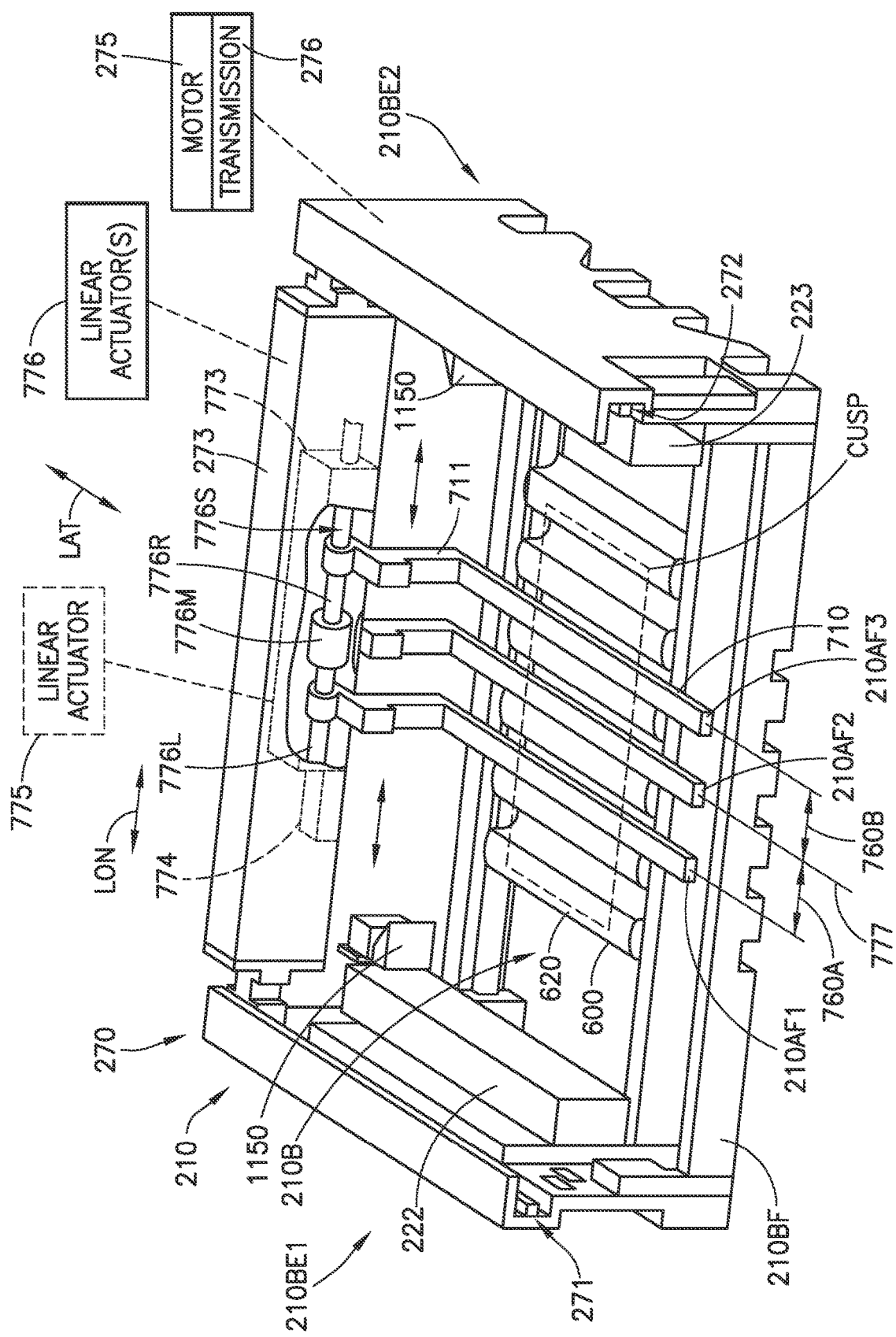

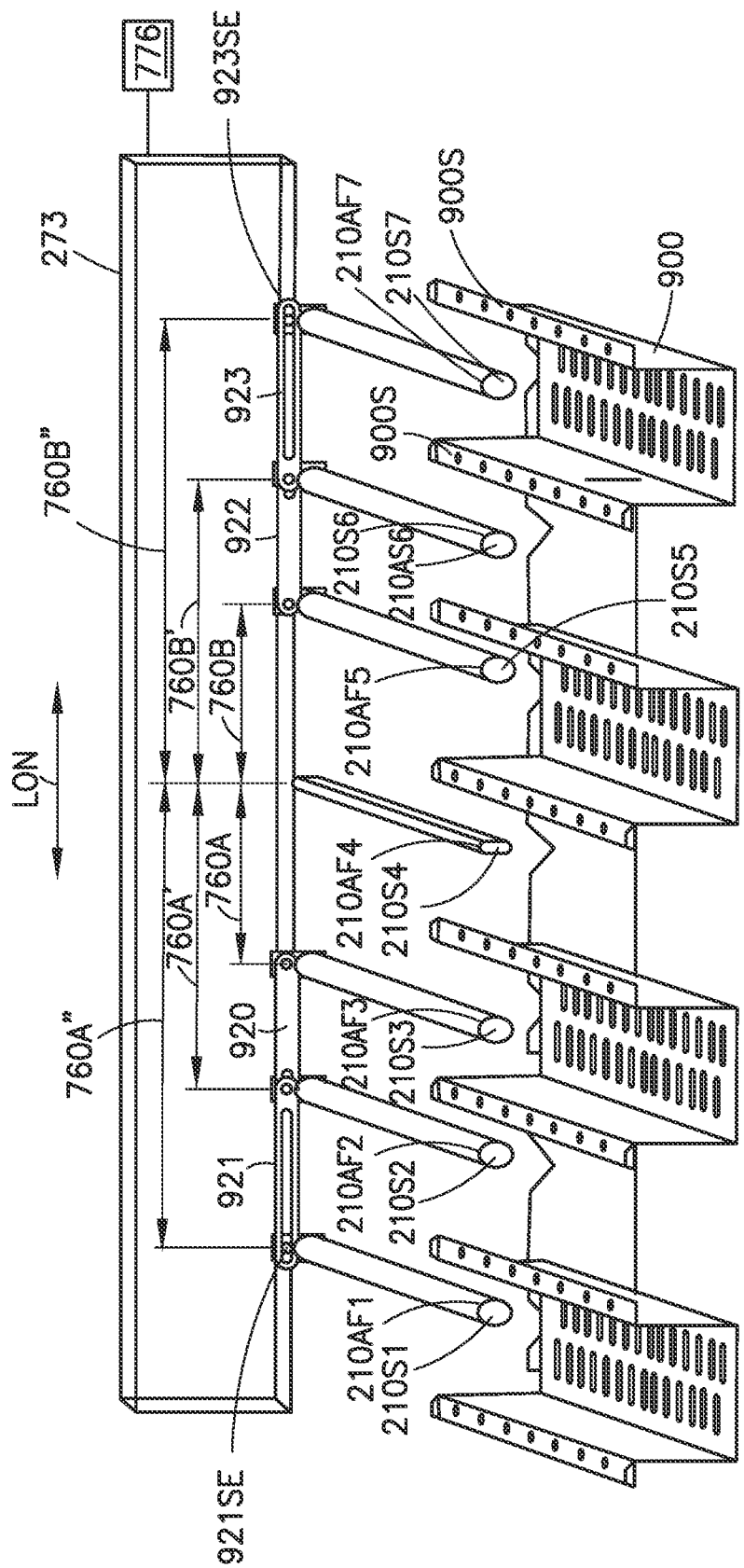

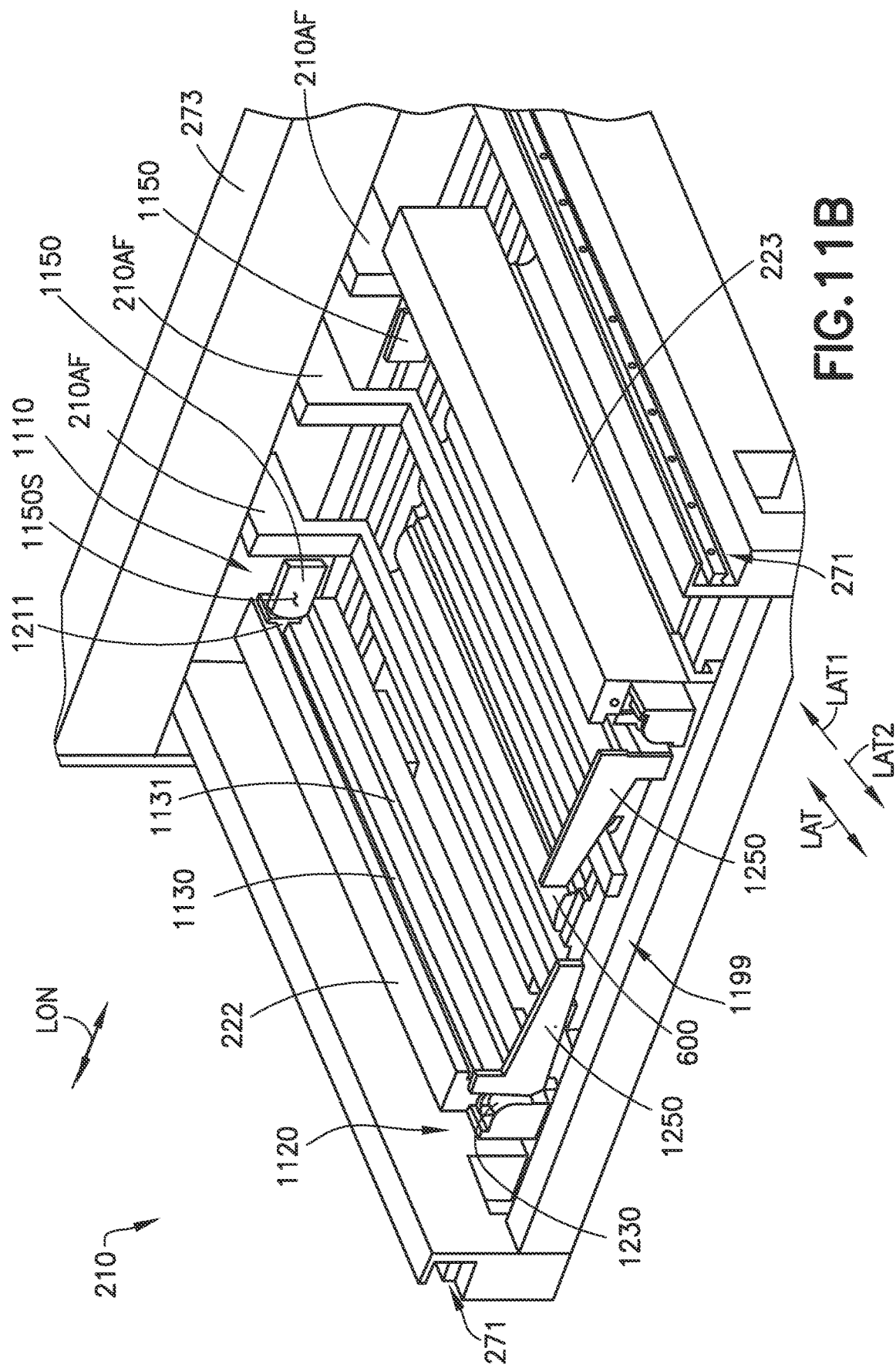

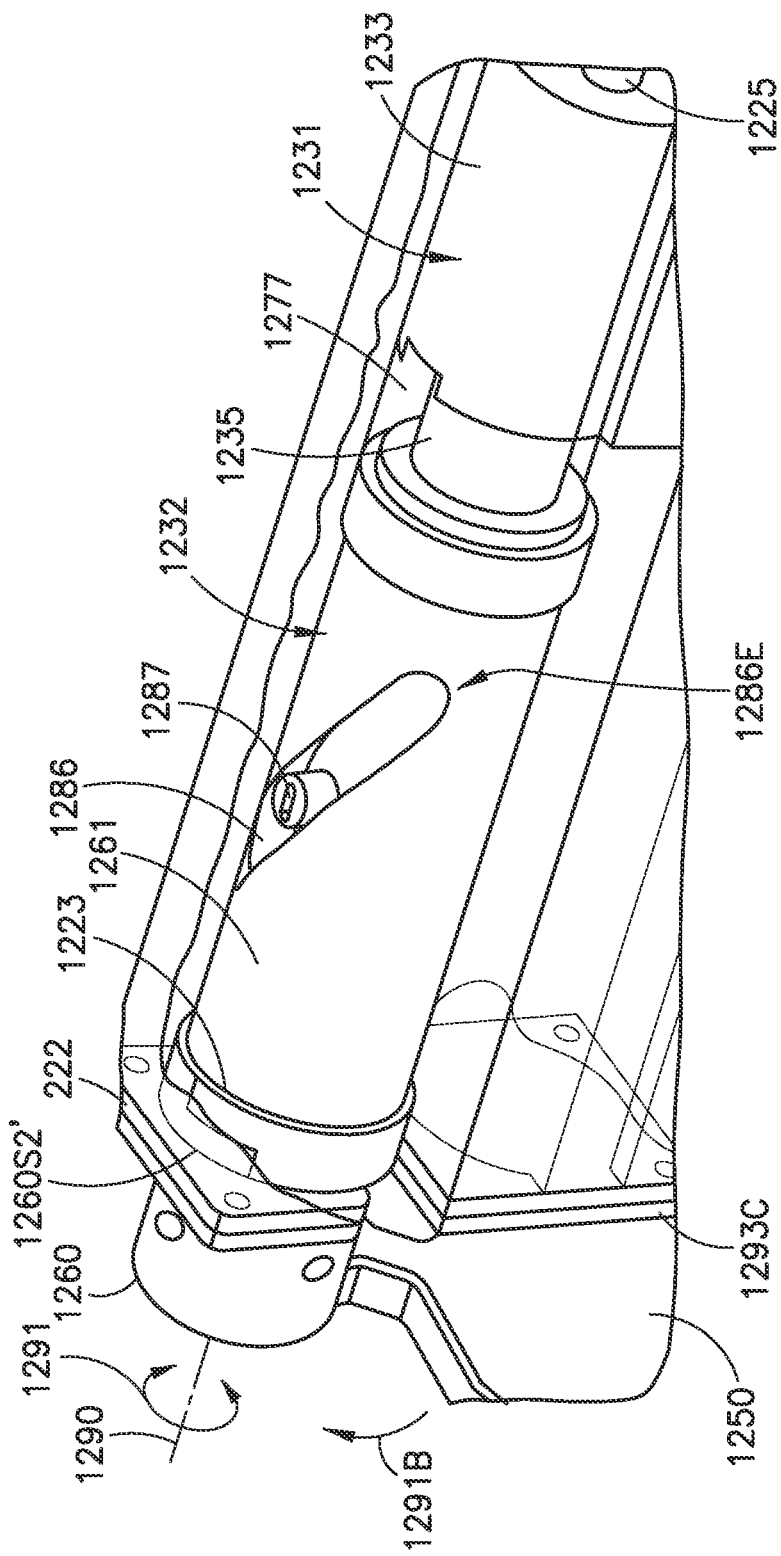

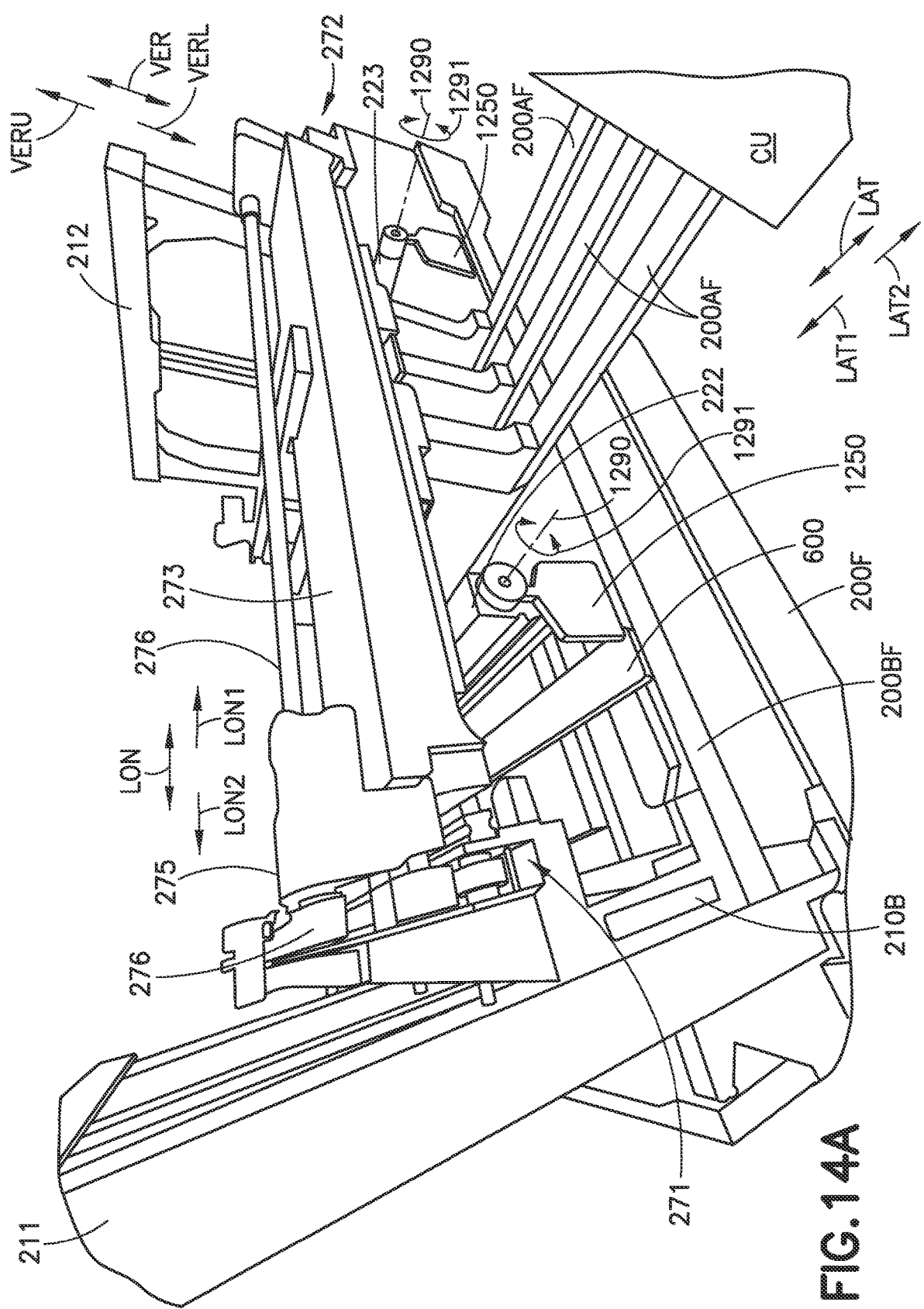

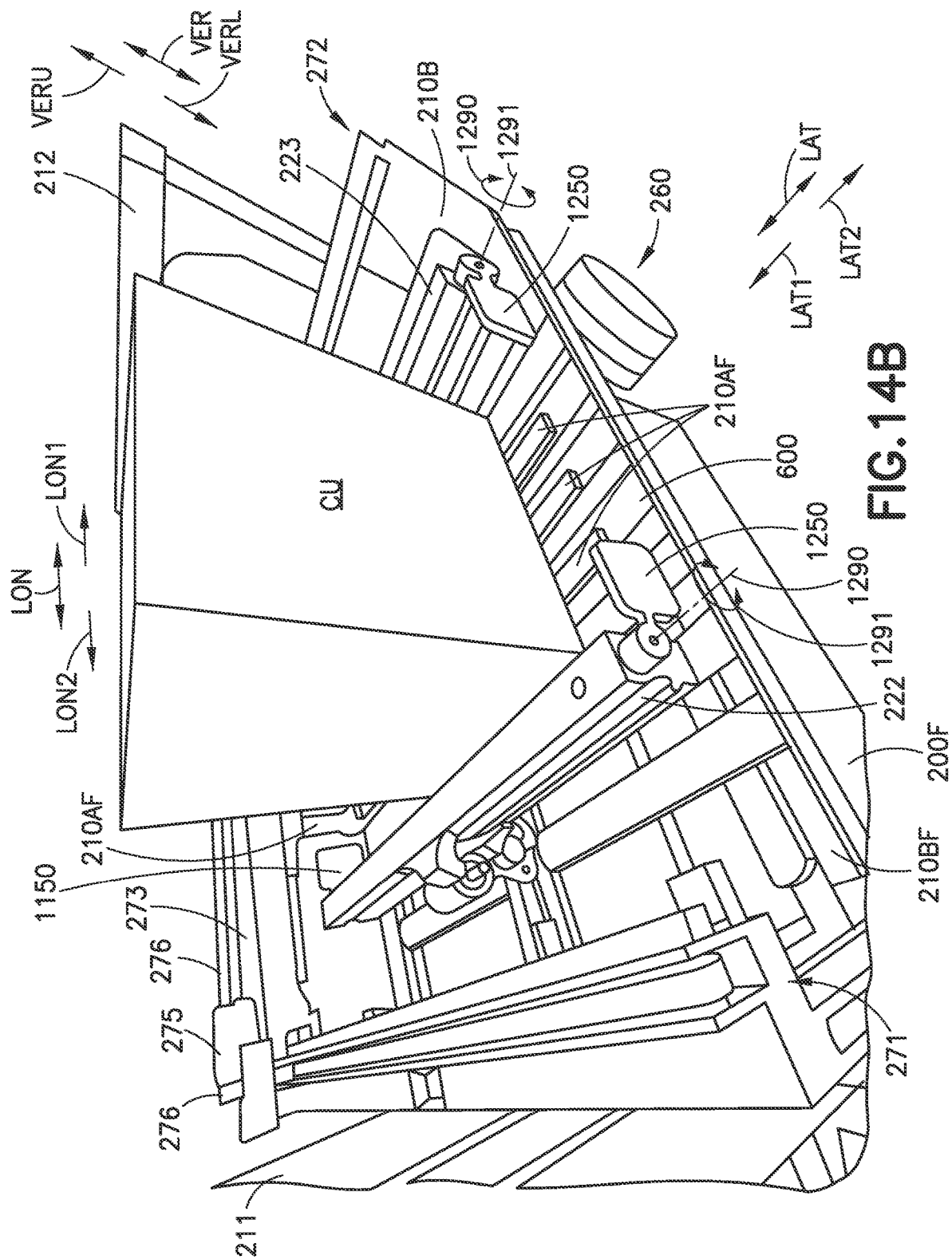

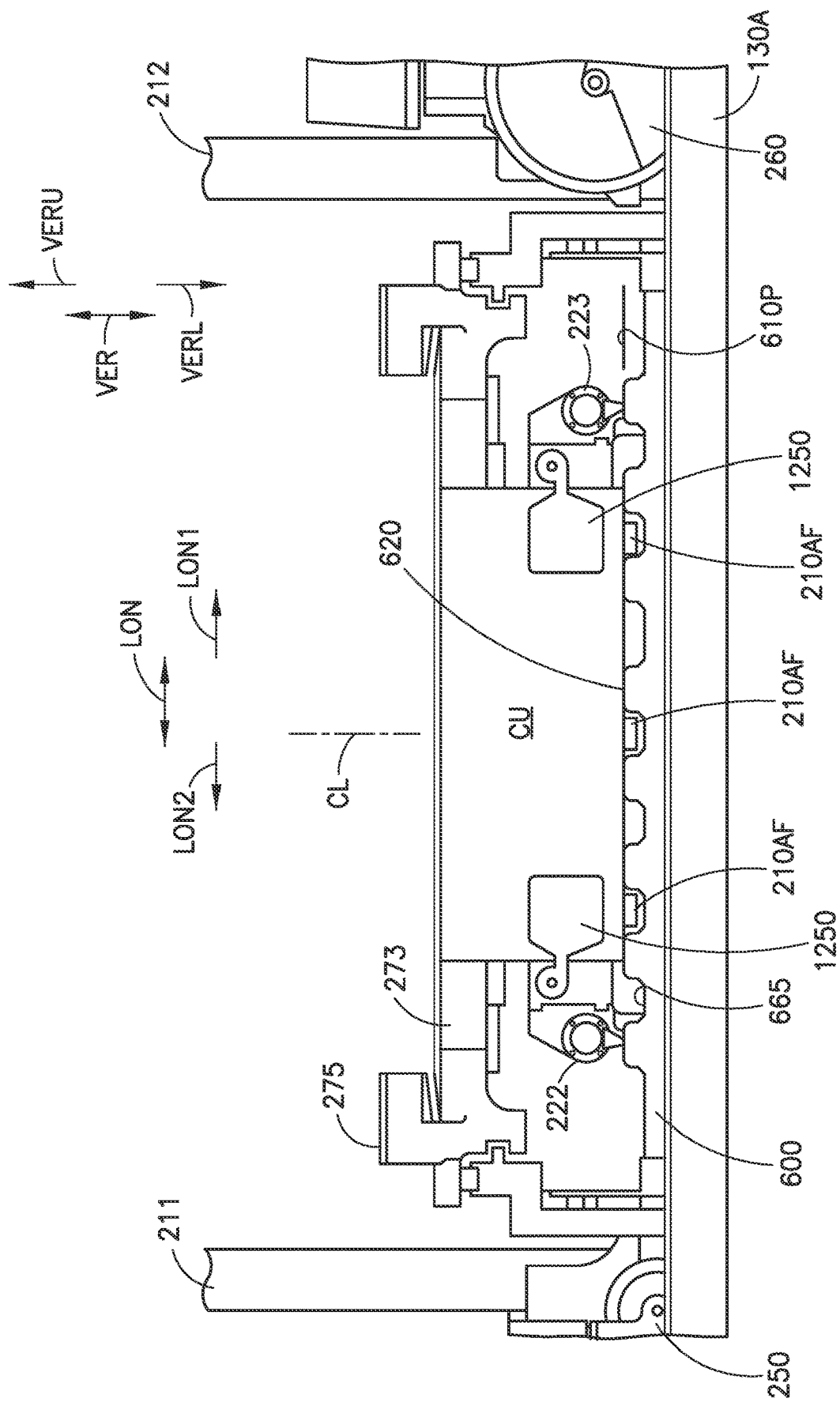

AUTONOMOUS TRANSPORT VEHICLE

CROSS-REFERENCE TO RELATED APPLICATIONS

This application is a non-provisional of and claims the benefit of U.S. provisional patent application No. 63/236,591 filed on Aug. 24, 2021, the disclosure of which is incorporated herein by reference in its entirety.

BACKGROUND

1. Field

The disclosed embodiment generally relates to material handling systems, and more particularly, to transports for automated storage and retrieval systems.

2. Brief Description of Related Developments

Generally autonomous transport vehicles in logistics/warehouse facilities are manufactured to have a predetermined form factor for an assigned task in a given environment. These autonomous transport vehicles are constructed of a bespoke cast or machined chassis/frame. The other components (e.g., wheels, transfer arms, etc.), some of which may also be bespoke assemblies/components, are mounted to the frame and are carried with the frame as the autonomous transport vehicle traverses along a traverse surface. The transfer arms and payload bay of these autonomous transport vehicles may include numerous components and motor assemblies for transferring payloads to and from the autonomous transport vehicles as well as for justifying payloads within the payload bay. The components and numerous motors of the transfer arms and payload bay may be complex and expensive to manufacture, increasing the cost and maintenance requirements of the autonomous transport vehicles.

BRIEF DESCRIPTION OF THE DRAWINGS

The foregoing aspects and other features of the disclosed embodiment are explained in the following description, taken in connection with the accompanying drawings, wherein:

FIGS. 2A, 2B, and 2C are schematic perspective illustrations of an autonomous guided vehicle of the automated storage and retrieval system of FIG. 1 incorporating aspects of the disclosed embodiment;

FIG. 3A is a schematic perspective illustration of a portion of the autonomous guided vehicle of FIGS. 2A-2D in accordance with aspects of the disclosed embodiment;

FIG. 3B is a plan view of a portion of the autonomous guided vehicle shown in FIG. 3A in accordance with aspects of the disclosed embodiment;

FIG. 6B is a plan view of a portion of the autonomous guided vehicle shown in FIG. 6A in accordance with aspects of the disclosed embodiment;

FIG. 6C is a plan view of a portion of the autonomous guided vehicle shown in FIGS. 6A and 6B in accordance with aspects of the disclosed embodiment;

FIG. 6D is a plan view of a portion of the autonomous guided vehicle shown in FIG. 6C in accordance with aspects of the disclosed embodiment;

FIG. 6E is a plan view of a portion of the autonomous guided vehicle shown in FIG. 6A in accordance with aspects of the disclosed embodiment;

FIG. 6F is a plan view of a portion of the autonomous guided vehicle shown in FIGS. 6A and 6E in accordance with aspects of the disclosed embodiment;

FIG. 6G is a plan view of a portion of the autonomous guided vehicle shown in FIG. 6F in accordance with aspects of the disclosed embodiment;

FIGS. 7A and 7B are schematic perspective illustrations of a portion of case handling assembly of the autonomous guided vehicle of FIGS. 2A-2D in accordance with aspects of the disclosed embodiment;

FIGS. 9A, 9B, and 9C are schematic perspective illustrations of a transfer arm of the case handling assembly of FIGS. 7A and 7B in accordance with aspects of the disclosed embodiment;

FIGS. 11A, 11B, and 11C are schematic perspective illustrations of portions of the case handling assembly of FIGS. 7A and 7B in accordance with aspects of the disclosed embodiment;

FIGS. 12E, 12F, 12G, and 12H are schematic perspective illustrations of portions of the case handling assembly of FIGS. 7A and 7B in accordance with aspects of the disclosed embodiment;

FIGS. 14A, 14B, 14C, 14D, 14E, 14F are schematic perspective illustrations of portions of the autonomous guided vehicle of FIGS. 2A-2D showing an exemplary case unit pick and justification sequence in accordance with aspects of the disclosed embodiment;

DETAILED DESCRIPTION

Figure 1:
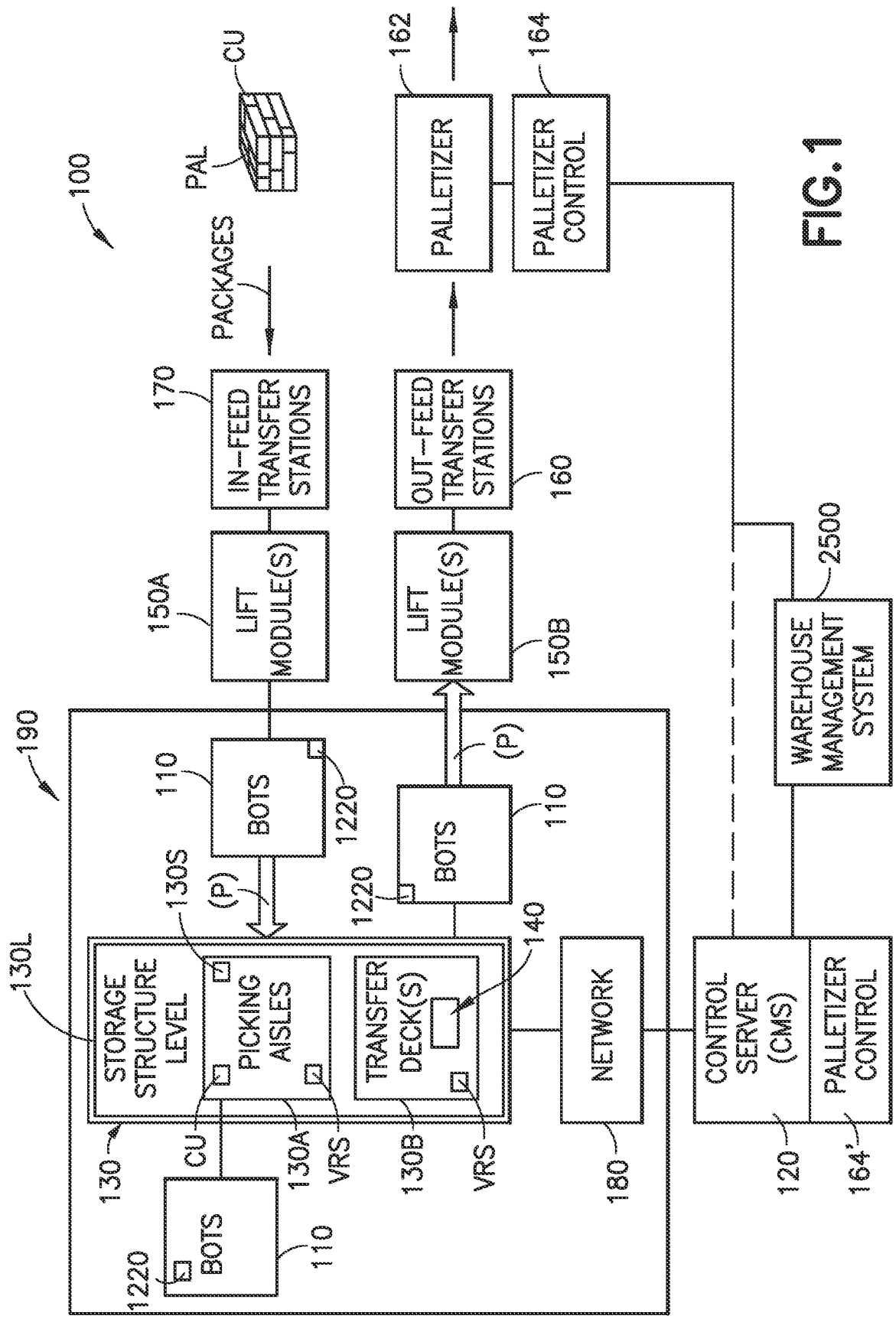
FIG. 1 is a block diagram of an exemplary automated storage and retrieval system incorporating aspects of the disclosed embodiment.

FIG. 1 illustrates an exemplary automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

As described in greater detail herein, the aspects of the disclosed embodiment provide autonomous transport vehicles 110 of the automated storage and retrieval system 100 with a multiple degree of freedom payload/case handling assembly. The payload handling assembly secures the payload in six degrees of freedom while held by the autonomous transport vehicle 110 while providing a simplified case handling structure compared to conventional warehouse autonomous transport vehicles. The payload handling assembly reduces part count and costs of the autonomous transport vehicles 110 by employing universal/common interchangeable structures (see, e.g., lift towers 211, 122 described herein) that may be employed in one or more locations of the autonomous transport vehicles 110. The payload handling assembly reduces part count and costs of the autonomous transport vehicles 110 by minimizing the number of actuators/motors that effect payload gripping and manipulation. As also described herein, the payload handling assembly is configured to adapt to and stably hold payloads of differing sizes by varying a distance between at least two adjacent payload supports of an underpick end effector or arm 210A of the payload handling assembly reduces part count and costs of the autonomous transport vehicles 110.

The aspects of the disclosed embodiment also provide the autonomous transport vehicle 110 with registration facets disposed to provide, upon engagement with a payload, registration of the payload within a payload area or bay of the autonomous transport vehicle 110 with at least two degrees of registration capturing and securing the payload in a predetermined position in the payload area. As described herein, registration facets of the autonomous transport vehicle 110 are configured to effect payload engagement with the at least two degrees of registration registering the payload substantially coincident with seating of the payload on the payload support plane of the payload area so as to pick (and place) and securely register a payload within the payload area in about 10 seconds or less.

The automated storage and retrieval system 100 in FIG. 1, may be disposed in a retail distribution center or warehouse, for example, to fulfill orders received from retail stores for replenishment goods shipped in cases, packages, and or parcels. The terms case, package and parcel are used interchangeably herein and as noted before may be any container that may be used for shipping and may be filled with case or more product units by the producer. Case or cases as used herein means case, package or parcel units not stored in trays, on totes, etc. (e.g. uncontained). It is noted that the case units CU (also referred to herein as mixed cases, cases, and shipping units) may include cases of items/unit (e.g. case of soup cans, boxes of cereal, etc.) or individual item/units that are adapted to be taken off of or placed on a pallet. In accordance with the exemplary embodiments, shipping cases or case units (e.g. cartons, barrels, boxes, crates, jugs, shrink wrapped trays or groups or any other suitable device for holding case units) may have variable sizes and may be used to hold case units in shipping and may be configured so they are capable of being palletized for shipping. Case units may also include totes, boxes, and/or containers of one or more individual goods, unpacked/decommissioned (generally referred to as breakpack goods) from original packaging and placed into the tote, boxes, and/or containers (collectively referred to as totes) with one or more other individual goods of mixed or common types at an order fill station. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases or totes filling replenishment orders, the pallets may contain any suitable number and combination of different case units (e.g. each pallet may hold different types of case units—a pallet holds a combination of canned soup, cereal, beverage packs, cosmetics and household cleaners). The cases combined onto a single pallet may have different dimensions and/or different SKU's.

The automated storage and retrieval system may be generally described as a storage and retrieval engine 190 coupled to a palletizer 162. In greater detail now, and with reference still to FIG. 1, the storage and retrieval system 100 may be configured for installation in, for example, existing warehouse structures or adapted to new warehouse structures. As noted before the system 100 shown in FIG. 1 is representative and may include for example, in-feed and out-feed conveyors terminating on respective transfer stations 170, 160, lift module(s) 150A, 150B, a storage structure 130, and a number of autonomous transport vehicles 110 (also referred to herein as "bots"). It is noted that the storage and retrieval engine 190 is formed at least by the storage structure 130 and the bots 110 (and in some aspect the lift modules 150A, 150B; however in other aspects the lift modules 150A, 150B may form vertical sequencers in addition to the storage and retrieval engine 190 as described in U.S. patent application Ser. No. 17/091,265 filed on Nov. 6, 2020 and titled "Pallet Building System with Flexible Sequencing," the disclosure of which is incorporated herein by reference in its entirety). In alternate aspects, the storage and retrieval system may also include robot or bot transfer stations (not shown) that may provide an interface between the bots 110 and the lift module(s) 150A, 150B. The storage structure 130 may include multiple (stacked) levels 130L1-130Ln (see FIGS. 1 and 16, generally referred to as storage level 130 or a storage level 130, and where n is an integer that denotes an upper number of storage levels present in the storage and retrieval system 100) of storage rack modules where each level 130L includes respective picking aisles 130A, and transfer decks 130B for transferring case units between any of the storage areas of the storage structure 130 and a shelf of the lift module(s) 150A, 150B. The picking aisles 130A are in one aspect configured to provide guided travel of the bots 110 (such as along rails 1600—see FIG. 16) while in other aspects the picking aisles are configured to provide unrestrained travel of the bot 110 (e.g., the picking aisles are open and undeterministic with respect to bot 110 guidance/travel). The transfer decks 130B have open and undeterministic bot support travel surfaces along which the bots 110 travel under guidance and control provided by bot steering (as will be described herein). In one or more aspects, the transfer decks have multiple lanes between which the bots 110 freely transition for accessing the picking aisles 130A and/or lift modules 150A, 150B. The picking aisles 130A, and transfer decks 130B also allow the bots 110 to place case units CU into picking stock and to retrieve ordered case units CU. In alternate aspects, each level 130L may also include respective bot transfer stations 140. The bots 110 may be configured to place case units, such as the above described retail merchandise, into picking stock in the one or more levels 130L of the storage structure 130 and then selectively retrieve ordered case units for shipping the ordered case units to, for example, a store or other suitable location. The in-feed transfer stations 170 and out-feed transfer stations 160 may operate together with their respective lift module(s) 150A, 150B for bi-directionally transferring case units CU to and from one or more levels 130L of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units from the storage and retrieval system 100. It is noted that while the aspects of the disclosed embodiment are described with respect to a multilevel storage array, the aspects of the disclosed embodiment may be equally applied to a single level storage array that is disposed on a facility floor or elevated above the facility floor.

As may be realized, the storage and retrieval system 100 may include multiple in-feed and out-feed lift modules 150A, 150B that are accessible by, for example, bots 110 of the storage and retrieval system 100 so that one or more case unit(s), uncontained (e.g. case unit(s) are not held in trays), or contained (within a tray or tote) can be transferred from a lift module 150A, 150B to each storage space 130S on a respective level 130L (see FIG. 16) and from each storage space 130S to any one of the lift modules 150A, 150B on a respective level 130L. The bots 110 may be configured to transfer the case units between the storage spaces 130S (e.g., located in the picking aisles 130A or other suitable storage space/case unit buffer disposed along the transfer deck 130B) and the lift modules 150A, 150B. Generally, the lift modules 150A, 150B include at least one movable payload support that may move the case unit(s) between the in-feed and out-feed transfer stations 160, 170 and the respective level 130L of the storage space 130S where the case unit(s) CU is stored and retrieved. The lift module(s) may have any suitable configuration, such as for example reciprocating lift, or any other suitable configuration. The lift module(s) 150A, 150B include any suitable controller (such as controller 120 or other suitable controller coupled to controller 120, warehouse management system 2500, and/or palletizer controller 164, 164') and may form a sequencer or sorter in a manner similar to that described in U.S. patent application Ser. No. 16/444,592 filed on Jun. 18, 2019 and titled "Vertical Sequencer for Product Order Fulfillment" (the disclosure of which is incorporated herein by reference in its entirety).

The automated storage and retrieval system may include a control system, comprising for example one or more control servers 120 that are communicably connected to the in-feed and out-feed conveyors and transfer stations 170, 160, the lift modules 150A, 150B, and the bots 110 via a suitable communication and control network 180. The communication and control network 180 may have any suitable architecture which, for example, may incorporate various programmable logic controllers (PLC) such as for commanding the operations of the in-feed and out-feed conveyors and transfer stations 170, 160, the lift modules 150A, 150B, and other suitable system automation. The control server 120 may include high level programming that effects a case management system (CMS) 120 managing the case flow system. The network 180 may further include suitable communication for effecting a bi-directional interface with the bots 110. For example, the bots 110 may include an on-board processor/controller 1220. The network 180 may include a suitable bi-directional communication suite enabling the bot controller 1220 to request or receive commands from the control server 120 for effecting desired transport (e.g. placing into storage locations or retrieving from storage locations) of case units and to send desired bot 110 information and data including bot 110 ephemeris, status and other desired data, to the control server 120. As seen in FIG. 1, the control server 120 may be further connected to a warehouse management system 2500 for providing, for example, inventory management, and customer order fulfillment information to the CMS 120 level program. A suitable example of an automated storage and retrieval system arranged for holding and storing case units is described in U.S. Pat. No. 9,096,375, issued on Aug. 4, 2015 the disclosure of which is incorporated by reference herein in its entirety.

Referring now to FIGS. 2A, 2B, 2C, and 2D, the autonomous transport vehicle or bot 110 (which may also be referred to herein as an autonomous guided vehicle) includes a frame 200F having a front end 200E1 and a back end 200E2 that define a longitudinal axis LAX of the autonomous transport vehicle 110. The frame 200 may be constructed of any suitable material (e.g., steel, aluminum, composites, etc.) and includes a case handling assembly 210 configured to handle cases/payloads transported by the autonomous transport vehicle 110. The frame 200F of the case handling assembly 210 forms a transport payload area (also referred to as a payload bed or area) 210B. As described herein the payload bed 210B includes a payload contact support surface 610 (e.g., formed by protrusions 620 of justification tray 600) that defines a payload support plane 610P (FIG. 14E) of the vehicle 110 that supports the payload (e.g., case unit CU) held in the payload bay 210B with vehicle traverse.

The autonomous transport vehicle also includes any suitable transfer arm 210A (also referred to as an articulated underpick end effector). The arm 210A is configured to engage and underpick a payload with respect to the payload support plane 610P (FIG. 14E), and extend and retract with respect to the payload bay 210B effecting payload transfer to and from the payload bay 210B unloading and loading the payload bay 210B. Here, "underpick" is a picking of a payload by the end effector or transfer arm 210A where the arm 210A is arranged/configured to engage an underside of the payload CU and pick up the payload CU therefrom (i.e., lift from the underside) effecting transfer of the payload CU, from at least one of, each predefined storage area 130S of storage racks (formed by, e.g., a vertical array of storage shelves VAS—see FIG. 16) and each transfer shelf (such as of a lift 150) of the input/output station 160, 170, to the vehicle 110. In a similar but opposite manner, the underpick end effector or transfer arm 210A deterministically underpicks (via bottom engagement) the payload/case unit CU so as to transport and transfer the payload CU on and from the payload bed 210B and place the payload CU at a storage space 130S of a storage rack/transfer shelf (such as of the vertical array of storage shelves VAS or other suitable payload holding area of the storage and retrieval system). At a pick/place location/operation, the underpick exchange between the transfer arm 210A and the storage rack supports 900S (see, e.g., FIG. 9) of the storage spaces 130S engages the underside/bottom of the payload/case unit CU (allowing substantially free unencumbered latitude) of case units on the storage racks so that the case units on the storage racks have a closely packed spacing therebewteen (i.e., a spacing along a length of the storage rack that extends substantially parallel with, for example, a picking aisle 130A or travel lane of the transfer deck 130B), where the closely packed spacing is independent of a distortion of the sides of the cases. The arm 210A is configured to transfer payloads between the autonomous transport vehicle 110 and a payload holding location (such as any suitable payload storage location, a shelf of lift module 150A, 150B, and/or any other suitable payload holding location). The transfer arm 210A may be configured to extend laterally in direction LAT and/or vertically in direction VER to transport payloads to and from the case handling assembly 210. In the aspect illustrated in FIGS. 2A and 2B the case handling assembly 210 includes at least one lift tower 211, 212 configured to move the transfer arm 210A and/or payload bed 210B vertically in the direction VER as will be described in greater detail herein; however, in other aspects, the case handling assembly 210 may not have the at least one lift tower 211, 212. Examples of suitable payload beds 210B and transfer arms 210A and/or autonomous transport vehicles to which the aspects of the disclosed embodiment may be applied can be found in United States pre-grant publication number 2012/0189416 published on Jul. 26, 2012 (U.S. patent application Ser. No. 13/326,952 filed on Dec. 15, 2011) and titled "Automated Bot with Transfer Arm"; U.S. Pat. No. 7,591,630 issued on Sep. 22, 2009 titled "Materials-Handling System Using Autonomous Transfer and Transport Vehicles"; U.S. Pat. No. 7,991,505 issued on Aug. 2, 2011 titled "Materials-Handling System Using Autonomous Transfer and Transport Vehicles"; U.S. Pat. No. 9,561,905 issued on Feb. 7, 2017 titled "Autonomous Transport Vehicle"; U.S. Pat. No. 9,082,112 issued on Jul. 14, 2015 titled "Autonomous Transport Vehicle Charging System"; U.S. Pat. No. 9,850,079 issued on Dec. 26, 2017 titled "Storage and Retrieval System Transport Vehicle"; U.S. Pat. No. 9,187,244 issued on Nov. 17, 2015 titled "Bot Payload Alignment and Sensing"; U.S. Pat. No. 9,499,338 issued on Nov. 22, 2016 titled "Automated Bot Transfer Arm Drive System"; U.S. Pat. No. 8,965,619 issued on Feb. 24, 2015 titled "Bot Having High Speed Stability"; U.S. Pat. No. 9,008,884 issued on Apr. 14, 2015 titled "Bot Position Sensing"; U.S. Pat. No. 8,425,173 issued on Apr. 23, 2013 titled "Autonomous Transports for Storage and Retrieval Systems"; and U.S. Pat. No. 8,696,010 issued on Apr. 15, 2014 titled "Suspension System for Autonomous Transports", the disclosures of which are incorporated herein by reference in their entireties.

The frame 200 includes one or more suitable idler wheels 250 disposed adjacent the front end 200E1. The idler wheels 250 may be substantially similar to those described in U.S. provisional patent application No. 63/213,589 filed on Jun. 22, 2021 with the title "Autonomous Transport Vehicle with Suspension" and U.S. provisional patent application No. 63/193,188 filed on May 26, 2021 with the title "Autonomous Transport Vehicle with Steering," the disclosures of which are incorporated by reference herein in their entireties. The frame also includes one or more drive wheels 260 disposed adjacent the back end 200E2. The drive wheels 260 may be substantially similar to those described in U.S. provisional patent application No. 63/213,589 filed on Jun. 22, 2021," the disclosure of which was previously incorporated by reference herein in its entirety. In other aspects, the position of the idler wheels 250 and drive wheels 260 may be reversed (e.g., the drive wheels 260 are disposed at the front end 200E1 and the idler wheels 250 are disposed at the back end 200E2).

It is noted that in some aspects, the autonomous transport vehicle 110 is configured to travel with the front end 200E1 leading the direction of travel or with the back end 200E2 leading the direction of travel. For exemplary purposes only, the idler wheels 250A, 250B (which are substantially similar to idler wheel 250 described herein) are located at respective front corners of the frame 200 at the front end 200E1 and drive wheels 260A, 260B (which are substantially similar to drive wheel 260 described herein) are located at respective back corners of the frame 200 at the back end 200E2 (e.g., a support wheel is located at each of the four corners of the frame 200) so that the autonomous transport vehicle 110 stably traverses the transfer deck(s) 130B and picking aisles 130A of the storage structure 130. In other examples, the idler wheels 250A, 250B are located at respective back corners of the frame 200 at the back end 200E2 and drive wheels 260A, 260B (which are substantially similar to drive wheel 260 described herein) are located at respective front corners of the frame 200 at the front end 200E1.

Each drive wheel 260 comprises a drive unit 261 that is independently coupled to the frame 200 in any suitable manner such as by suspension system 280, so that each drive wheel 260 is independently movable relative to the frame and any other drive wheel(s) 260 that is/are also coupled to the frame in a manner substantially similar to that described in U.S. provisional patent application No. 63/213,589 filed on Jun. 22, 2021 and titled "Autonomous Transport Vehicle with Suspension", the disclosure of which was previously incorporated herein by reference in its entirety. It is noted that each drive unit 261 comprises any suitable drive motor 261M and a wheel 261W. The drive motor 261M is coupled to and rotationally drives the wheels 261W so as to propel the autonomous transport vehicle 110 in a travel direction. Here the motors 261M of two drive wheels 260A, 260B may be operated at the same time and at substantially the same rotational speed to propel the autonomous transport vehicle 110 in a substantially straight line path of travel. In other aspects, the motors 261M of the two drive wheels 260A, 260B may be operated at the same time (or at different times) and at different rotational speeds to propel the autonomous transport vehicle 110 along an arcuate path of travel or to pivot the autonomous transport vehicle in direction 294 about vehicle pivot axis 293. The vehicle pivot axis 293 may be located about midway between the two drive wheels 260A, 260B. The differential operation of the motors 261M of the respective drive wheels 260A, 260B that effects turning and/or pivoting of the autonomous guided vehicle 110 as described above is referred to herein as differential drive wheel steering.

Figure 2A:
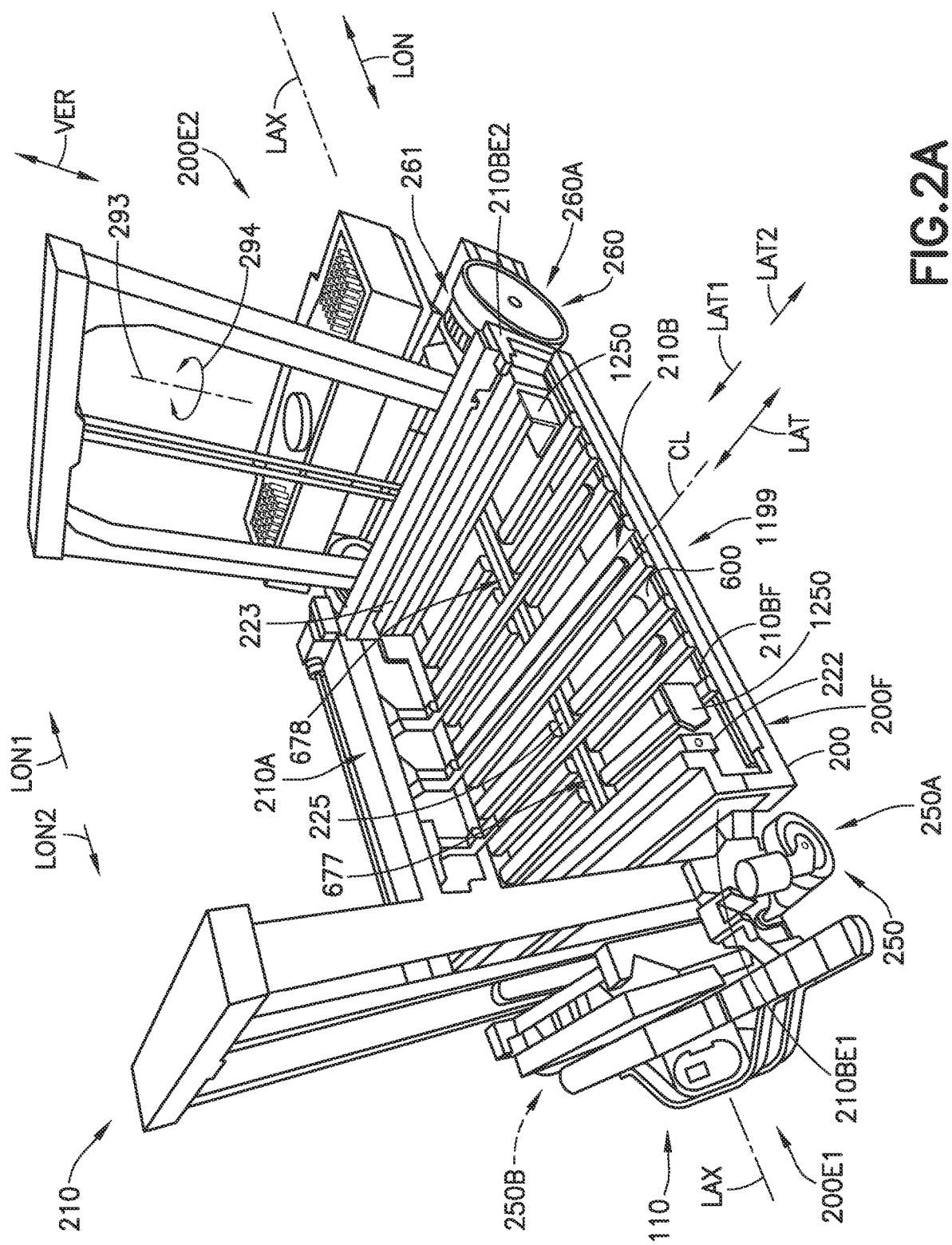
Figure 2B:
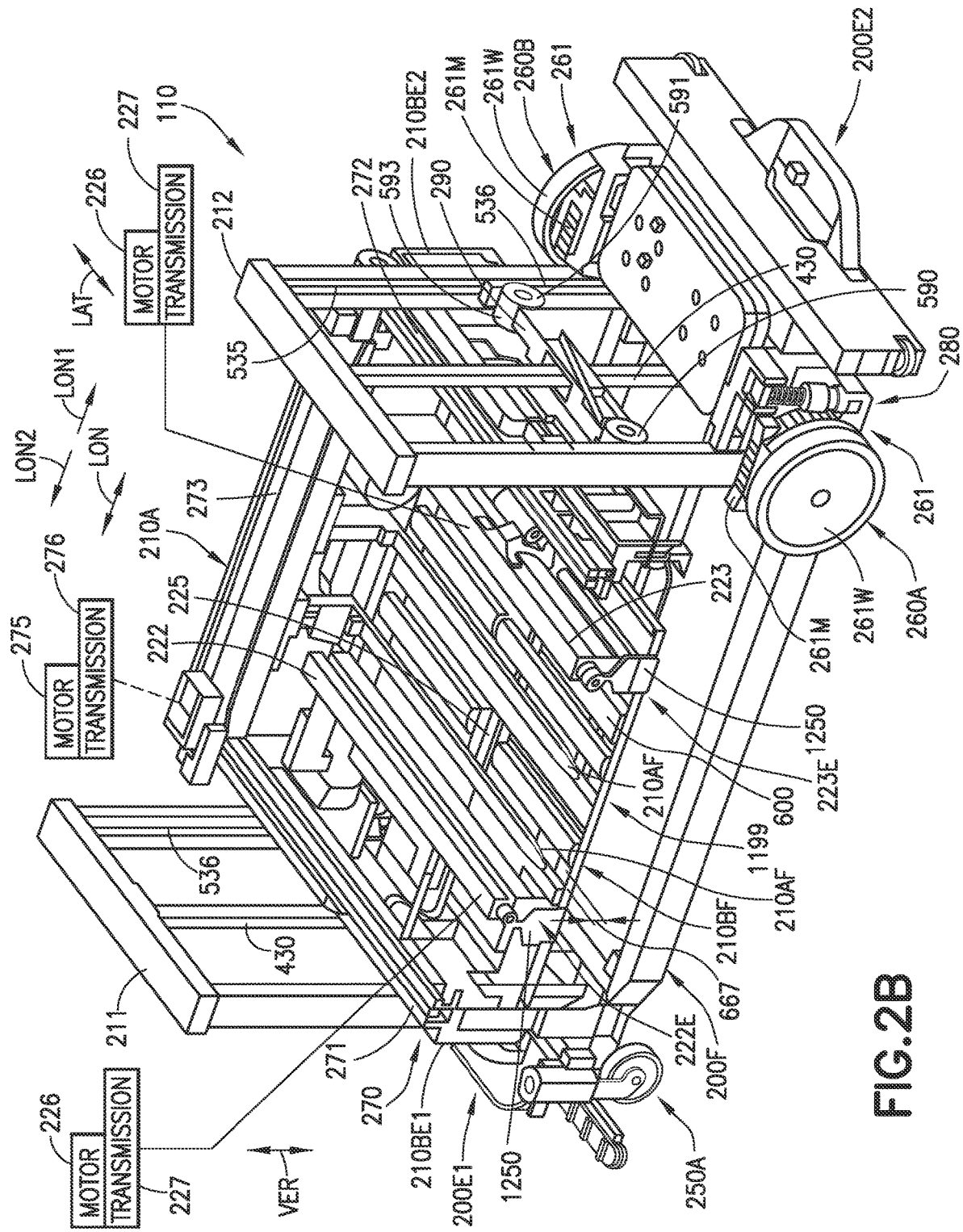
Figure 2D:
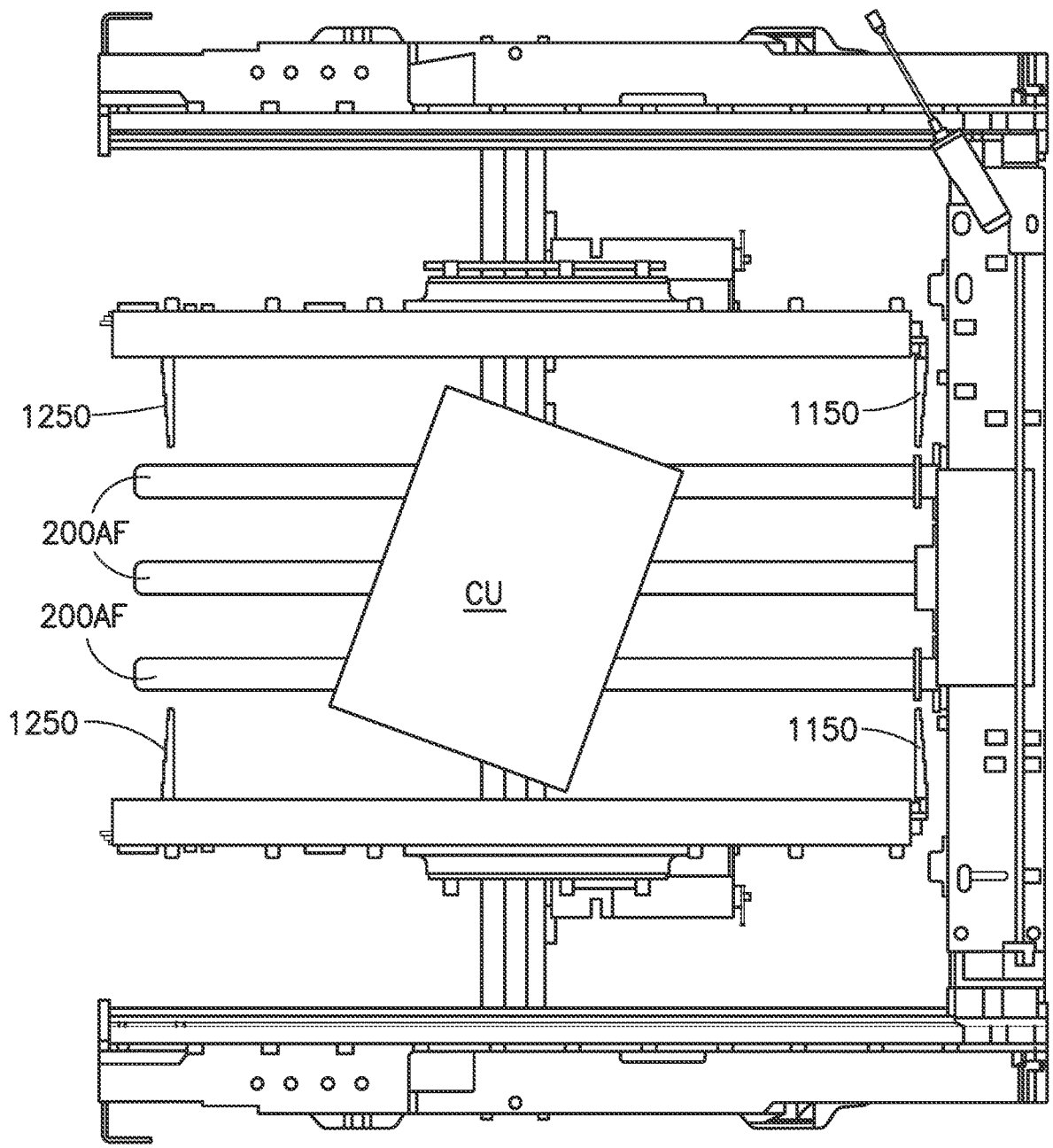
FIG. 2D is a schematic plan illustration of a portion of the autonomous guided vehicle of FIGS. 2A-2C incorporating aspects of the disclosed embodiment.

Referring still to FIGS. 2A and 2B as well as FIGS. 3A-5C the case handling assembly 210 will be described. As noted above, the case handling assembly 210 includes the transfer arm 210A and/or payload bed (or bay) 210B. In this aspect, the payload bed 210B is movably coupled to the at least one lift tower 211, 212 for vertical movement in direction VER and the transfer arm 210A is movably coupled to the payload bed 210B for lateral movement in direction LAT. The payload bed 210B includes a payload bed frame 210BF that forms a payload area in which case units carried by the bot 110 are disposed for transport throughout the storage and retrieval system 100. The payload bed frame 210BF includes longitudinal ends 210BE1, 210BE2 that are each coupled to a respective one of the at least one lift tower 211, 212. Here the at least one lift tower includes lift tower 211 disposed at or adjacent the front end 200E1 of the frame 200 and lift tower 212 disposed at or adjacent the back end 200E2 of the frame 200. Here, each lift tower 211, 212 includes a movable carriage or carrier 290 to which a respective one of the longitudinal ends 210BE1, 210BE2 is fixedly coupled in any suitable manner such as mechanical or chemical fasteners (i.e., so that as the movable carrier 290 moves the payload bed frame 210BF moves with the movable carrier 290).

Referring to FIGS. 3A and 3B, in one or more aspects, as noted above, the vehicle 110 includes at least one lift tower 211, 212. Each of the at least one lift tower 211, 212 is substantially similar to each other of the at least one lift tower 211, 212 such that only lift tower 211 and its carrier 290 will be described (i.e., the lift towers 211, 212 are interchangeable/common with each other and may be placed adjacent either the front end 200E1 or back end 200E2 of the frame 200). The lift tower 211 includes a tower frame 300F. The tower frame 300F includes a base 305, vertical guides 306, 307, and a cross brace or brace 308. The carrier or movable payload carriage 290 extends laterally between and is guided in vertical movement by the vertical guides 306, 307 (e.g., the carrier 290 is configured to raise and lower the payload CU within the payload area 210B. For example, the lift tower 211 includes the vertical guides 306, 307, each of which forms a guide rail 306R, 307R that guides movement of the carrier 290. An interface between the guide rail 306R, 307R and the carrier 290 is undeterministic with respect to a torsional position of the carrier 290 relative to the guide rail 306R, 307R. For example, vertical guides 306, 307 may comprise "C" shaped channels that form the guide rails 306R, 307R. Here, the vertical guides 306, 307 are easily and inexpensively extruded (or stamped or near net shape cast) structures that reduce cost and facilitate easy assembly/ disassembly of the lift tower 211, 212 to the frame 200F. The carrier 290 includes ends 290E1, 290E2 that are received into a respective guide rail 306R, 307R. The ends 290E1, 290E2 may include any suitable low cost lubricious bushing 290B that is easily insert able to (and removed from) the respective guide rail 306R, 307R so as to engage the respective guide rail 306R, 307R and facilitate easy assembly and disassembly of the carrier 290 to the guide rails 306R, 307R. The ends 290E1, 290E2 and the respective bushings 290B engaged with the guide rail 306R, 307R are configured to restrain movement of the carrier 290 in the longitudinal direction LON, while allowing the carrier 290 unrestrained movement in direction VER within the guide rails 306R, 307R (i.e., the bushings 290B have a running fit clearance with the guide rails 306R, 307R such that the guide rails do not need to be manufactured with tight/small tolerances). The bushings 290B provide a sacrificial material that may be easily replaced, where the bushings 290B are coupled to the respective end 290E1, 290E2 with removable fasteners, snaps, clips, or any other suitable removable coupling. The guide rails 306R, 307R provide for a smooth/ fast motion of the carrier 290 in direction VER as the carrier 290 is raised/lowered relative to the frame 200F, where, as described herein, torsional stiffness of the carrier 290 is provided by a flexible transmission 330 that facilitates the undeterministic interface between the ends 290E1, 290E2 and the guide rails 306R, 307R.

A drive section 390S with at least one degree of freedom movement is coupled to the carrier 290 by a flexible transmission 330. Here, the flexible transmission movably couples the carrier 290 to the at least one lift tower 211, 212 and the drive section 290S is configured to move the carrier 290 relative to the at least one lift tower 211, 212. For example, the carrier 290 moves vertically in direction VER between the base 305 and brace 308 under motive force of any suitable drive motor 390 of the drive section 390S, where, for example, the drive motor 390 is coupled to the carrier 290 by the flexible transmission 330 (such as those described herein). In one aspect, the drive motor 390 is a rotary motor coupled to the carrier 290 through a flexible transmission 330 (e.g., belts, chains, and/or cables); while in other aspect the drive motor 390 may be a linear motor (e.g., any suitable electric, hydraulic, and/or pneumatic linear actuator) coupled to the carrier 290 for moving the carrier 290 in direction VER. In the aspect illustrated in FIG. 3A, the frame includes pulleys 320-325 (or sprockets in aspects where chains are employed) rotatably coupled thereto. Pulleys 320, 321 are coupled to the base 305 while pulleys 322-325 are coupled to the brace 308. A serpentine flexible transmission member 330 extends around the pulleys 320-325 and is coupled to the carrier 290. In the aspect illustrated, the flexible transmission member 330 is a toothed belt and the pulleys are toothed pulleys; however, as noted above, in other aspects the flexible transmission member 330 is any suitable cable, chain, or other transmission member capable of serpentine routing.

The flexible transmission 330 is configured to effect torsional stability of the carrier 290, and the payload CU held thereon (noting that the carrier 290 carries the payload bed 210B and transfer arm 210A as described herein), with respect to the frame 200F and independent of each other interface between the carrier 290 and the at least one lift tower 211, 212 than the flexible transmission 330 coupling the carrier 290 to the at least one lift tower 211, 212. For example, as described above, the interface between the ends 290E1, 290E2 and the guide rails 306R, 307R is undeterministic such that a running clearance is provided therebetween allowing the ends 290E1, 290E2 to move freely in direction VER. The configuration of the flexible transmission 330 described herein restrains the ends 290E1, 290E2 in at least direction VER so as to effect torsional stability of the carrier 290. As may be realized, the flexible transmission 330 drives the carrier 290 in direction VER along the vertical guides 306, 307 and is configured to effect torsional stability of the carrier 290 throughout an entire range of motion of the carrier 290 relative to the at least one lift tower 211, 212. The flexible transmission 330, as described herein, is also configured to effect torsional stability of the carrier 290 throughout a range of motion of the carrier 290, relative to the at least one lift tower 211, 212, that effects a payload transfer from the carrier 290 (e.g., the payload bed 210B and transfer arm 210A carried thereby) to a payload support shelf (such as in the vertical array of storage shelves VAS or any other payload holding area of the storage and retrieval system). Similarly, the flexible transmission 330 is configured to effect torsional stability of the carrier 290 throughout a range of motion of the carrier 290, relative to the at least one lift tower 211, 212, that effects a payload transfer from a payload support shelf (such as in the vertical array of storage shelves VAS or any other payload holding area of the storage and retrieval system) to the carrier 290 (e.g., the payload bed 210B and transfer arm 210A carried thereby).

As an example, the flexible transmission member 330 is endless or otherwise forms a closed loop transmission where the ends of the flexible transmission member 330 are fixed to or adjacent one another. The closed loop transmission is configured to provide torsional stability to the carrier 290 so that the carrier 290 and the payload bed 210B and transfer arm 210A coupled thereto and carried thereby remains in a predetermined spatial orientation relative to one or more of the frame 200F, a travel surface upon which the autonomous guided vehicle 110 travels, and a case seating surface to and from which case units are transferred (e.g., so that the transfer arm 210A and payload bed 210B are substantially parallel with seating surfaces of case unit CU holding locations so as to effect picking and placing of the case units CU with the transfer arm 210A). For example, extension of the transfer arm 210A for picking or placing a case unit causes the center of mass of the transfer arm 210A (and any case unit or object carried on the transfer arm 210A) to move laterally in direction LAT relative to the frame 200F (and the carriers 290 of the at least one lift tower 211, 212). This lateral movement of the center of mass of the transfer arm 210A (and any object carried thereon) inducing torsional moments on at least the carriers 290 which torsional moments are resisted/countered by the closed loop transmission formed by the flexible transmission member (belt, chain, cable, etc.) 330.

An exemplary serpentine (closed loop) transmission path of the flexible transmission member 330 is illustrated in FIG. 3B where the flexible transmission member 330 is fixedly coupled to the carrier 290 (so that as the flexible transmission member 330 moves the carrier moves with the flexible transmission member 330) at couplings 340, 341 adjacent lateral ends of the carrier 290. As may be realized, the further apart the couplings 340, 341 the more resistant the carrier 290 is to torsion loads created by, for example, extension of the transfer arm 210A. As described above, the drive motor 390 drives movement of the flexible transmission member 330 (and the carrier 290 coupled thereto).

In the aspect illustrated in FIG. 3A, the motor 390 is mounted to the tower frame 300F in any suitable manner, such as with mechanical or chemical fasteners. The pulleys 320, 321 coupled to the base 305 are coupled to the base 305 such the axle PXL of the respective pulleys 320, 321 is accessible through sides of the base 305 for coupling to with a drive coupling DC or driven pulley 350. Here, the driven pulley 350 (or sprocket) is coupled to the axle PCL of pulley 320 (or pulley 321) where the driven pulley 350 is coupled to a drive pulley 351 (or sprocket) of the motor 390 by a drive belt 352 (or chain or cable). In other aspects, a drive shaft of the motor 390 may be coupled substantially directly to the axle PXL of the pulley 320 (or pulley 321). The axle PXL of pulley 320 is also coupled to a drive shaft 355 by a drive coupling DC, where one end of the drive shaft 355 is coupled to axle PXL of pulley 320 of lift tower by the drive coupling DC and the other end of the drive shaft 355 is coupled to axle PXL of pulley 321 of lift tower 312 by another drive coupling DC so that the respective flexible transmission members 330 of the lift towers 211, 212 are driven by a common motor (i.e., motor 390 drives the flexible transmission members 330 of both lift towers 211, 212) and so that the carriers 290 (of lift towers 211, 212), coupled to the respective flexible transmission members 330, are synchronously moved in direction VER. Here the axle PXL of the pulleys 320, 321 are configured to mate with a corresponding recess of the driven pulley 350 and drive coupling DC in any suitable manner such as by forming a splined coupling, a hex drive coupling or any other suitable drive coupling so that driving force is transmitted to the axle PXL of the respective pulley 320, 321. In other aspects, each lift tower 211, 212 has a respective motor (where the motors are synchronized in their movement in any suitable manner such as with suitable encoders, etc.) for driving movement of the respective belt (and carrier coupled thereto).

Figure 4A:
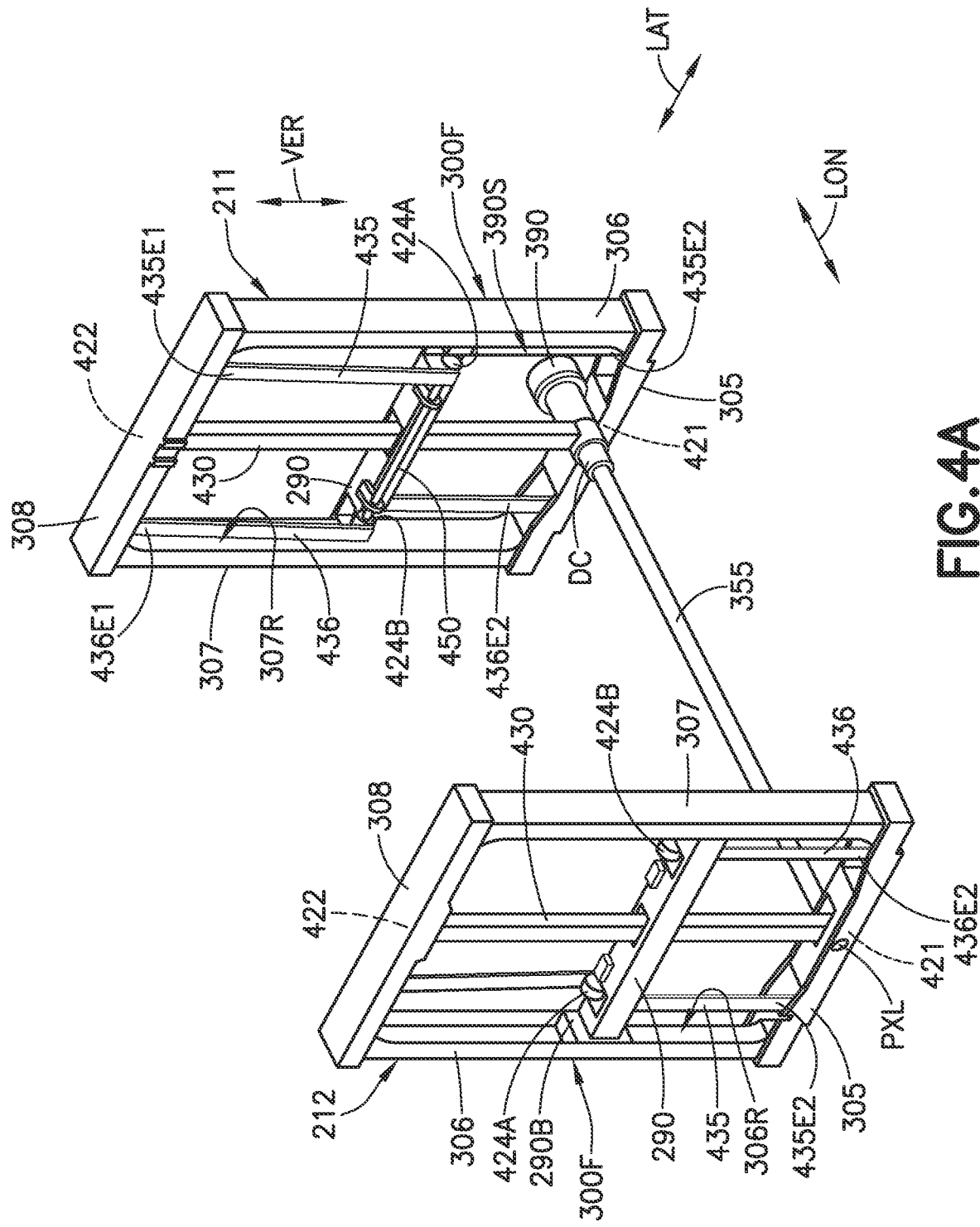
FIG. 4A is a schematic perspective illustration of a portion of the autonomous guided vehicle of FIGS. 2A-2D in accordance with aspects of the disclosed embodiment.
Figure 4C:
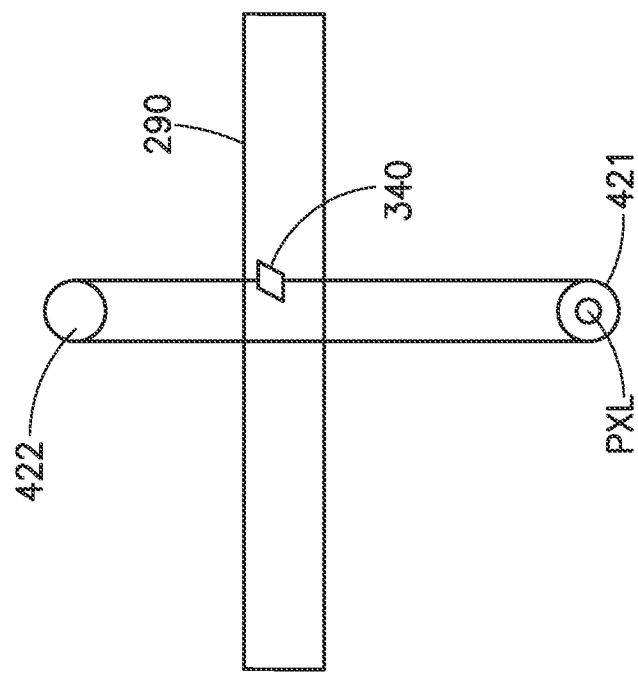
FIG. 4C is a plan view of a portion of the autonomous guided vehicle shown in FIG. 4A in accordance with aspects of the disclosed embodiment.
Figure 4B:
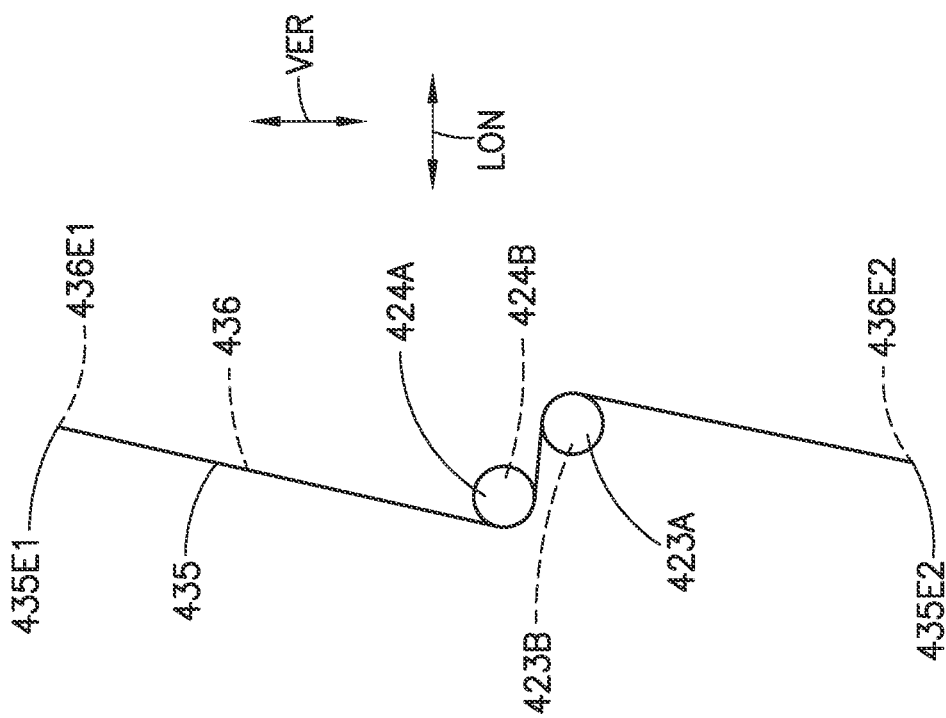
FIG. 4B is a plan view of a portion of the autonomous guided vehicle shown in FIG. 4A in accordance with aspects of the disclosed embodiment.

Referring to FIGS. 4A, 4B, and 4C, in one or more aspects, the lift towers 211, 212 are substantially similar to those described above with respect to FIGS. 3A and 3B; however, carrier 290 of each lift tower 211, 212 is driven by a flexible transmission member 430 (substantially similar to flexible transmission member 330 described above) and stabilized against torsional forces by flexible stabilizing members 435, 436 (belts, chains, cables, etc.) that are separate and distinct from the flexible transmission member 430. In this aspect, a pulley 421 is coupled to the base 305 in a manner substantially similar to pulleys 320, 321 described above, and a pulley 422 is coupled to the brace 308 in a manner substantially similar to pulleys 322-325 described above. The flexible transmission member 430 forms a continuous/endless loop around the pulleys 421, 422. In one or more aspects, the flexible transmission member 430 is a toothed belt and the pulleys 421, 422 are toothed pulleys however, in other aspects any suitable belts, chains, cables, etc. and pulleys may be employed. The carrier 290 is coupled to one side of the continuous loop by coupling 340 as illustrated in FIG. 4C so as to drive the carrier 290 in direction VER as the flexible transmission member 430 is driven around the pulleys by motor 390 in a manner substantially similar to that described above with respect to flexible transmission member 330 (in this aspect the motor 390 is illustrated as being coupled substantially directly to the axle PXL of pulley 421 by any suitable drive coupling similar to that described above, where pulleys 421 of lift tower 211 and lift tower 212 are coupled by drive shaft 355 in a manner substantially similar to that described above so that the flexible transmission members 430 and carriers 290 of the lift towers 211, 212 are synchronously moved in direction VER. In other aspects, the each lift tower 211, 212 may have a respective drive motor 390 for driving a respective flexible transmission member 430 where the rotation of the drive motors are synchronized in any suitable manner (such as described herein).

As described above, the carrier 290 of each lift tower 211, 212 illustrated in FIGS. 4A-4C is torsionally stabilized (e.g., against torsional forces induced by extension of the transfer arm 210A) by a pair of flexible stabilizing members 435, 436 disposed adjacent or at the lateral ends of the respective carrier 290. Each flexible stabilizing member 435, 436 has a terminal end 435E1, 436E1 fixedly coupled to the brace 308 (in any suitable manner such as by mechanical or chemical fasteners) and another terminal end 435E2, 436E2 fixedly coupled to the base 305 (in any suitable manner such as by mechanical or chemical fasteners). Each flexible stabilizing member 435, 436 follows a serpentine path (shown in FIG. 4B) between the brace 308 and the base 305, where the serpentine path is defined at least in part by a pair of offset pulleys 423A, 424A and 423B, 423B (or sprockets in the case a chain is employed) that are rotatably coupled to the carrier 290 adjacent or at lateral ends of the carrier 290 (as illustrated in FIG. 4A). Here the pulleys 423A, 424A are offset both vertically in direction VER and longitudinally in direction LON. Pulleys 423B, 424B are also offset both vertically in direction VER and longitudinally in direction LON so that the pulleys 423A, 423B are substantially in-line with each other in direction LAT (i.e., coaxial with each other) and pulleys 424A, 424B are substantially in-line with each other in direction LAT (i.e., coaxial with each other) as illustrated in FIG. 4B. As can be seen in FIGS. 4A and 4B, the flexible stabilizing member 435 forms a serpentine path around pulleys 423A, 424A and flexible stabilizing member 436 forms a serpentine path around pulleys 423B, 424B. The serpentine path of each flexible stabilizing member 435, 436 forms a substantial S shape around the respective pulleys 423A, 424A, 423B, 424B. The pulley 424A is rotationally fixed to pulley 424B (i.e., as pulley 424A rotates the pulley 424B rotates with pulley 424A) by shaft 450 (or any other suitable mechanical coupling) so as to, in conjunction with the serpentine path of the flexible stabilizing members 435, 436, maintain the relative position of the carrier 290 with at least the frame 300F to prevent a tilting or tipping of the carrier 290 under torsional loads induced on the carrier 290 by the extension of the transfer arm 210A as described herein. In other aspects, the pulleys 423A, 423B are also rotationally fixed to each other in a manner similar to that described above with respect to pulleys 424A, 424B. In other aspects, the pulleys 423A, 423B are rotationally fixed to each other in lieu of the rotational fixing of pulleys 424A, 424B.

Figure 5A:
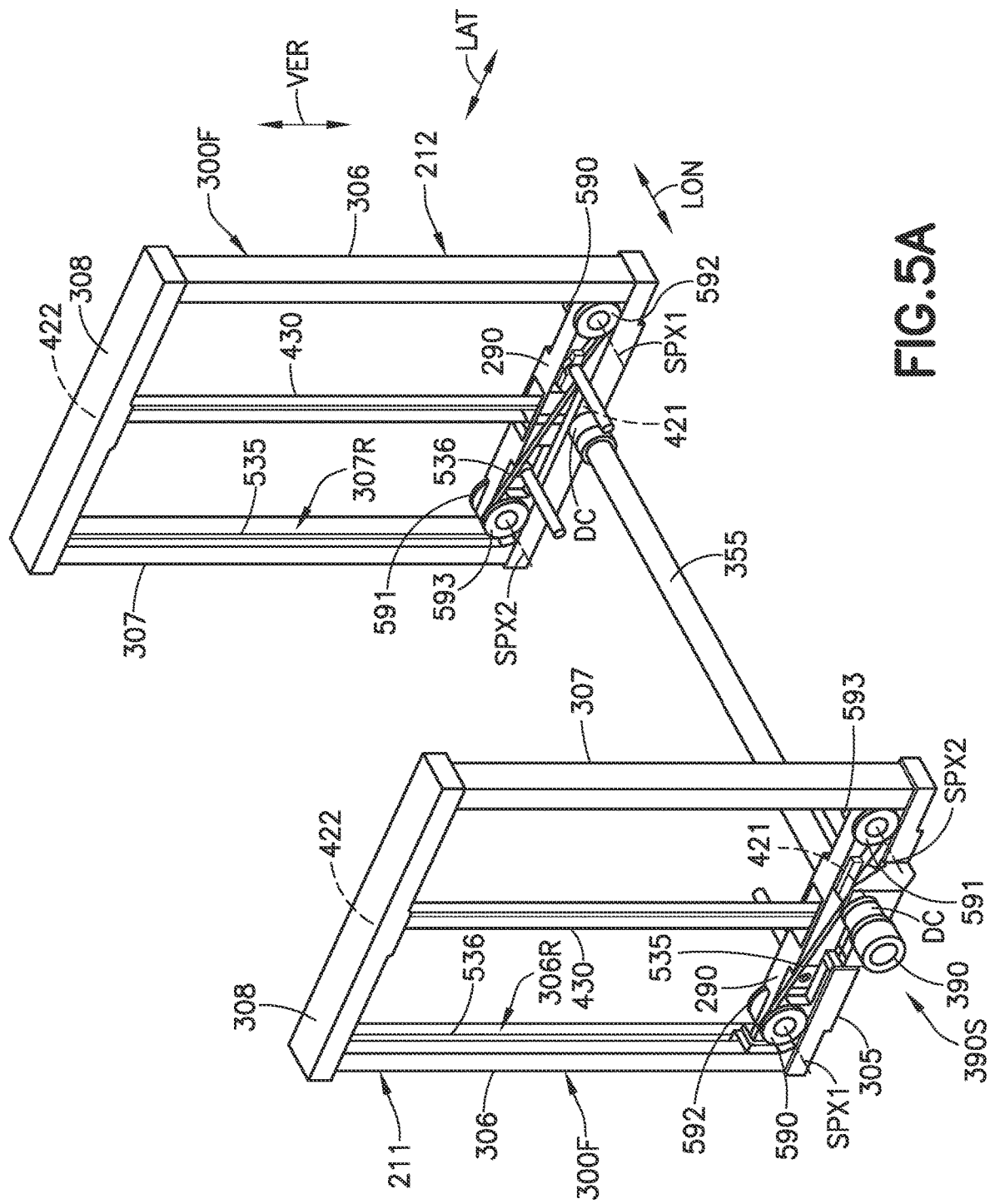
FIG. 5A is a schematic perspective illustration of a portion of the autonomous guided vehicle of FIGS. 2A-2D in accordance with aspects of the disclosed embodiment.
Figure 5B:
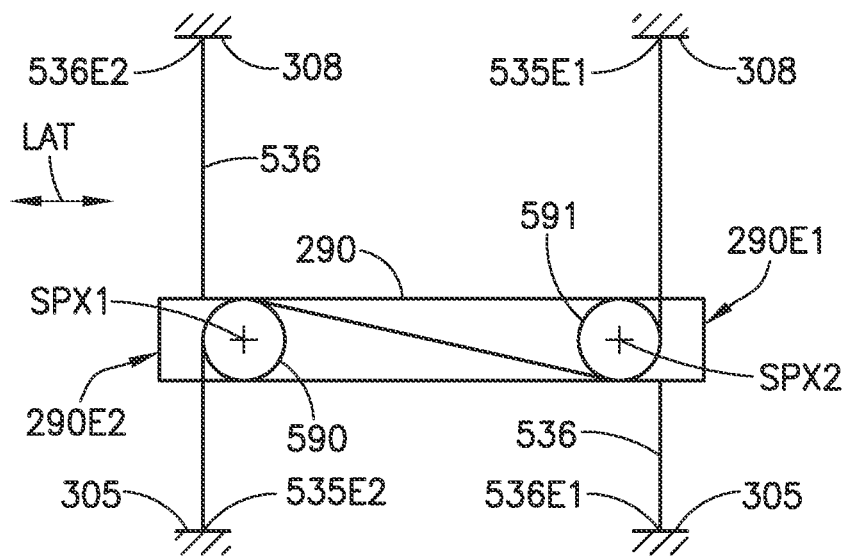
FIG. 5B is a plan view of a portion of the autonomous guided vehicle shown in FIG. 5A in accordance with aspects of the disclosed embodiment.
Figure 5C:
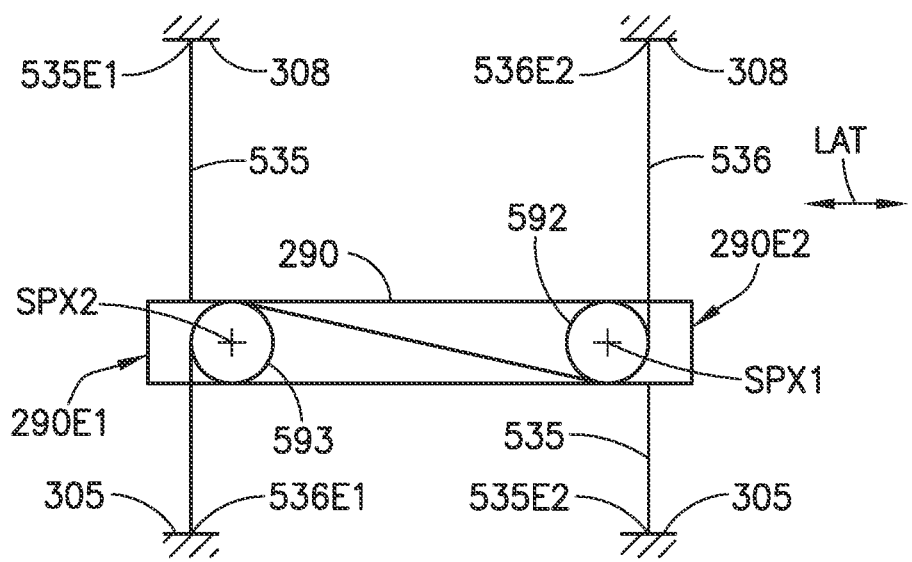
FIG. 5C is a plan view of a portion of the autonomous guided vehicle shown in FIG. 5A in accordance with aspects of the disclosed embodiment.

Referring to FIGS. 5A, 5B, and 5C, in one or more aspects, the lift towers 211, 212 are substantially similar to those described above with respect to FIGS. 4A, 4B, and 4C; however, the carrier 290 of each lift tower 211, 212 is stabilized against torsional forces by opposing flexible stabilizing members 535, 536 (illustrated as cables but in other aspects, chains, belts, etc.) that are separate and distinct from the flexible transmission member 430 and extend along the carrier 290 in at least the direction LAT. For example, the carrier 290 of each lift tower 211, 212 includes pulleys 590, 591 disposed on one side of the carrier 290 and pulleys 592, 593 disposed on another side of the carrier 290 so that an axis of rotation SPX1, SPX2 of each of the pulleys extends in direction LON and the pulleys lie substantially parallel with a plane of the respective lift tower 211, 212. In other aspects, the pulleys 590-593 are located on the same/common side of the carrier 290. The pulleys 591, 593 at or adjacent one end of the carrier 290 are coaxially located along axis SPX2 and the pulleys at or adjacent the other end of the carrier 290 are coaxially located along axis SPX1; however in other aspects the pulley 591 may not be coaxially located with pulley 593 and the pulley 590 may not be coaxially located with pulley 592.

Flexible stabilizing member 535 is wrapped around pulleys 590, 591 along a serpentine path (a substantially "S" shaped path as illustrated in FIG. 5B) so that one end 535E1 of the flexible stabilizing member 535 at or adjacent end 290E1 of the carrier 290 and extending from pulley 591 is fixedly coupled to the brace 308 and another end 535E2 of the flexible stabilizing member 535 at or adjacent the other end 290E2 of the carrier 290 and extending from pulley 590 is fixedly coupled to the base 305. Flexible stabilizing member 535 is wrapped around pulleys 592, 593 in a manner that opposes flexible stabilizing member 535. For example, flexible stabilizing member 536 is wrapped around pulleys 590, 591 along a serpentine path (a substantially "S" shaped path as illustrated in FIG. 5C) so that one end 536E1 of the flexible stabilizing member 536 at or adjacent end 290E1 of the carrier 290 and extending from pulley 593 is fixedly coupled to the base 305 (e.g., end 536E1 of flexible stabilizing member 536 opposes end 535E1 of flexible stabilizing member 535) and another end 536E2 of the flexible stabilizing member 536 at or adjacent the other end 290E2 of the carrier 290 and extending from pulley 592 is fixedly coupled to the brace 308 (e.g., end 536E2 of flexible stabilizing member 536 opposes end 535E2 of flexible stabilizing member 535). This opposing serpentine flexible stabilizing member arrangement illustrated in FIGS. 5A, 5B, and 5C maintains the relative position of the carrier 290 with at least the frame 300F to prevent a tilting or tipping of the carrier 290 under torsional loads induced on the carrier 290 by the extension of the transfer arm 210A as described herein.

Referring again to FIGS. 2A and 2B as well as FIGS. 6A, 6B, 6C, 6D, 6E, 6F, and 6G, as described above, the payload bed frame 210BF coupled to (e.g., via the carriers 290) and extends between the lift towers 211, 212. In other aspects, the payload bed frame 210BF is cantilevered from one lift tower or coupled to more than two lift towers. The payload bed frame 210BF has mounted thereon a justification tray 600. The justification tray 600 includes a base 630 and at least one case unit support surface 610 coupled to the base 630 (or integrally formed with the base 630) in any suitable manner. The at least one case unit support surface 610 forms a case unit support plane 610P along which case units CU carried by the bot 110 can be moved laterally and/or longitudinally to justify/reposition the case units CU on the payload bed 210B as will be described herein. The at least one case unit support surface 610, in one or more aspects, is/are one or more protrusions 620 that extend from the base 630 where each protrusion 620 has an arcuate surface 621 upon which the case units are supported. In other aspects, the at least one case unit support surface 610 is/are one or more laterally extending rollers 620A that extend in direction LAT; while in still other aspects the at least one case unit support surface 610 is formed by a plurality of ball bearings 620B that form a ball transfer table; while in still other aspects the at least one case unit support surface 610 may be formed by a combination of protrusions, rollers, and ball bearings.

Referring to FIGS. 6A and 6E-6G, the base 630 of the justification tray 600 is coupled to the payload bed frame 210BF in any suitable manner so that as the payload bed frame 210BF moves in direction VERT relative to the bot 110 frame 200F the justification tray 600 moves with the payload bed frame 210BF. For example, the payload bed frame 210BF includes guide members 666P (e.g., posts, rods, etc.) that hold the justification tray captive to the payload bed frame 210BF and along which the justification tray slides in direction VERT. In one or more aspects, any suitable biasing member(s) 666 (e.g., springs, resilient/rubber bushings, etc.) are provided and bias (in direction VERL) the justification tray 600 away from the payload bed frame 210BF; while in other aspects gravity and/or biasing members 666 may bias the justification tray 600 in direction VERL. With the justification tray 600 biased away from the payload bed frame 210BF (see FIG. 6E), case unit support surfaces 210AFS of tines or fingers 210AF of the transfer arm 210A (as will be described herein) are disposed above the payload support plane 610P of the justification tray 600. With the justification tray 600 moved toward the payload bed frame 210BF (e.g., against the biasing force of the biasing member(s) 666 and/or against the force of gravity—such as by contact of the justification tray 600 with the frame 200F) the case unit support surfaces 210AFS of tines or fingers 210AF of the transfer arm 210A are disposed below the payload support plan 610P (see FIGS. 6F and 6G) so that case units CU are transferred from the case unit support surfaces 210AFS of the fingers 210AF to the support surface(s) 610 of the justification tray 600.

Figure 6A:
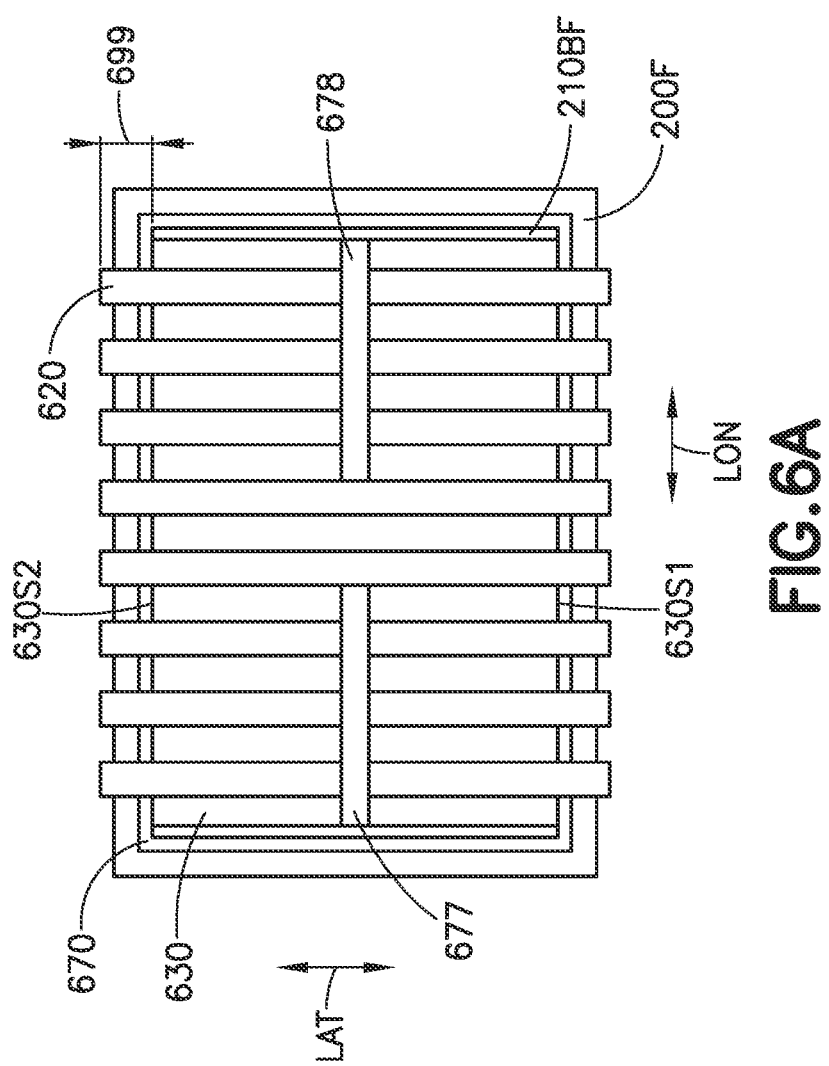
FIG. 6A is a schematic perspective illustration of a portion of the autonomous guided vehicle of FIGS. 2A-2D in accordance with aspects of the disclosed embodiment.

As illustrated in FIGS. 6A and 6F, at least a portion of the payload bed frame 210BF and at least a portion the base 630 of the justification tray 600 are shaped and sized to fit within and be recessed into the frame 200F of the bot 110. The justification tray 600 is configured so that the protrusions 620 (or in the case of the rollers 620A and ball bearings 620B any suitable tabs or portion of the base 630) extends over the frame 200F (in the aspect illustrated in FIG. 6A the protrusions extend laterally in direction LAT but in other aspects any suitable tabs may extend longitudinally in direction LON and/or laterally in direction LAT) so that as the portion of the payload bed frame 210BF is lowered/recessed (e.g., by the lift towers 211, 212) in direction VERL into an opening 670 of the frame 200F the protrusions 620 abut the frame 200F (or any other suitable hard stop surface of the bot 110) causing the justification tray 600 to be seated on the frame 200F (or any other suitable hard stop surface of the bot 110) and move toward the payload bed frame 210BF. As the payload bed frame 210BF continues to move in direction VERL (with the movement of the justification tray 600 in direction VERL stopped by the frame 200F) the payload support plane 610P is positioned above the case unit support surfaces 210AFS of tines or fingers 210AF to transfer case units CU from the fingers 210AF to the justification tray 600 (e.g., support of the case units are transferred from the transfer arm 210A to the justification tray 600 for justification/repositioning in directions LON, LAT). Any suitable resilient material (e.g., rubber (or other elastomeric/resilient material) bushings, pads, etc.) may be placed between the justification tray 600 and the frame 200F to substantially dampen vibrations from the frame 200F to the justification tray 600 and vice versa.

With the case units justified/repositioned, the lift towers 211, 212 move the payload bed 210B in direction VERU so that the biasing members 666 and/or gravity bias (e.g. in direction VERL) the justification tray 600 away from the payload bed frame 210BF. With continued movement of the payload bed 210B in direction VERU the case unit support surfaces 210AFS of the fingers 210AF move past (e.g., above) the payload support plane 610P of the justification tray 600 to transfer support of the case units CU from the justification tray 600 to the fingers 210AF. As may be realized, the case units CU can be transported by the bot 110 with the case units CU supported on the justification tray and/or supported on the fingers 210AF. The justification tray 600 is also configured to retain, such as in troughs 665 (see FIGS. 6B and 7B) adjacent/between the case unit support surfaces 610, any debris (e.g., liquids and/or solids) from the case units CU held/supported in the payload bed 210B by the transfer arm 210A or justification tray 600. Retention of case unit debris by the justification tray 600 may prevent the debris from falling on, for example, the transfer deck 130B (FIG. 1) and picking aisles 130A (FIG. 1) where such fallen debris may decrease wheel traction between the bot 110 wheels and the travel/support surfaces of the transfer deck 130B and picking aisles 130A.

Referring to FIGS. 6A and 6B-6D, in one or more alternate aspects, the base 630 of the justification tray 600 is coupled to the payload bed frame 210BF in any suitable manner (such as with guide members 666P) so that as the payload bed frame 210BF moves in direction VERT relative to the bot 110 frame 200F the justification tray 600 moves with the payload bed frame 210BF. In one or more aspects, the justification tray 600 is coupled to the payload bed frame 210BF by a biased coupling that provides relative movement of the justification tray 600 relative to the payload bed frame 210BF in direction VERT while biasing the justification tray 600 against the payload bed frame 210BF in direction VERT. For example, any suitable biasing member(s) 666 (e.g., springs, resilient/rubber bushings, etc.) bias the justification tray 600 in direction VERL towards the payload bed frame 210BF (see FIG. 6A) and provide for the relative movement between the justification tray 600 and the payload bed frame in direction VERT. With the justification tray 600 biased against the payload bed frame 210BF (see FIG. 6B), case unit support surfaces 210AFS of tines or fingers 210AF of the transfer arm 210A (as will be described herein) are disposed above the payload support plane 610P of the justification tray 600. With the justification tray 600 moved away from the payload bed frame 210BF (e.g., against the biasing force of the biasing member(s) 666—such as by contact with the frame 200F) the case unit support surfaces 210AFS of tines or fingers 210AF of the transfer arm 210A are disposed below the payload support plane 610P (see FIGS. 6C and 6D) so that case units CU are transferred from the case unit support surfaces 210AFS of the fingers 210AF to the support surface(s) 610 of the justification tray 600.

As illustrated in FIGS. 6A and 6D, at least a portion of the payload bed frame 210BF and at least a portion the base 630 of the justification tray 600 are shaped and sized to fit within and be recessed into the frame 200F of the bot 110. The justification tray 600 is configured so that the protrusions 620 (or in the case of the rollers 620A and ball bearings 620B any suitable tabs or portion of the base 630) extends over the frame 200F (in the aspect illustrated in FIG. 6A the protrusions extend laterally in direction LAT but in other aspects any suitable tabs may extend longitudinally in direction LON and/or laterally in direction LAT) so that as the portion of the payload bed frame 210BF is lowered/recessed (e.g., by the lift towers 211, 212) in direction VERL into an opening 670 of the frame 200F the protrusions 620 abut the frame 200F (or any other suitable hard stop surface of the bot 110) causing the justification tray 600 to be seated on the frame 200F (or any other suitable hard stop surface of the bot 110) and become spaced apart from the payload bed frame 210BF (e.g., the movement of the justification tray 600 in direction VERL is stopped by the frame 200F while the payload bed frame 210BF continues to move in direction VERL). As the payload bed frame 210BF continues to move in direction VERL the case unit support surfaces 210AFS of the fingers 210AF move past (e.g., beneath) the payload support plane 610P of the justification tray 600 to transfer case units CU from the fingers 210AF to the justification tray 600 (e.g., support of the case units are transferred from the transfer arm 210A to the justification tray 600 for justification/repositioning in directions LON, LAT).

With the case units justified/repositioned, the lift towers 211, 212 move the payload bed 210B in direction VERU so that the biasing members 666 bias (e.g. in direction VERL) the justification tray 600 against the payload bed frame 210BF. With continued movement of the payload bed 210B in direction VERU the case unit support surfaces 210AFS of the fingers 210AF move past (e.g., above) the payload support plane 610P of the justification tray 600 to transfer support of the case units CU from the justification tray 600 to the fingers 210AF. As may be realized, the case units CU can be transported by the bot 110 with the case units CU supported on the justification tray and/or supported on the fingers 210AF. The justification tray 600 is also configured to retain, such as in troughs 665 (see FIGS. 6B and 7B) adjacent/between the case unit support surfaces 610, any debris (e.g., liquids and/or solids) from the case units CU held/supported in the payload bed 210B by the transfer arm 210A or justification tray 600. Retention of case unit debris by the justification tray 600 may prevent the debris from falling on, for example, the transfer deck 130B (FIG. 1) and picking aisles 130A (FIG. 1) where such fallen debris may decrease wheel traction between the bot 110 wheels and the travel/support surfaces of the transfer deck 130B and picking aisles 130A.

The justification tray 600 is positioned relative to the fingers 210AF of the transfer arm 210A so that, with the payload bed 210B raised relative to the frame 200F for picking and/or placing a case unit CU, the case unit support surface 210AFS of the fingers 210AF are located a distance (e.g., gap) CAG above the support surface 610 of the justification tray 600. This gap CAG is sized (i.e., minimized) only to allow sufficient clearance between a case unit CU supported on the fingers 210AF so that movement of the case unit CU above the support surface 610 (e.g., the arcuate support surfaces 621) is without contact between the case unit CU and the support surface 610. As will be described herein. The minimized gap CAG effects, with relative vertical movement between the fingers 210AF and justification tray 600 (e.g., where the relative movement of the justification tray 600 effected by the frame 200F or an actuator 666A), seating of the case unit CU on the justification tray 600 substantially immediately proximate to the end effector 210A positioning the underpick case unit CU within the payload bay 210B loading the payload bay 210B. For example, when a transfer arm 210A retract movement into the payload bed 210B is complete, the relative movement between the transfer arm 210A and the justification tray 600 substantially coincident with and substantially immediately upon completion of retract movement transfers the case unit CU to justification tray 600. The support surface 610 has a sufficient coefficient of friction to stably hold the case unit CU thereon so as to register the case unit CU in two degrees of registration (vertically in direction VER and planar in directions LON, LAT) to effect commencement of autonomous transport vehicle 110 traverse motion (without the case unit being gripped by the justification bars 222, 223, the pusher arms 1150, or the case pullers) substantially coincident with completion of retract movement (e.g., the case unit is retracted into the payload bed 210B, securely registered on the justification tray 600, and the vehicle 110 traverse is commenced in about 10 seconds or less). As described herein, the justification tray 600 extends above the fingers through contact with the frame 200F; however, the payload bay 210B may include linear actuators 666A (se FIGS. 6B and 6E) to raise or lower the justification tray 600 relative to the fingers 210A. As an example, the actuators 666A may be employed where the transfer arm 210A and payload bed 210B are raised (e.g., via the lift towers 211, 212) to pick case units CU from an upper shelf 900U of an array of stacked shelves as described herein (see FIG. 16).

Referring to FIGS. 2A, 2B, 7A, and 7B, as described above, the transfer arm 210A is movably coupled to the payload bed frame 210BF in any suitable manner so that the fingers 210AF of the transfer arm 210A are spaced from the payload bed frame 210BF in direction VER by any suitable distance 667 (FIG. 2B). For example, the transfer arm 210A includes an extension axis 270 that is coupled to the payload bed frame 210BF and configured to provide movement of the fingers 210AF relative to the payload bed frame 210BF in direction LAT. Here the extension axis 270 includes a linear guide rail 271 coupled to the payload bed frame 210BF at or adjacent end 210BE1 of the payload bed frame 210BF, and another linear guide rail 272 coupled to the payload bed frame 210BF at or adjacent end 210BE2 of the payload bed frame 210BF. The fingers 210AF are coupled to a finger support rail 273 of the transfer arm 210A, where the finger support rail 273 spans between and is movably coupled to the linear guide rails 271, 272 for reciprocating movement (e.g., extension and retraction) along the linear guide rails 271, 272 in direction LAT. The transfer arm 210A includes any suitable motor 275 (e.g., rotary motor, linear motor, etc.) and transmission 276 (e.g., belts, gears, etc.) for driving the finger support rail 273 along the linear guide rails 271, 272 to effect reciprocal movement of the fingers 210AF in direction LAT. In the aspect illustrated in the figures the transfer arm 210A extends and retracts from one lateral side of the bot 110 frame 200F while in other aspects the transfer arm 210A is configured for bidirectional extension (e.g., extends and retracts from both lateral sides of the bot 110 frame 200F).

In the aspects illustrated in FIGS. 2A, 2B, 7A, and 7B there are three fingers 210AF1, 210AF2, 210AF3 (see FIGS. 7A and 7B) coupled to the finger support rail 273; however, in other aspects there are more than three or less than three fingers coupled to the finger support rail 273. Here, one or more of the fingers 210AF1, 210AF2, 210AF3 are movably coupled to the finger support rail 273 so as to be movable along the finger support rail 273 in the direction LON to at least change/vary a pitch or distance between the fingers 210AF1, 210AF2, 210AF3. In one or more aspects, one or more of what may be referred to as outboard fingers 210AF1, 210AF3 are movable relative to one or more of what may be referred to as inboard fingers 210AF2. For example, the finger 210AF2 is stationarily fixed at a predetermined location on the finger support rail (e.g., does not move relative to the finger support rail 273) such as at or along a laterally extending centerline 777 of the payload bed 210B or the finger 210AF2 may be driven in direction LON independently of one or more of the outboard fingers 210AF1, 210AF3.

At least the fingers 210AF1, 210AF3 are coupled to the finger support rail 273 so as to move relative to each other and the finger 210AF2 in direction LON; while in other aspects, each of the finders 210AF1, 210AF2, 210AF3 are coupled to the finger support rail 273 so as to move relative to each other. The finger support rail 273 includes any suitable number of linear actuators 776 for effecting the movement of the fingers 210AF1, 210AF3 or fingers 210AF1, 210AF2, 210AF3 in direction LON. The fingers 210AF1, 210AF2, 210AF3 may be movable in direction LON independent of each other, in a fixed relationship with one or more other fingers, or as a single unit. The linear actuator(s) is/are any suitable actuator(s), examples of which include but are not limited to, pneumatic cylinders, hydraulic cylinders, ball-screw drives, lead-screw drives, rack and pinion drives, rotary arm-linkage drives, belt drives, chain drives, or any other suitable drive configured to effect linear movement of the fingers along the finger support rail in direction LON.

In one or more aspects, each finger 210AF1, 210AF3 has a respective linear actuator 776 so that the fingers 210AF1, 210AF3 move independent of each other in direction LON, while in other aspects there is a single linear actuator 776 that is common to each finger 210AF1, 210AF3 so that the single actuator 776 moves each of the fingers 210AF1, 210AF3 in the direction LON in a fixed relationship. As an example, the linear actuator 776 is common to both fingers 210AF1, 210AF3 and includes a stepper motor 776M (or other suitable motor) and a lead screw 776S having a right handed lead screw portion 776R, and a left handed lead screw portion 776L, where the lead screw 776S is coupled to the stepper motor. One of the fingers 210AF1, 210AF3 is coupled to the right handed lead screw portion 776R and the other of the fingers 210AF1, AF3 is coupled to the left handed lead screw portion 776L so that as the stepper motor simultaneously rotates both the left and right handed lead screw portions 776L, 776R in a first rotation direction the fingers 210AF1, 210AF2 move away from each other and away from the finger 210AF2 to increase the distance 760A, 760B between the fingers to any suitable increased distance 760A', 760B', 760A", 760B". As the stepper motor 776M simultaneously rotates both the left and right handed lead screw portions 776L, 776R in a second rotation direction (opposite the first rotation direction) the fingers 210AF1, 210AF2 move towards each other and towards the finger 210AF2 to decrease the distance 760A', 760B' between fingers to distance 760A, 760B or decrease the distance 760A", 760B" between the fingers to distance 760A', 760B' or 760A, 460B or any other suitable distance. The distances 460A, 760B, 760A', 760B', 760A", 760B" correspond with a size of a case unit to be picked/transferred (see FIGS. 8A-8C where case units having a length/width of 6 inches, 14 inches and 24 inches are illustrated but in other aspects the case units may have any suitable lengths/widths), a spacing between protrusions 620 of the justification tray 600 (FIGS. 7A and 7B), and/or a spacing between slats 900S of case unit supports 900 (FIG. 9A) at a case unit holding location. As noted above, where a single actuator drives movement of the fingers 210AF1, 210AF3 the distance 760A' is substantially the same as distance 760B' and the distance 760A" is substantially the same as distance 760B"; however, the distance 760A' may be different than distance 760B' and the distance 760A" may be different than distance 760B" where each finger 210AF1, 210AF3 is driven by its own respective actuator. In some aspects, the finger 210AF2 may also be driven along the finger support rail 273 in direction LON.

As may be realized, any suitable guide rails/slides 850 (FIG. 8A, 8B) are included with the linear actuator 776 along which the fingers 210AF1, 210AF3 travel so that the fingers 210AF1, 210AF3 are maintained in a predetermined orientation relative to the payload bed 210B and the fingers 210AF2 so as to define, with the finger 210AF2, a case unit support plane CUSP. The case unit support place CUSP being substantially parallel/coplanar with a case unit support plane CUSPH defined by the case unit supports 900 at a case unit holding location (FIG. 9A).

In one or more aspects, the actuator 776 and the finger 210AF2 are coupled to a carriage 773 so that the actuator 776 (and fingers 210AF1, 210AF3 coupled thereto) and finger 210AF2 move in direction LON along rail(s) 774 under impetus of actuator 775 (e.g., actuator moves the fingers 210AF1, 210AF2, 210AF3 and the actuator 776 in direction LON). The actuator 775 may be substantially similar to actuator 776 described herein. Here, the fingers 210AF1, 210AF2, 210AF3 move as a unit in direction LON so as to be positioned underneath (so as to underpick) payloads CU and transport the payloads CU that have been justified in direction LON anywhere within the payload bed 210B (such as by justification bars 222, 223 as described herein). The carriage 773 is sized to provide for longitudinal movement of the fingers as described herein and so that the fingers can be positioned anywhere within the payload bed 210B in direction LON and arranged relative to each other so as to pick any suitable size payload CU. In one or more aspects, the carriage 773 may be a telescoping carriage having telescoping sections 773TS that extend and retract to provide the range of motion of the outboard fingers 210AF1, 210F3 described herein, while allowing the fingers 210AF1, 210AF2, 21AF3 to move together in direction LON as a single unit. In one aspect, the telescoping sections 773TS of the carriage 773 may be extended and retracted in a manner substantially similar to that of the fingers illustrated in and described with respect to FIGS. 9A-10D; while in other aspects, the telescoping sections 773TS may be extended and retracted in any suitable manner so as to provide the range of motion (described herein) of the outboard fingers of the transfer arm 210A. Moving the fingers 210AF1, 210AF2, 210AF3 together as a unit (such as with carriage 773) in direction LON or moving each finger 210AF1, 210AF2, 210AF3 independently in direction LON provides for a justified pick/placement of payloads CU (e.g., a center justification or off-center justification) in the manner described herein, where the payloads CU are justified by the justification bars 222, 223.

Figure 7B:
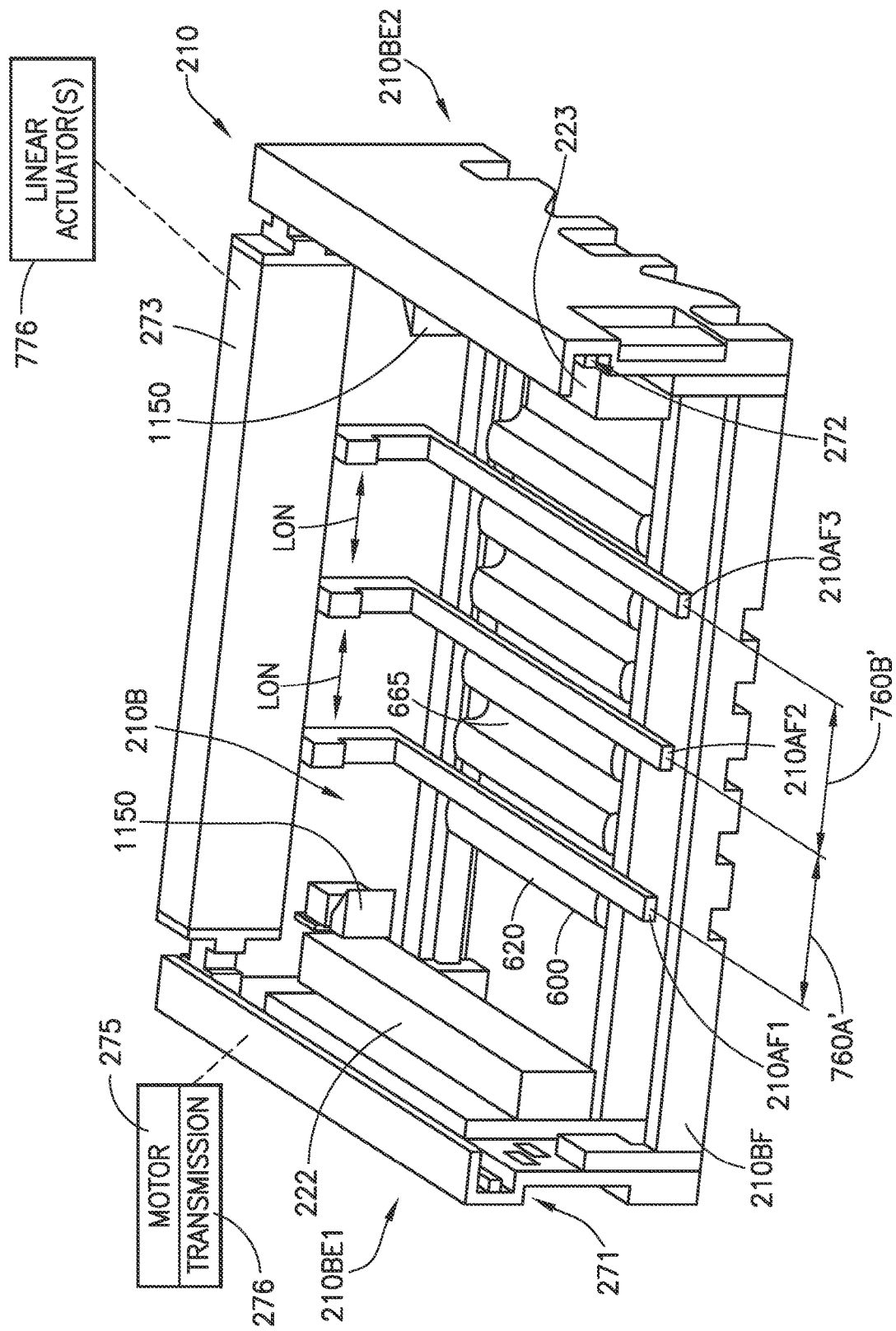
Figure 8A:
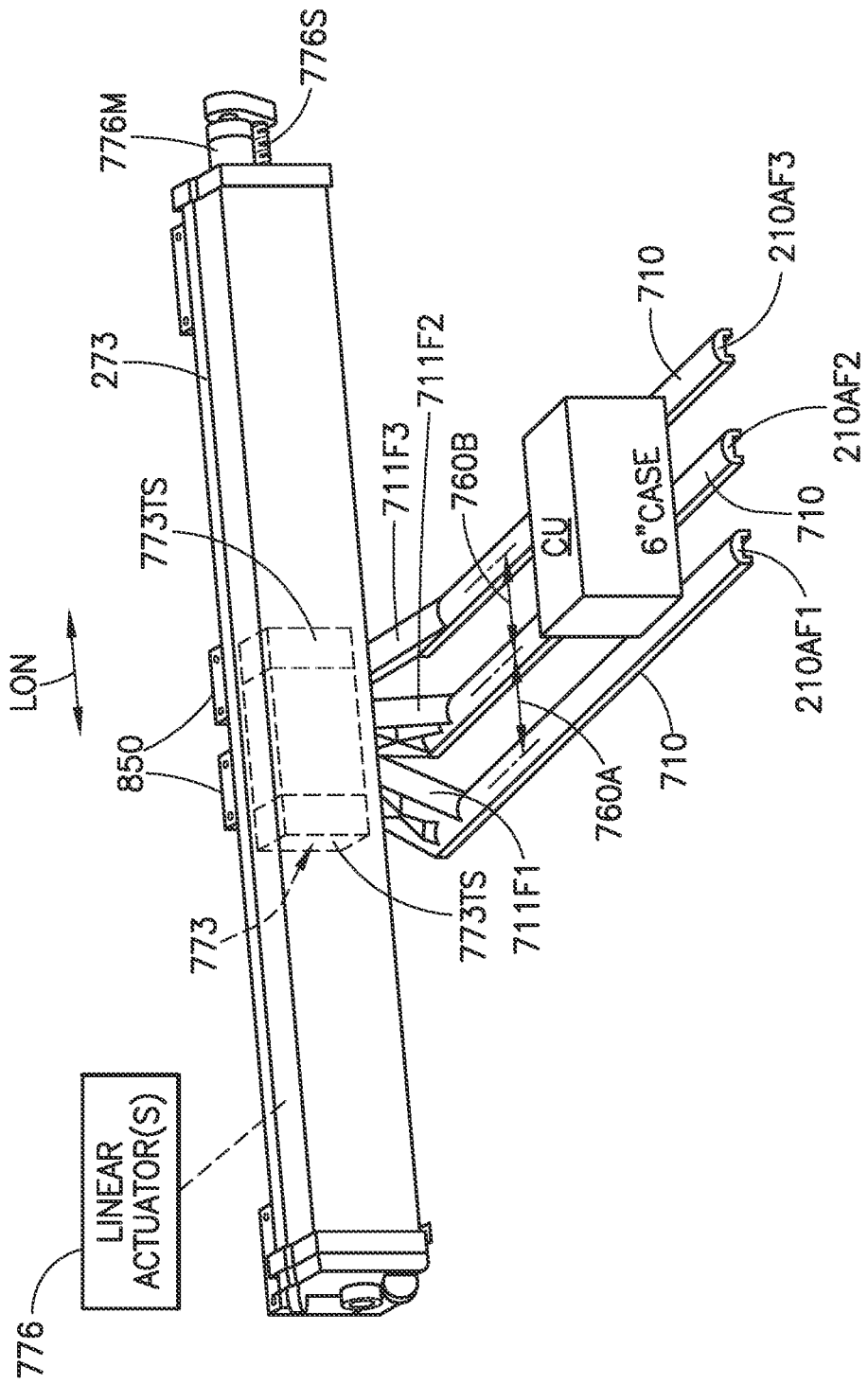
FIGS. 8A, 8B, and 8C are schematic perspective illustrations of a transfer arm of the case handling assembly of FIGS. 7A and 7B in accordance with aspects of the disclosed embodiment.
Figure 8B:
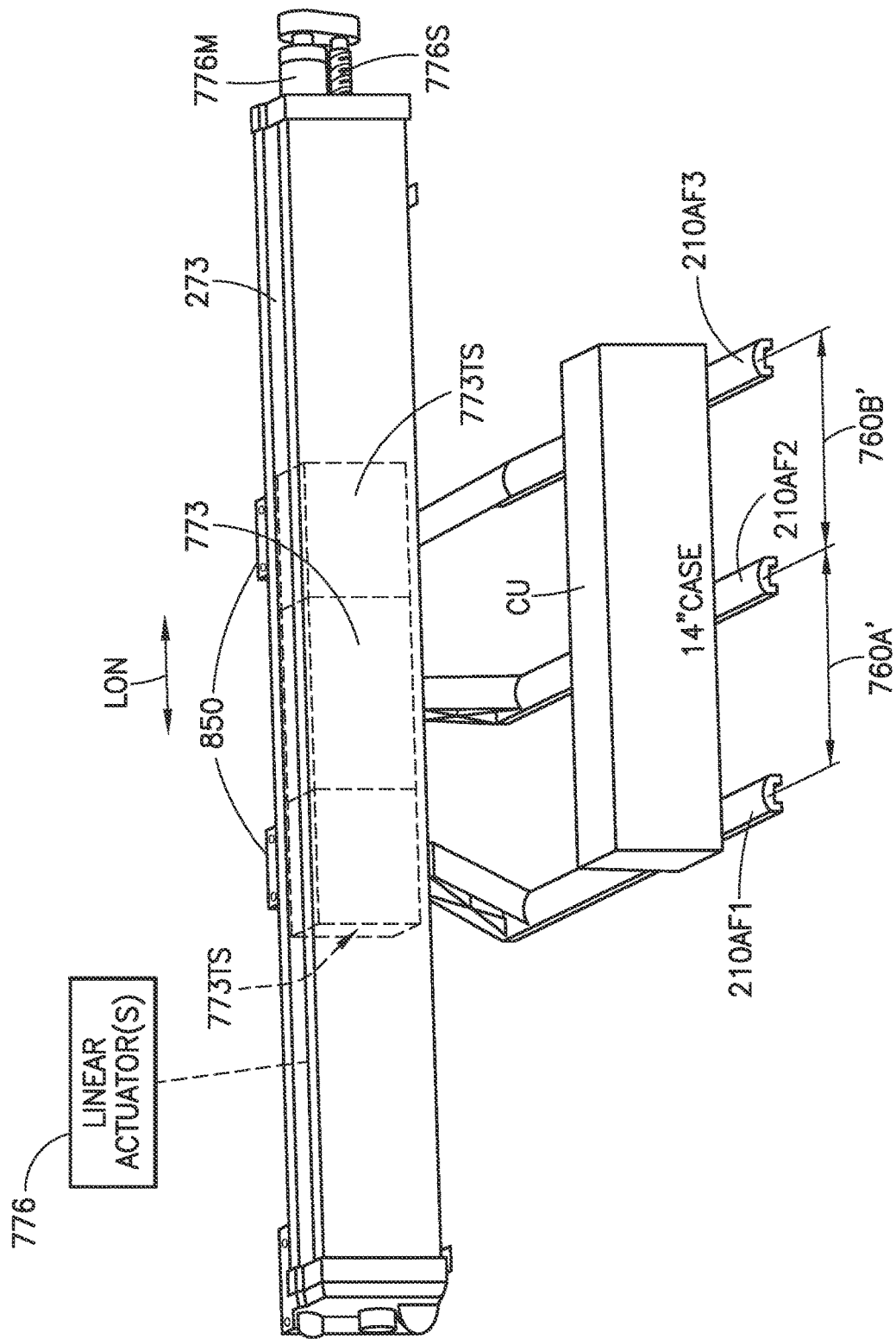
Figure 8C:
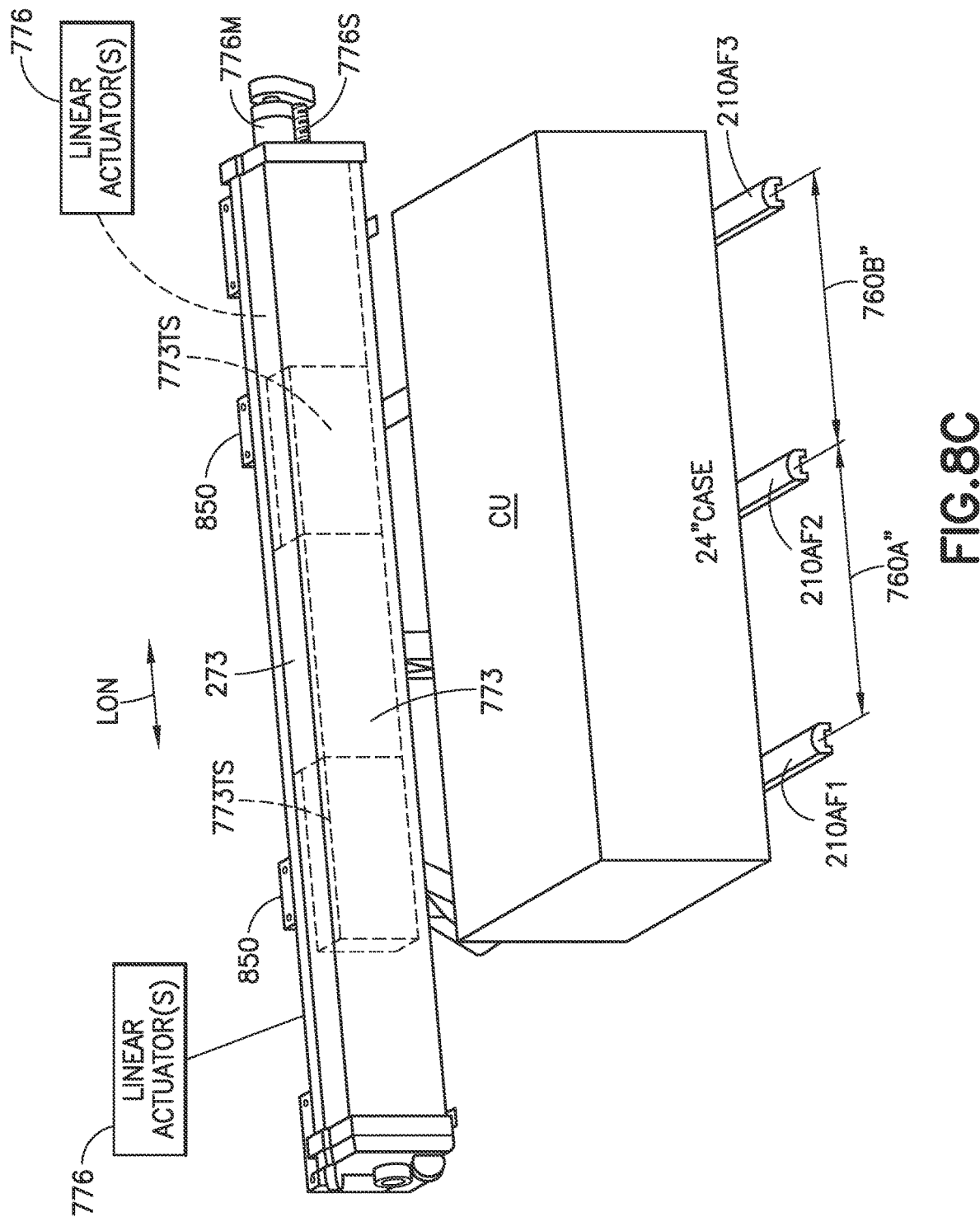

In FIGS. 7A and 7B each finger 210AF1, 210AF2, 210AF3 includes a product support 710 and a coupling 711 that couples the product support to the finger support rail 273. In FIGS. 7A and 7B the couplings 711 of the fingers 210AF1, 210AF2, 210AF3 are substantially parallel with each other, however in other aspects, the coupling 711 of one or more fingers 210AF1, 210AF2, 210AF3 is angled with respect to another coupling of another of the fingers 210AF1, 210AF2, 210AF3 as shown in FIGS. 8A-8C. In the example shown in FIGS. 8A-8C, the couplings 711G1, 711F3 of the fingers 210AF1, 201AF3 are angled towards each other and the coupling 711F2 of finger 210AF2. This coupling configuration decreases the distance between the couplings at the connection between the fingers 210AF1, 210AF2, 210AF3 and the finger support rail 273, which in turn provides for a more compact linear actuator 776 and reduced weight/cost associated with such linear actuator 776. The movement of one or more of the fingers 210AF1, 210AF2, 210AF3 in direction LON also substantially prevents interference of the fingers 210AF1, 210AF2, 210AF3 with case units CU held at locations adjacent (e.g., neighboring case units) at a predetermined case unit holding location to/from which a case unit is to be placed/picked by the bot 110.

Figure 9A:
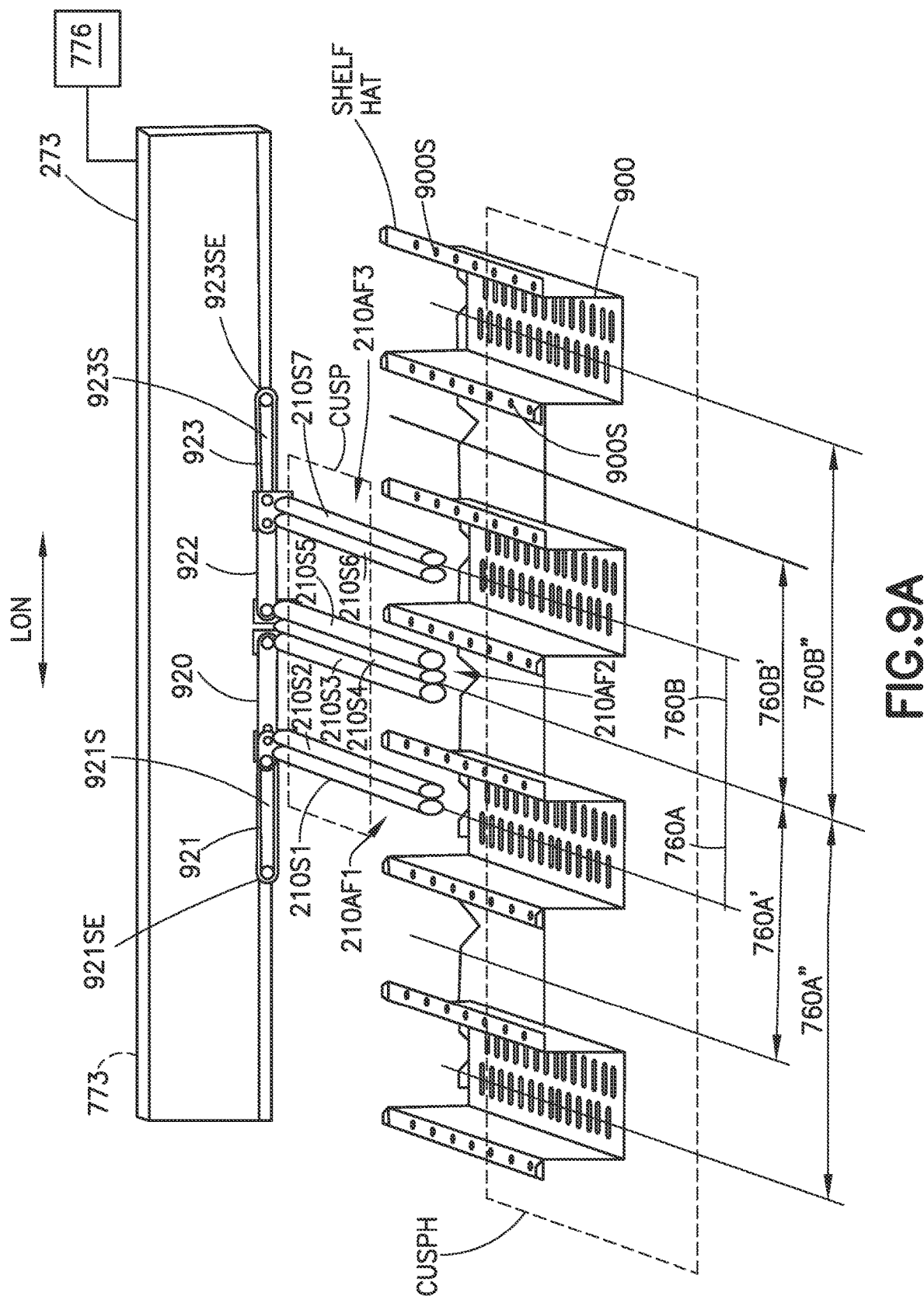
Figure 9B:
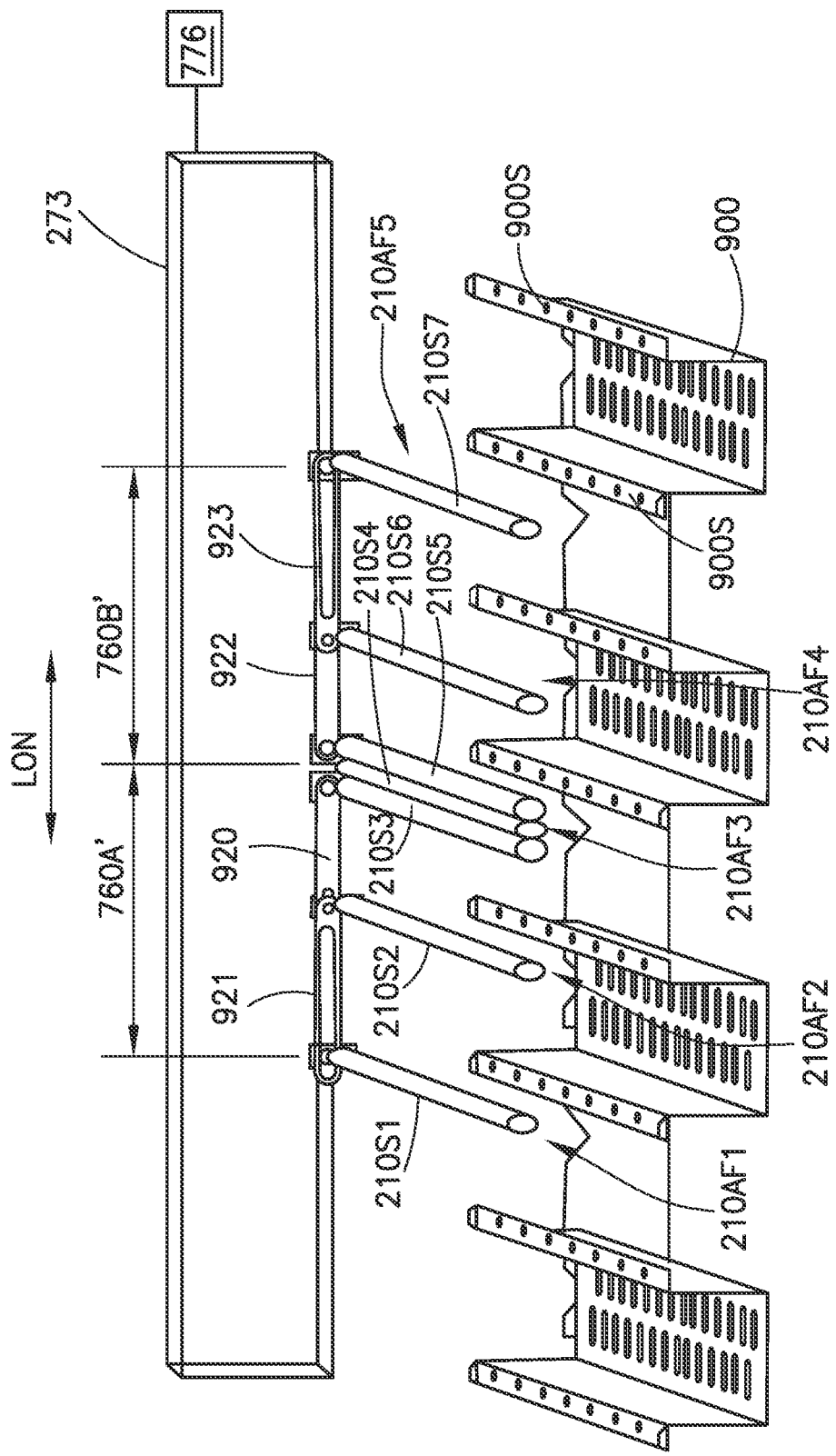

Referring to FIGS. 9A-9C, in one or more aspects the transfer arm 210A includes reconfigurable finger segments 210S1-210S7 which are each substantially similar to fingers 210AF described herein unless otherwise noted. The finger segments 210S1-210S7 are reconfigurable through operation of the linear actuator to change/reconfigure the number of fingers 210AF1-210AF7 the transfer arm 210A has. For example, in the aspects illustrated in FIGS. 9A-9C the finger segments 210S1-210S3 and 210S5-210S7 are movable in direction LON in a manner similar to that described above so as to increase or decrease the number of fingers. In FIG. 9A the transfer arm 210A is illustrated as having three fingers 210AF1-210AF3. Here finger segments 210S1-210S7 are disposed in segment groups so as to form finger 210AF1 (formed by finger segments 210S1, 210S2), finger 210AF2 (formed by finger segments 210S3, 210S4, 210S5), and finger 210AF3 (formed by finger segments 210S6, 210S7). In FIG. 9B the transfer arm 210A is illustrated as having five fingers 210AF1-210AF5 where finger segments 210S1-210S7 are disposed in segment groups so as to form finger 210AF1 (formed by finger segment 210S1), finger 210AF2 (formed by finger segments 210S2), finger 210AF3 (formed by finger segments 210S3, 210S4, 210S5), finger 210AF4 (formed by finger segment 210S6), and finger 210AF5 (formed by finger segments 210S7). In FIG. 9C the transfer arm 210A is illustrated as having seven fingers 210AF1-210AF7 (although in other aspects more or less than seven fingers may be provided) where finger segments 210S1-210S7 are disposed so that each finger segment 210S1-210S7 forms a respective finger 210AF1-210AF7.

In a manner similar to that described above, the finger segment 210S4 is stationarily fixed at a predetermined location on the finger support rail 273 (e.g., does not move relative to the finger support rail 273) such as at or along a laterally extending centerline 777 of the payload bed 210B. The other finger segments 210S1-210S3, 210S5-210S7 are movable along the finger support rail 273 in direction LON so as to place fingers 210AF1-210AF3 in FIG. 9A, fingers 210AF1-210AF5 in FIG. 9B, and fingers 210AF1-210AF7 in FIG. 9C at a respective distance 760A, 760B, 760A', 460B', 760A", 760B" relative to stationary finger segment 210S4; however, in other aspects the distance between adjacent finger segments may be any suitable distance that places the finger segments in spaces between slats 900S of the case unit supports 900 of a case unit holding location.

The movement of the finger segments 210A1-210S7 is effected in a manner similar to that described above with respect to FIGS. 7A-8C where finger segments 210S1 and 210S7 are coupled to, for example, a respective one of the left and right lead screws 776L, 776R. The movement of the finger segments 210S2, 210S3 in direction LON is slaved to the movement of finger segment 210S1 and the movement of the finger segments 210S5, 210S6 in the direction LON is slaved to the movement of finger segment 210S7. For example, finger segments 210S2, 210S3 are coupled to each other through a rigid link 920 so that the distance between the finger segments 210S2, 210S3 in direction LON is fixed (e.g., does not change). A slotted link 921 is coupled to the finger segment 210S2, where the slotted link 921 includes a slot 921S in which at least a portion of the finger segment 210S1 reciprocates in direction LON. Finger segments 210S5, 210S6 are coupled to each other through a rigid link 922 so that the distance between the finger segments 210S2, 210S3 in direction LON is fixed (e.g., does not change). A slotted link 923 is coupled to the finger segment 210S6, where the slotted link 923 includes a slot 923S in which at least a portion of the finger segment 210S7 reciprocates in direction LON. While links 920, 921 are described as being distinct links, in other aspects the links 920, 921 may be formed as a single one piece link that sets the distance between and couples finger segments 210S2, 210S3 and forms the slot 921S along which finger segment 210S1 reciprocates. Similarly, while links 922, 923 are described as being distinct links, in other aspects the links 922, 923 may be formed as a single one piece link that sets the distance between and couples finger segments 210S5, 210S6 and forms the slot 923S along which finger segment 210S7 reciprocates. As noted above, more than seven fingers can be provided, such that any suitable number of slaved fingers may be included on the transfer arm 210A and operate in a telescoping manner substantially similar to that describe herein.

Referring to FIGS. 9A-9C in sequence, FIG. 9A illustrates the finger segments 210S1-210S7 in a contracted configuration where finger segment 210S1 substantially abuts against finger segment 210S2, finger segments 210S3, 210S5 each are substantially abutted against finger segment 210S4, and finger segment 210S7 substantially abuts against finger segment 210S6. Linear actuator 776 is operated to simultaneously move the finger segment 210S7 in direction LON towards end 210BE2 (see FIG. 7A) of the payload bed 210B and move finger segment 210S1 in direction LON towards end 210BE1 of the payload bed 210B. As can be seen in FIG. 9B, movement of finger segment 210S1 towards end 210BE1 causes finger segment 210S1 to travel along the slot 921S until the finger segment 210S1 reaches distance 760A' so that finger segments 210S1, 210S2 are separated and reconfigured as fingers 210AF1, 210AF2. One or more of the rigid link 920, finger segment 210S2, and finger segment 210S3 is/are held in place by any suitable detent (e.g., biased ball and recess, etc.) or any suitable biasing member (e.g., spring) during movement of finger 210S1 to distance 760A'. Movement of finger segment 210S7 towards end 210BE2 causes finger segment 210S7 to travel along the slot 923S until the finger segment 21S7 reaches distance 760B' so that finger segments 210S6 and 210S7 are separated and reconfigured as fingers 210AF4, 210AF5. One or more of the rigid link 922, finger segment 210S5, and finger segment 210S6 is/are held in place by any suitable detent (e.g., biased ball and recess, etc.) or any suitable biasing member (e.g., spring) during movement of finger 210S7 to distance 760B'. It is noted that finger segments 210S3-210S5 are reconfigured as finger 210AF3.

As can be seen in FIG. 9C, further movement of finger 210S1 towards end 210BE1 in direction LON causes finger 210S1 to engage end 921SE of slot 921S. As finger segment 210S1 continues to move towards end 210BE1, while engaged with end 921SE, the finger segment 210S1 pulls finger segments 210S2, 210S3 towards end 210BE1 by virtue of the links 921, 920 (e.g., movement of the finger segments 210S2, 210S3 are slaved to the movement of finger segment 210S1). Here finger segments 210S1-210S3 are respectively reconfigured as fingers 210AF1-210AF3 and located at distances 760", 760A', 760A. Similarly, further movement of finger segment 210S7 towards end 210BE2 in direction LON causes finger 210S7 to engage end 923SE of slot 923S. As finger segment 210S7 continues to move towards end 210BE2, while engaged with end 923SE, the finger segment 210S7 pulls finger segments 210S5, 210S6 towards end 210BE2 by virtue of the links 922, 923 (e.g., movement of the finger segments 210S5, 210S6 are slaved to the movement of finger segment 210S1). Here finger segments 210S1-210S3 are respectively reconfigured as fingers 210AF5-210AF7 and located at distances 760B, 760B', 760B". It is noted that finger segment 210S4 is reconfigured as finger 210AF4. As may be realized, reconfiguration of the finger segments from fingers 210AF1-210AF7 to fingers 210AF1-210AF5 and from 210AF1-210AF5 to 210AF1-210AF3 occurs in a substantially reverse manner to that described above, where a retracted movement of finger segments 210S1, 210S7 causes finger segment 210S1 to substantially abut finger segment 210S2 and push finger segments 210S2, 210S3 towards finger segment 210S4 and causes finger segment 210S7 to substantially abut finger segment 210AS6 and push finger segments 210S5, 210S6 towards finger segment 210S4.

Figure 10A:
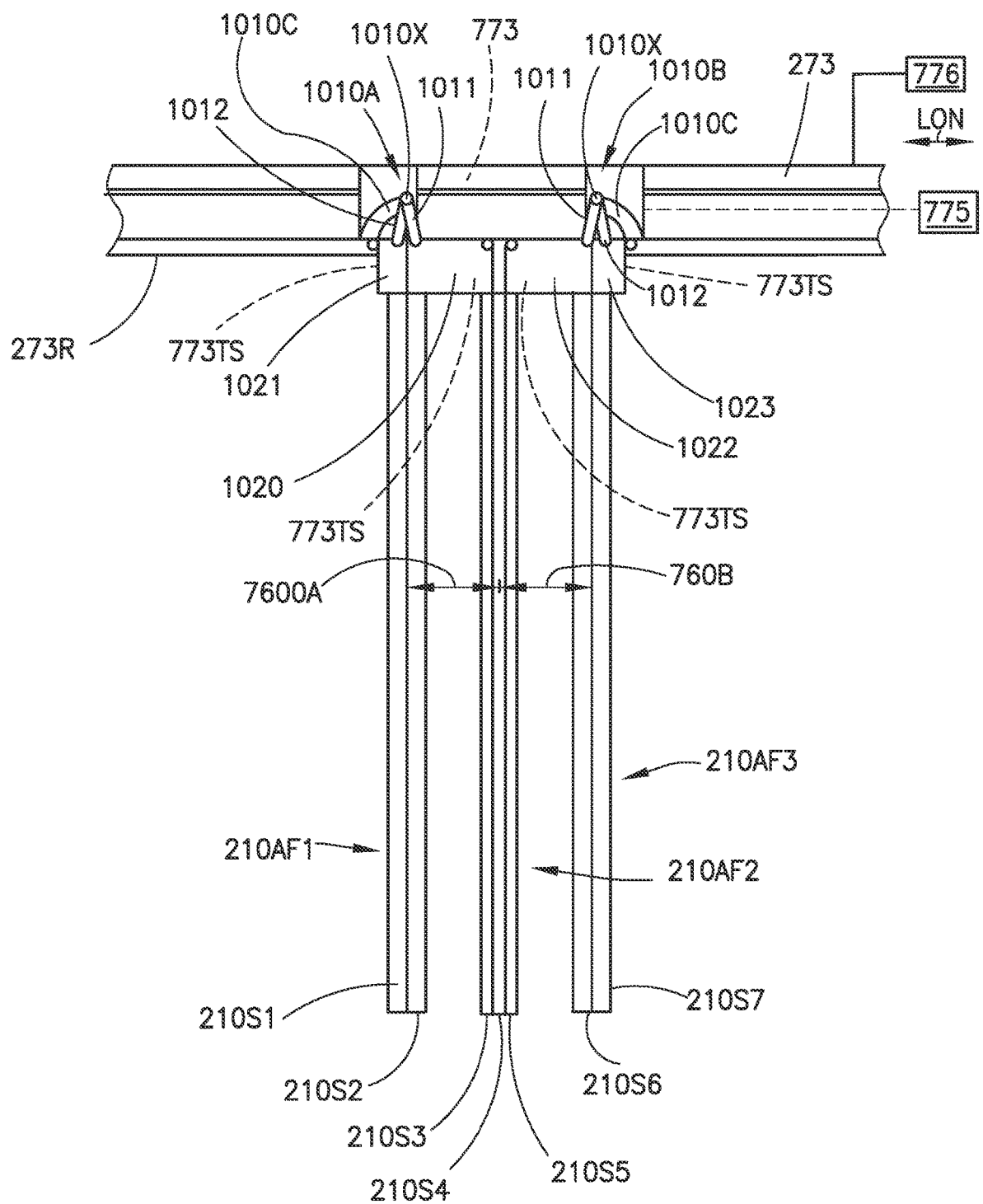
FIGS. 10A, 10B, 10C, and 10D are schematic perspective illustrations of a transfer arm of the case handling assembly of FIGS. 7A and 7B in accordance with aspects of the disclosed embodiment.

Referring to FIGS. 10A-10D in sequence, FIG. 10A illustrates the finger segments 210S1-210S7 in a contracted configuration substantially similar to that of FIG. 9A where finger segment 210S1 substantially abuts against finger segment 210S2, finger segments 210S3, 210S5 each are substantially abutted against finger segment 210S4, and finger segment 210S7 substantially abuts against finger segment 210S6. However, in the aspect illustrated in FIGS. 10A-10C the respective coupling between the finger segment 210S1 and finger segment 210S2 and between finger segment 210S6 and finger segment 210S7 is an articulated link coupling 1010A, 1010B. For example, finger segment 210S1 is coupled to a rail 273R of the finger support rail 273 by slide 1021. Finger segments 210S2, 210S3 are coupled to the rail 273R by slide 1020 so that finger segments 210S2, 210S3 are spaced a predetermined distance from each other in a manner substantially similar to that described with respect to FIGS. 9A-9C. Finger segment 210S7 is coupled to a rail 273R of the finger support rail 273 by slide 1023. Finger segments 210S5, 210S6 are coupled to the rail 273R by slide 1022 so that finger segments 210S5, 210S6 are spaced a predetermined distance from each other in a manner substantially similar to that described with respect to FIGS. 9A-9C. The articulated link coupling 1010A includes a first link 1011 and a second link 1012. The first link 1011 is pivotally coupled at a proximate end to slide 1020 about axis 1010X1 (See FIG. 10D with respect to articulated link coupling 1010B which is substantially similar to articulated link coupling 1010A). A proximate end of the second link 1012 is pivotally coupled to a distal end of the first link 1011 at axis 1010X. A distal end of the second link 1012 is pivotally coupled to the slide 1021 about axis 1010X2 (see FIG. 10D with respect to slide 1023). The axis 1010X is guided in movement so as to fold in a direction opposite the slides 1020, 1021 by guide channel 1010C. For example, the axis 1010X includes a post or pin 1099 (see FIG. 10D) that extends within and follows the guide channel 1010C so that when folded guidance of the axis 1010X along the channel 1010C substantially prevents binding/locking of the first link 1011 and the second link 1012 and positions the axis 1010X so that the first link 1011 and the second link 1012 are in an opposing spatial relationship with the finger segments 210S1, 210S2.

Similarly, the articulated link coupling 1010B includes a first link 1011 and a second link 1012. The first link 1011 is pivotally coupled at a proximate end to slide 1022 about axis 1010X1. A proximate end of the second link 1012 is pivotally coupled to a distal end of the first link 1011 at axis 1010X. A distal end of the second link 1012 is pivotally coupled to the slide 1023 about axis 1010X2. The axis 1010X is guided in movement so as to fold in a direction opposite the slides 1020, 1021 by guide channel 1010C. For example, the axis 1010X includes a post or pin 1099 (FIG. 10D) that extends within and follows the guide channel 1010C so that when folded guidance of the axis 1010X along the channel 1010C substantially prevents binding/locking of the first link 1011 and the second link 1012 and positions the axis 1010X so that the first link 1011 and the second link 1012 are in an opposing spatial relationship with the finger segments 210S6, 210S7.

Figure 10B:
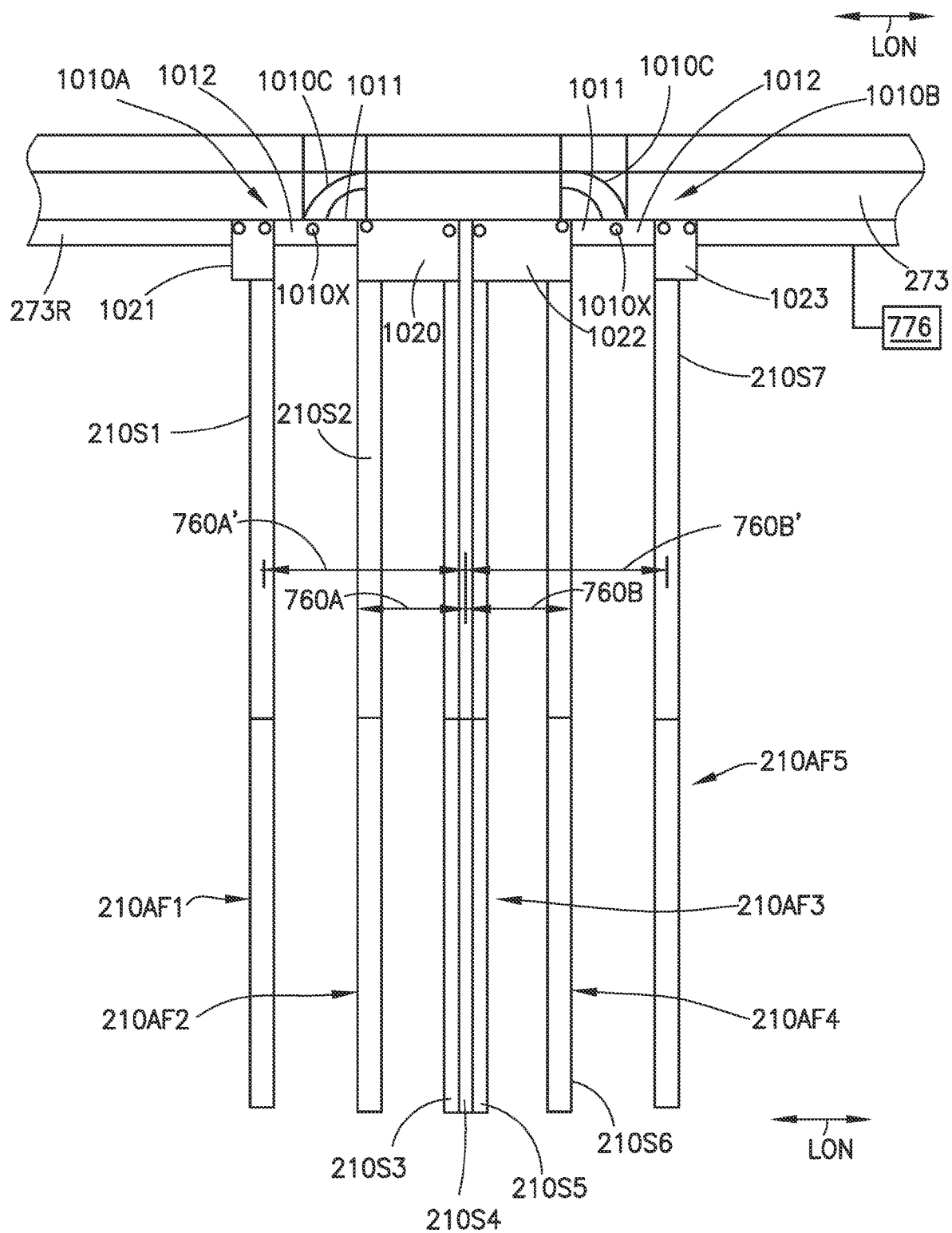

In a manner similar to that described above, the finger segments 210A1, 210S7 are simultaneously opposingly driven along the finger support rail 273 in direction LON so as to move towards and away from each other. For example, linear actuator 776 is operated to simultaneously move the finger segment 210S7 in direction LON towards end 210BE2 (see FIG. 7A) of the payload bed 210B and move finger segment 210S1 in direction LON towards end 210BE1 of the payload bed 210B. As can be seen in FIG. 10B, movement of the finger segment 210S1 (and the slide 1021 to which the finger segment 210S1 coupled) towards end 210BE1 causes the finger segment 210S1 to travel along the rail 273 (e.g., unfolding the first link 1011 and the second link 1012, of the articulated link coupling 1010A, relative to each other) until the finger segment 210S1 reaches the distance 760A' so that finger segments 210S1, 210S2 are separated and reconfigured as fingers 210AF1, 210AF2. One or more of the slide 1020 to which finger segments 210S2, 210S3 are coupled, finger segment 210S2, and finger segment 210S3 is/are held in place by any suitable detent (e.g., biased ball and recess, etc.) during movement of finger segment 210S1 to distance 760A'. Movement of finger segment 210S7 (and the slide 1023 to which it is coupled) towards end 210BE2 causes finger segment 210S7 to travel along the rail 273 (e.g., unfolding the first link 1011 and the second link 1012, of the articulated link coupling 1010A, relative to each other) until the finger segment 210S7 reaches distance 760B' so that finger segments 210S6 and 210S7 are separated and reconfigured as fingers 210AF4, 210AF5. One or more of the slide 1022 to which the finger segments 210S5, 210S6 are coupled, finger segment 210S5, and finger segment 210S6 is/are held in place by any suitable detent (e.g., biased ball and recess, etc.) during movement of finger 210S7 to distance 760B'. It is noted that finger segments 210S3-210S5 are reconfigured as finger 210AF3.

Figure 10C:
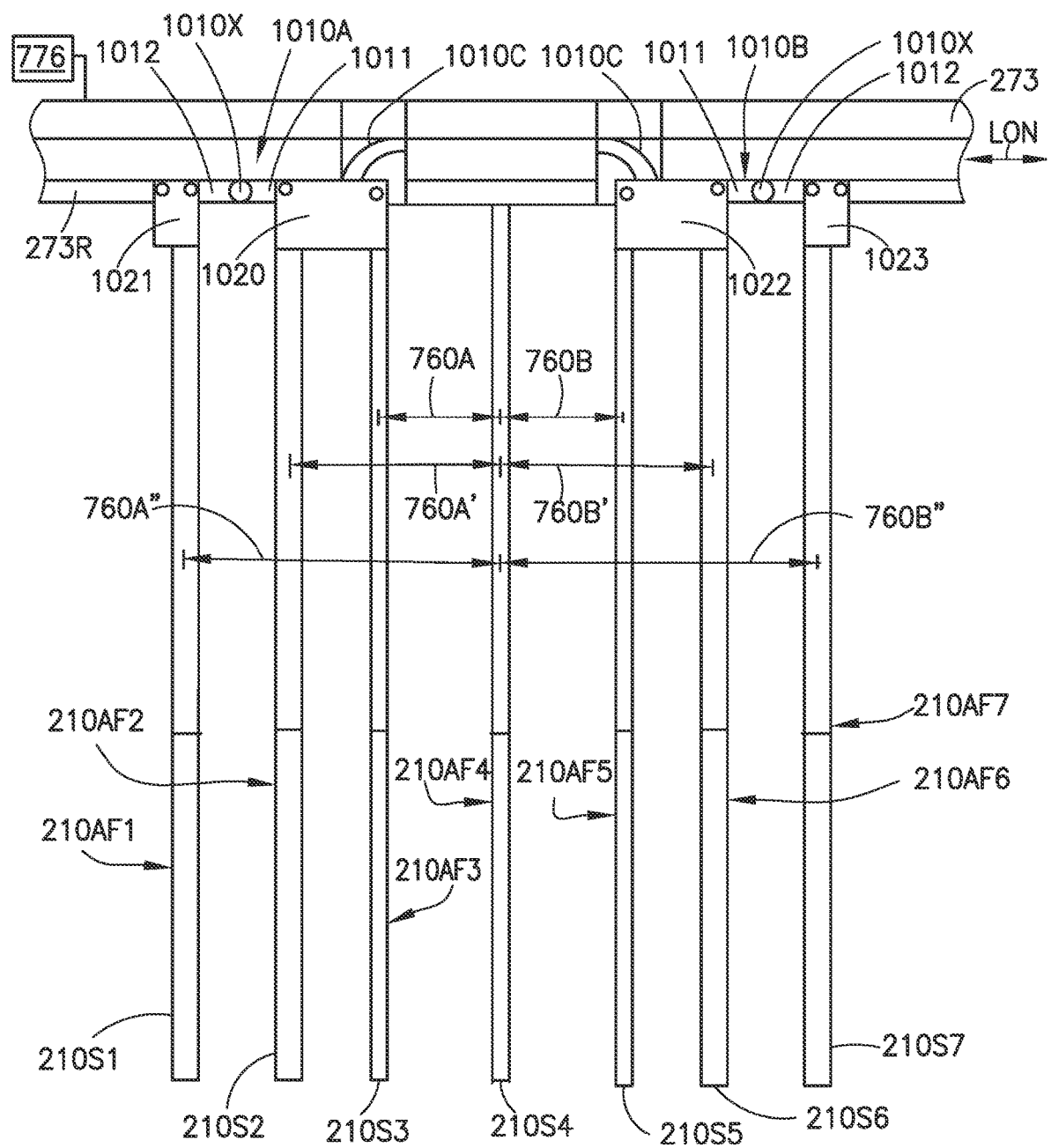
Figure 10D:
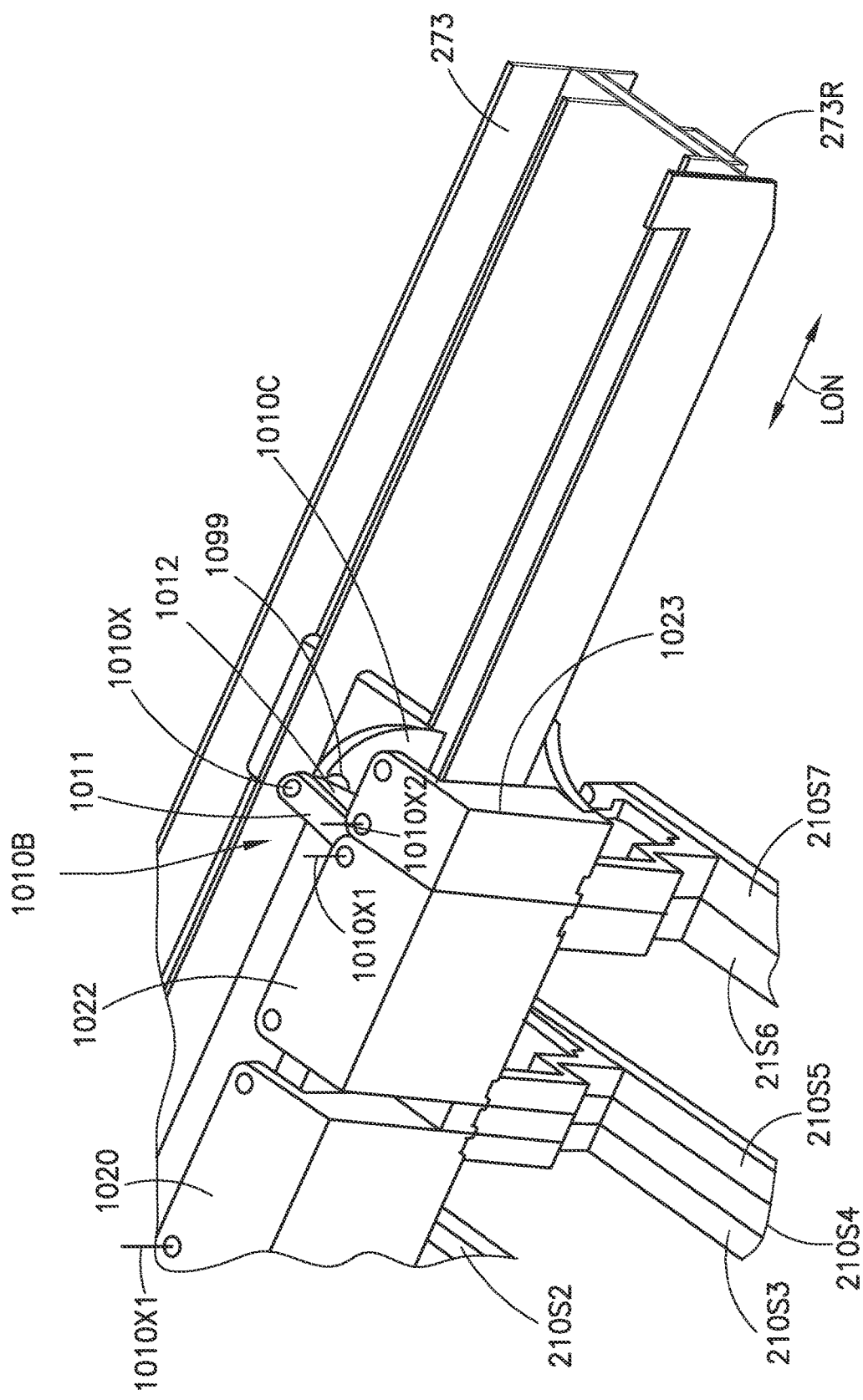

As can be seen in FIG. 10C, further movement of finger 210S1 towards end 210BE1 in direction LON causes finger 210S1/slide 1021 to pull the slide 1020 (and finger segments 210S2, 210S3 coupled thereto) towards end 210BE1 by virtue of the unfolded articulated link coupling 1010A (e.g., movement of the finger segments 210S2, 210S3 are slaved to the movement of finger segment 210S1). Here finger segments 210S1-210S3 are respectively reconfigured as fingers 210AF1-210AF3 and located at distances 760", 760A', 760A. Similarly, further movement of finger 210S7 towards end 210BE2 in direction LON causes finger segment 210S7/slide 1023 towards end 210BE2 to pull slide 1022 (and finger segments 210S5, 210S6 coupled thereto) towards end 210BE2 by virtue of the unfolded articulated link coupling 1010B (e.g., movement of the finger segments 210S5, 210S6 are slaved to the movement of finger segment 210S1). Here finger segments 210S1-210S3 are respectively reconfigured as fingers 210AF5-210AF7 and located as distances 760B, 760B', 760B". It is noted that finger segment 210S4 is reconfigured as finger 210AF4. As may be realized, reconfiguration of the finger segments from fingers 210AF1-210AF7 to fingers 210AF1-210AF5 and from 210AF1-210AF5 to 210AF1-210AF3 occurs in a substantially reverse manner to that described above, where a retracted movement of finger segments 210S1, 210S7 causes finger segment 210S1 to substantially abut finger segment 210S2 and push finger segments 210S2, 210S3 towards finger segment 210S4 and causes finger segment 210S7 to substantially abut finger segment 210AS6 and push finger segments 210S5, 210S6 towards finger segment 210S4.

Referring to FIGS. 2A, 2B, 2E, 2F, 7A, and 7B, in one or more aspects the case handling assembly 210 includes case unit justification. Here at least one justification bar 222, 223 is movably coupled to the payload bed frame 210B in any suitable manner so that the at least one justification bar 222, 223 moves in direction LON to position case unit CU in a predetermined location within the payload bed 210B relative to the longitudinal axis LAX of the bot 110. In the example illustrated there are two justification bars 222, 223, both of which move in the direction LON so as to at least move towards and away from each other; however, in other aspects one of the justification bars 222, 223 is stationarily fixed in direction LON while the other justification bar 222, 223 moves in direction LON towards and away from the stationarily fixed justification bar 222, 223. As described herein, the justification bars 222, 223 may be independently driven. Independently driving each justification bar 222, 223 provides for justification of case units at any position within the payload bay 210B. The case unit CU can be positioned off center (e.g., relative to a centerline of the payload bed 210B in direction LAT). Positioning a case unit CU off center in the payload bay 210B provides for a continuous equal gap between cases units on a storage shelf, which improves storage density.

In one or more aspects, the justification bars 222, 223 are coupled to one or more linear guide rails 225 of the payload bed frame 210BF. The justification bars 222, 223 are coupled to any suitable drive motor(s) 226 and transmission(s) 227 which in one aspect is/are similar to the drive motor 275 and transmission 276 that drives the movable finger segments described herein. For example, in one or more aspects a single drive motor 226 drives movement of both the justification bars 222, 2223 where the drive motor 226 is a stepper motor or any other suitable motor coupled to a lead screw in a manner similar to that described above with respect to the finger segments. Here one end of the lead screw (e.g., transmission 227) has right hand threads and the other end of the lead screw has left hand threads. Each justification bar 222, 223 includes a nut that engages a respective one of the right hand threads and left hand threads of the lead screw so that as the drive motor 275 turns the lead screw in a first rotation direction the justification bars 222, 223 move towards each other (and towards a longitudinal centerline CL of the payload bed 210B) and as the drive motor 275 turns the lead screw in a second opposite rotation direction (i.e., opposite the first rotation direction) justification bars 222, 223 move away from each other (e.g., justification bar 222 moves towards end 200BE1 of the payload bed 210B and justification bar 223 moves towards end 200BE2 of the payload bed 210B). Here both justification bars 222, 223 are driven by the a single (i.e., the same) drive motor 226 and transmission 227 (the drive motor and transmission are common to both justification bars 222, 223); however, in other aspects, the bot 110 includes two drive motors 226 and at least one transmissions 227 (i.e., a transmission for each justification bar 222, 223 or a common (i.e., one) transmission for each justification bar 222, 223) so each justification bar 222, 223 is driven by a respective motor and transmission to move in direction LON independent of movement of the other justification bar 222, 223 (here justification of cases unit is not limited to a "center justification" relative to the centerline CL of the payload bed, instead the case units can be justified to any location between the ends 210BE1, 210BE2 of the payload bed 210B).

Figure 2E:
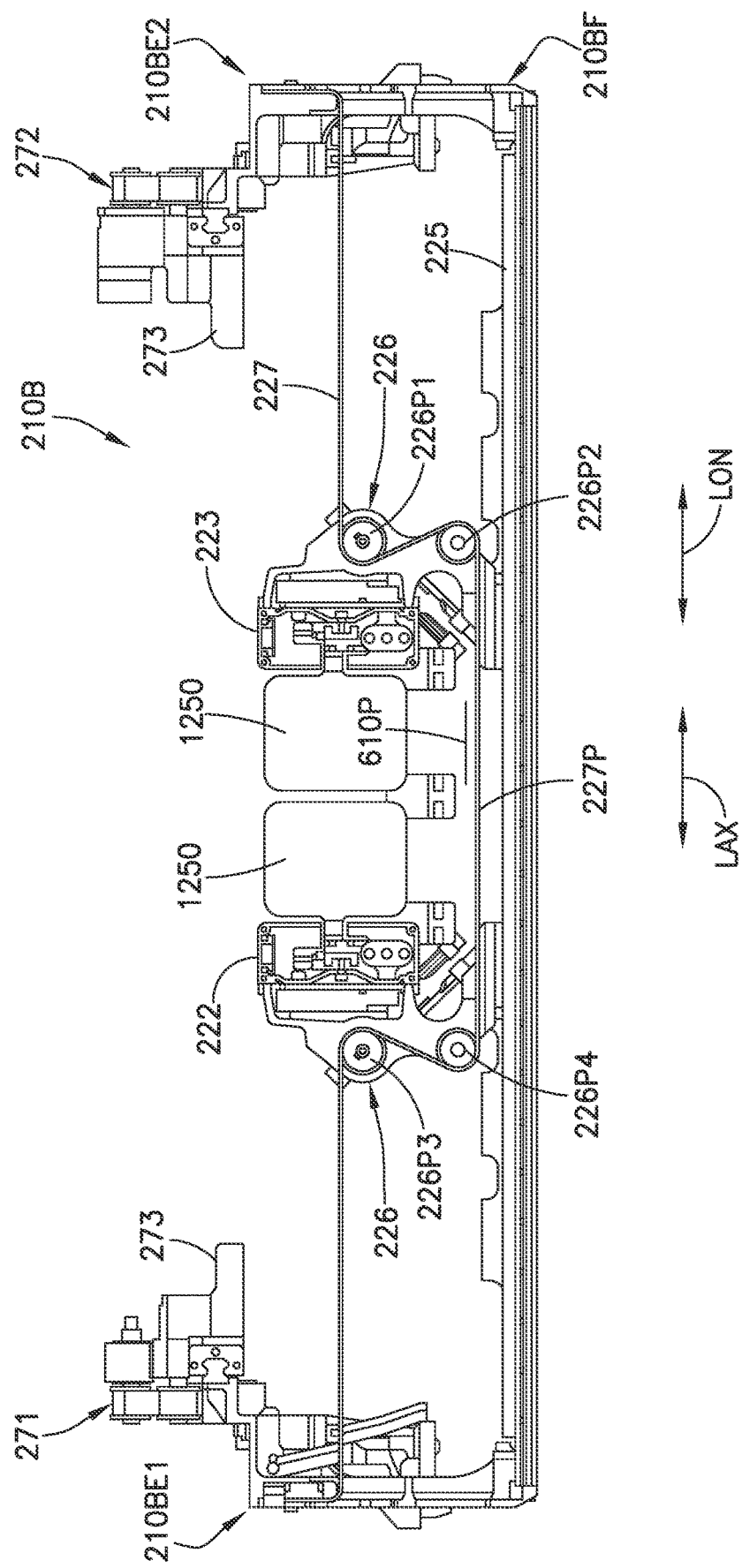
FIG. 2E is an exemplary schematic side illustration of a portion of the autonomous guided vehicle of FIGS. 2A-2D incorporating aspects of the disclosed embodiment.
Figure 2F:
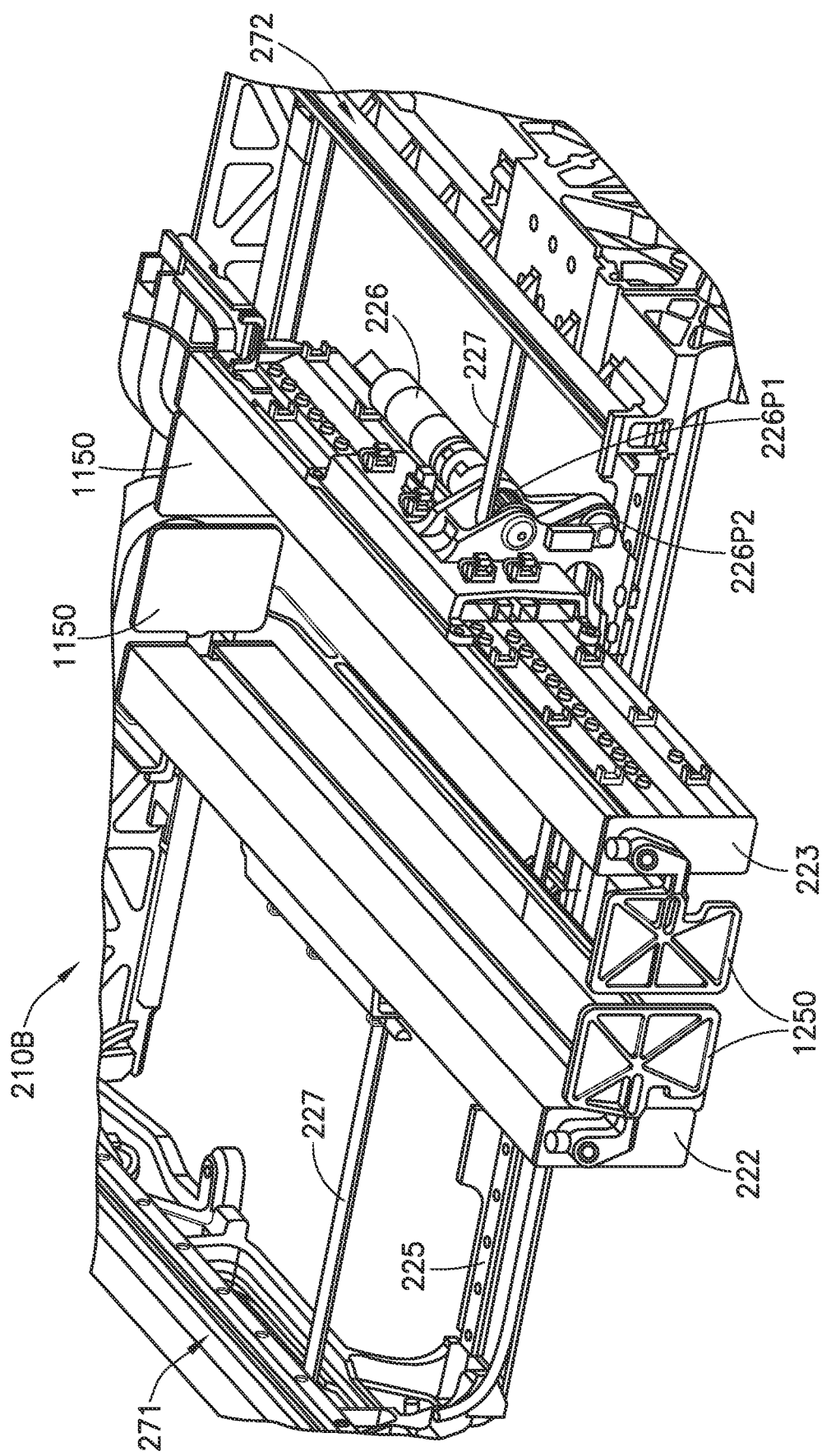
FIG. 2F is an exemplary perspective illustration of a portion of the autonomous guided vehicle of FIGS. 2A-2D incorporating aspects of the disclosed embodiment.

FIGS. 2E and 2F illustrate an example of employing two drive motors 226 to independently move each justification bar 222, 223 in direction LON so as to justify payloads CU anywhere along direction LON within the payload bed 210B. In this example, each justification bar 222, 223 includes a respective motor 226 that is coupled to a common stationary transmission 227. Here the transmission 227 is a flexible transmission similar to flexible transmission 330 described herein. One end of the transmission 227 is fixedly coupled to the end 210BE1 of the frame 210BF of the payload bed 210B in any suitable manner (e.g., clamp, removable fastener, clip, etc.). The opposite end of the transmission 227 is fixedly is fixedly coupled to the opposite end 210BE2 of the frame 210BF of the payload bed 210B in any suitable manner (e.g., clamp, removable fastener, clip, etc.). The justification bar 222 includes motor 226 that is mounted to and carried by the justification bar 222 in any suitable manner. The justification bar 222 also includes a drive pulley 226P3 that is coupled to and driven by the motor 226. An idler pulley 226P4 is coupled to the justification bar 222 below the drive pulley 226P3 and is positioned relative to the justification tray 600 so as to at least partially extend below the payload support plane 610P of the payload bay 210B. The justification bar 223 is similarly configured such that justification bar 223 includes the motor 226 that is mounted to and carried by the justification bar 223 in any suitable manner, a drive pulley 226P1 is coupled to and driven by the motor 226, and an idler pulley 226P2 is coupled to the justification bar 223 below the drive pulley 226P1 and is positioned relative to the justification tray 600 so as to at least partially extend below the payload support plane 610P of the payload bay 210B.

The flexible transmission is wrapped around the pulleys 226P1, 226P2 and the pulleys 226P3, 226P4 in a serpentine manner so that a portion 227P of the transmission 227 extends beneath the payload support plane 610P of the payload bay 210B. The serpentine arrangement of the transmission 227 around pulleys 226P1, 226P2 also provides for engagement of the drive pulley 226P1 with the transmission 227 so that as the motor 226 (of justification bar 223) rotates the drive pulley 226P1 the justification bar 223 moves in direction LON independent of movement of justification bar 222. Similarly, the serpentine arrangement of the transmission 227 around pulleys 226P3, 226P4 provides for engagement of the drive pulley 226P3 with the transmission 227 so that as the motor 226 (of justification bar 222) rotates the drive pulley 226P3 the justification bar 222 moves in direction LON independent of movement of justification bar 223.

Justification of the case units CU on the payload bed 210B in the direction LON provides for a known location of the case units CU on the bot 110 that effects placement of case units CU at predetermined locations at case unit holding locations. Justification of one or more case units CU is performed by the at least one justification bar 222, 223 with the one or more case units CU held on (supported by) the fingers 210AF of the transfer arm 210A or with the one or more case units CU held on (supported by) the justification tray 600. In one or more aspects, the justification tray 600 includes channels 677, 678 that provide a running clearance in direction LON for the coupling between the at least one justification bar 222, 223 and the linear guide rail 225 (and transmission 276 coupling to the at least one justification bar 222, 223). While the at least one linear guide rail 225 is illustrated as being substantially centered in the payload bed 210B and extending in direction LON, in other aspects, the at least one linear guide rail 225 is positioned in any suitable location in the payload bed 210B and/or on the transfer arm 210A for providing movement of the justification bars 222, 223 in direction LON. In one or more aspects, at least a portion of the justification bars 222, 223 is moveable in direction LAT so as to extend at least partially out of an area bounded by the payload bed 210B.

Here, the independent movement of the justification bars 222, 223 provides for justification of payloads CU at any position along direction LON within the payload bed to, for example, provide for a continuous equal gap between cases units on a storage shelf, which improves storage density. As described above, the underpick end effector or transfer arm 210A is employed with the justification bars 222, 223 to transfer payloads CU to and from the payload bed 210B at a justified (e.g., in direction LON) position. In one aspect the fingers 210AF of the transfer arm 210A may be retracted into the payload bed 210B with a payload CU thereon so as to roughly position the payload CU in a predetermined justification position in direction LON. The retract movement of the fingers 210AF and payload CU thereon may be a compound movement in both directions LON and LAT so that the payload CU may be registered in the two degrees of registration substantially coincident with seating of the payload CU in the payload bed 210B and substantially coincident upon completion of the transfer arm 210A retract movement (as described herein). In one or more aspects, the support surface 210AFS of the fingers 210AF form a support plane on which the payload CU is registered with two degrees of registration, where the justification bars 222, 223, pushers 1150, and/or tabs 1250 with the fingers 210AF effect the registration of the payload CU in the two degrees of registration. With the payload CU seated in the payload bed 210B (e.g., seated on the fingers 210AF or on the justification tray 600) the justification bars 222, 223 may be independently moved to fine tune the justification position of the payload relative to the fingers 210AF and the storage locations 130S or other holding location) so that upon placement of the payload CU by the vehicle 110 at a storage space 130S, (or other holding location) a spacing between side by side payloads in the storage spaces 130S may be maintained at a minimum (equal) spacing to increase storage density as described herein.

Figure 11A:
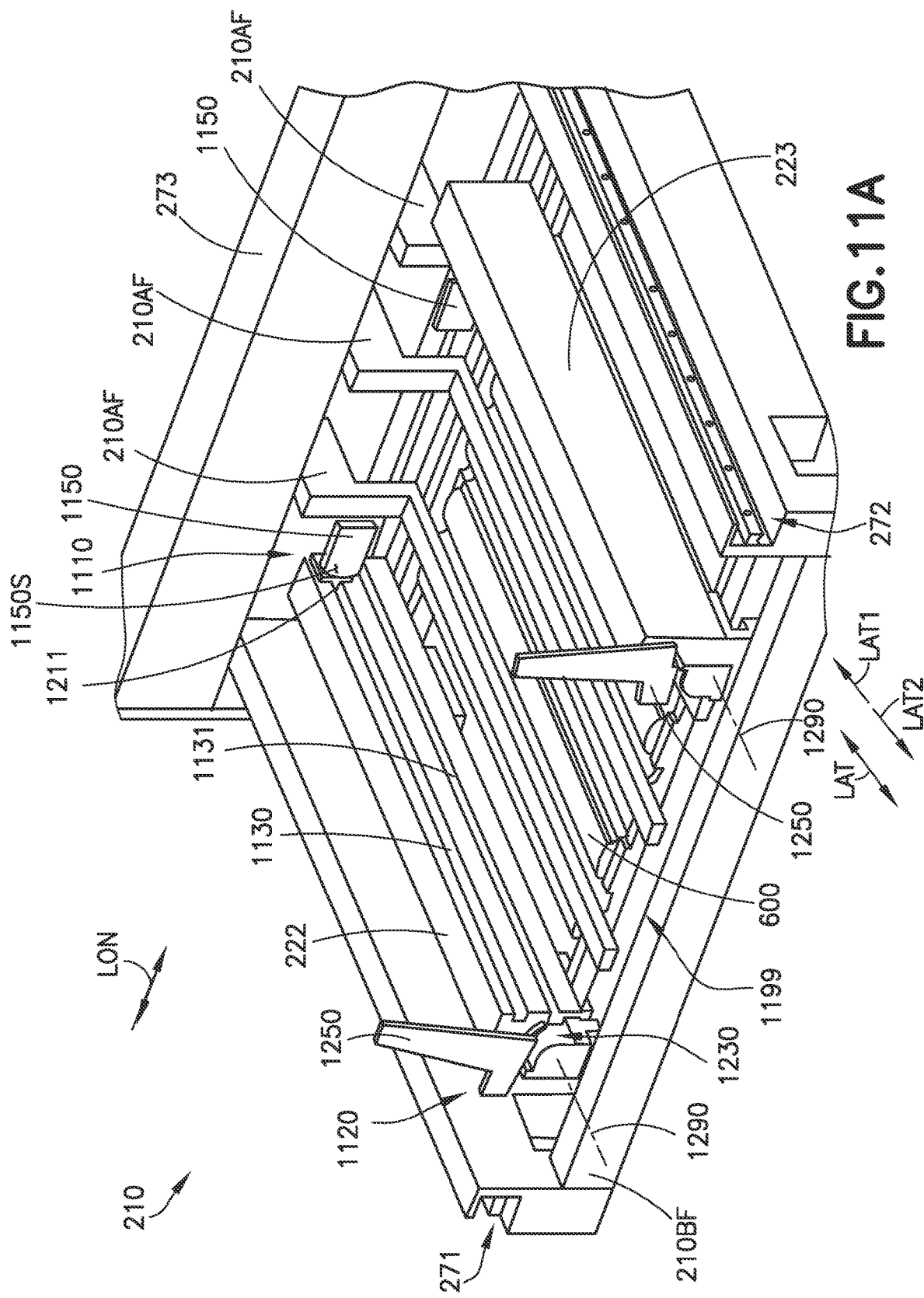
Figure 11C:
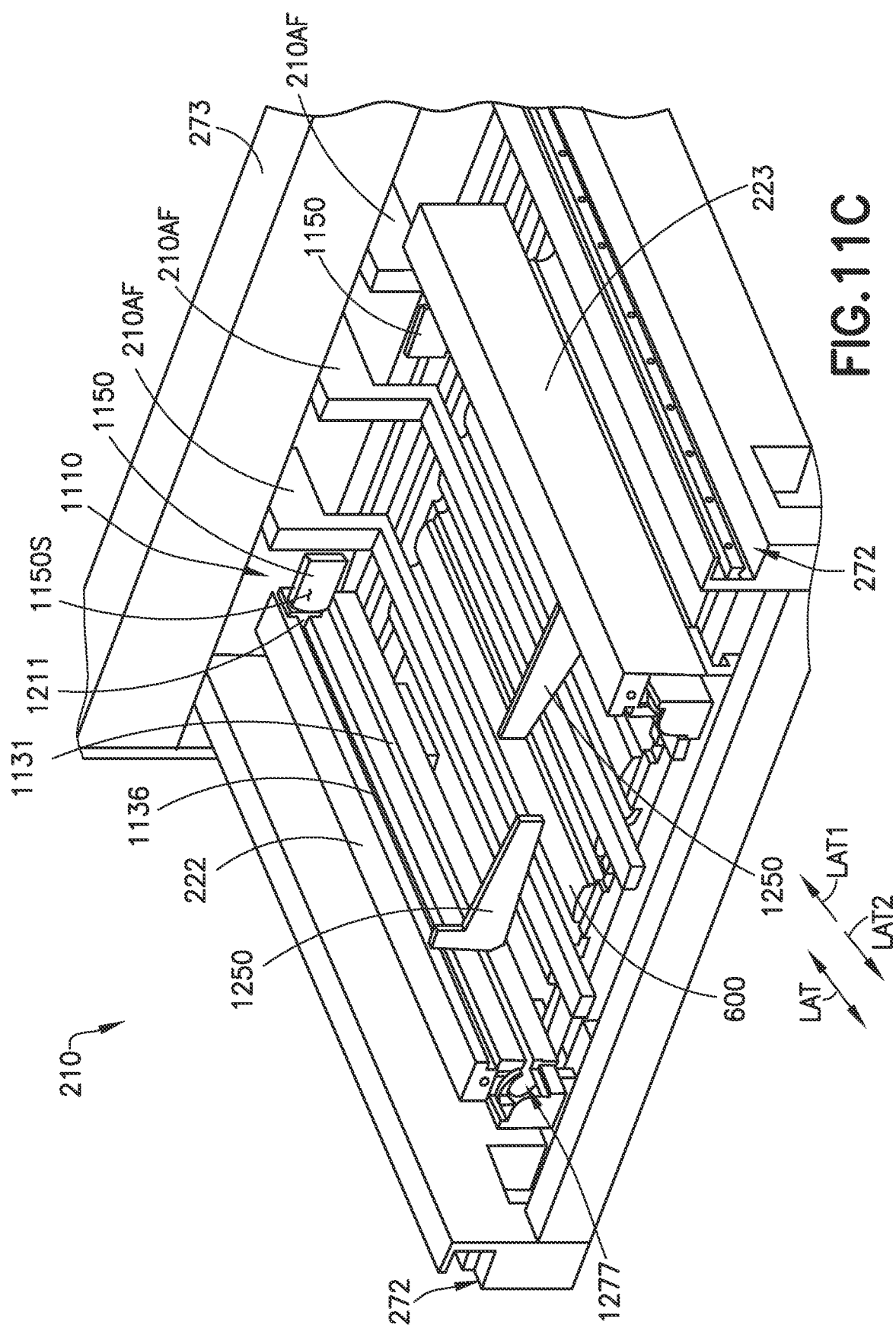
Figure 12A:
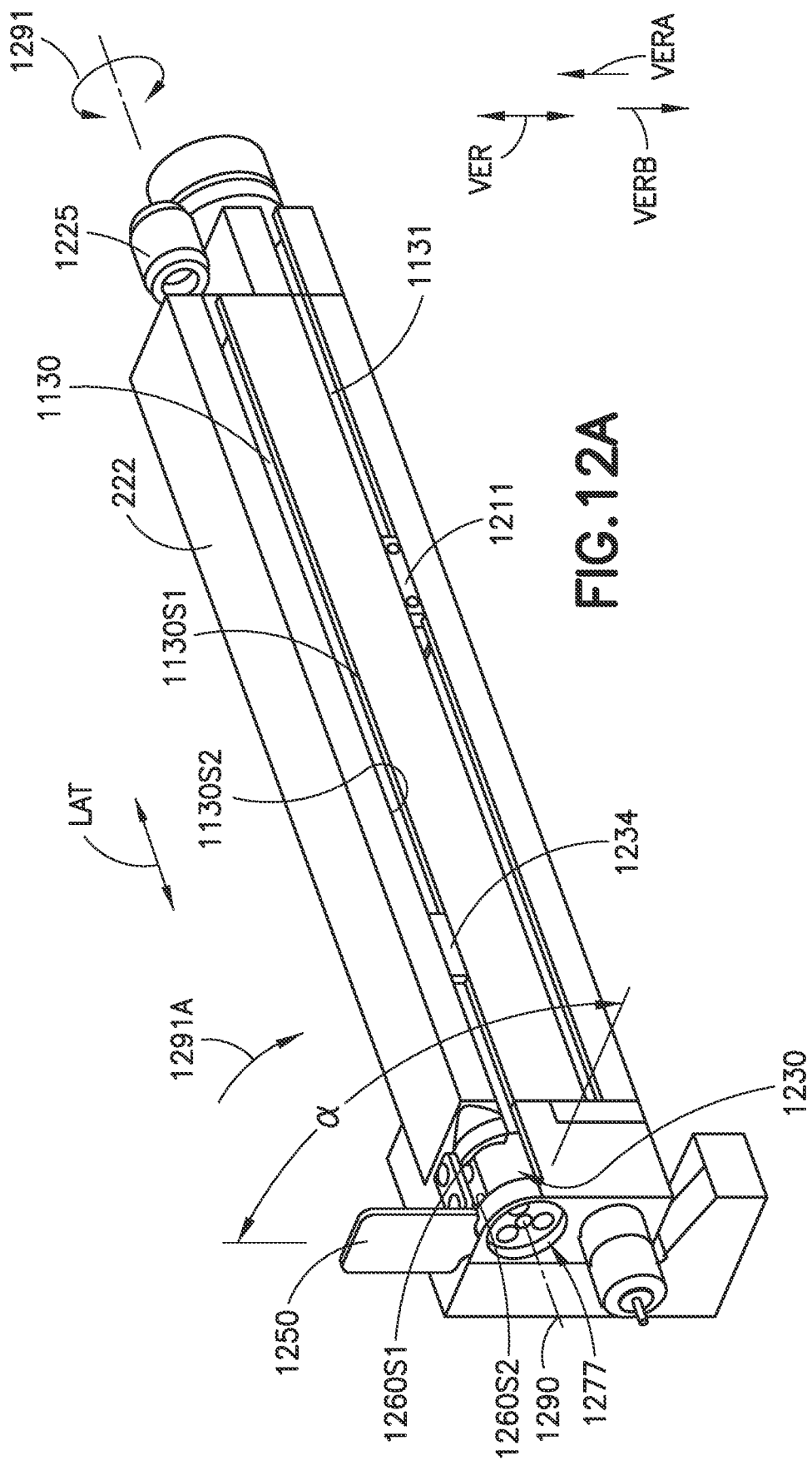
FIGS. 12A, 12B, 12C, and 12D are schematic perspective illustrations of portions of the case handling assembly of FIGS. 7A and 7B in accordance with aspects of the disclosed embodiment.
Figure 12B:
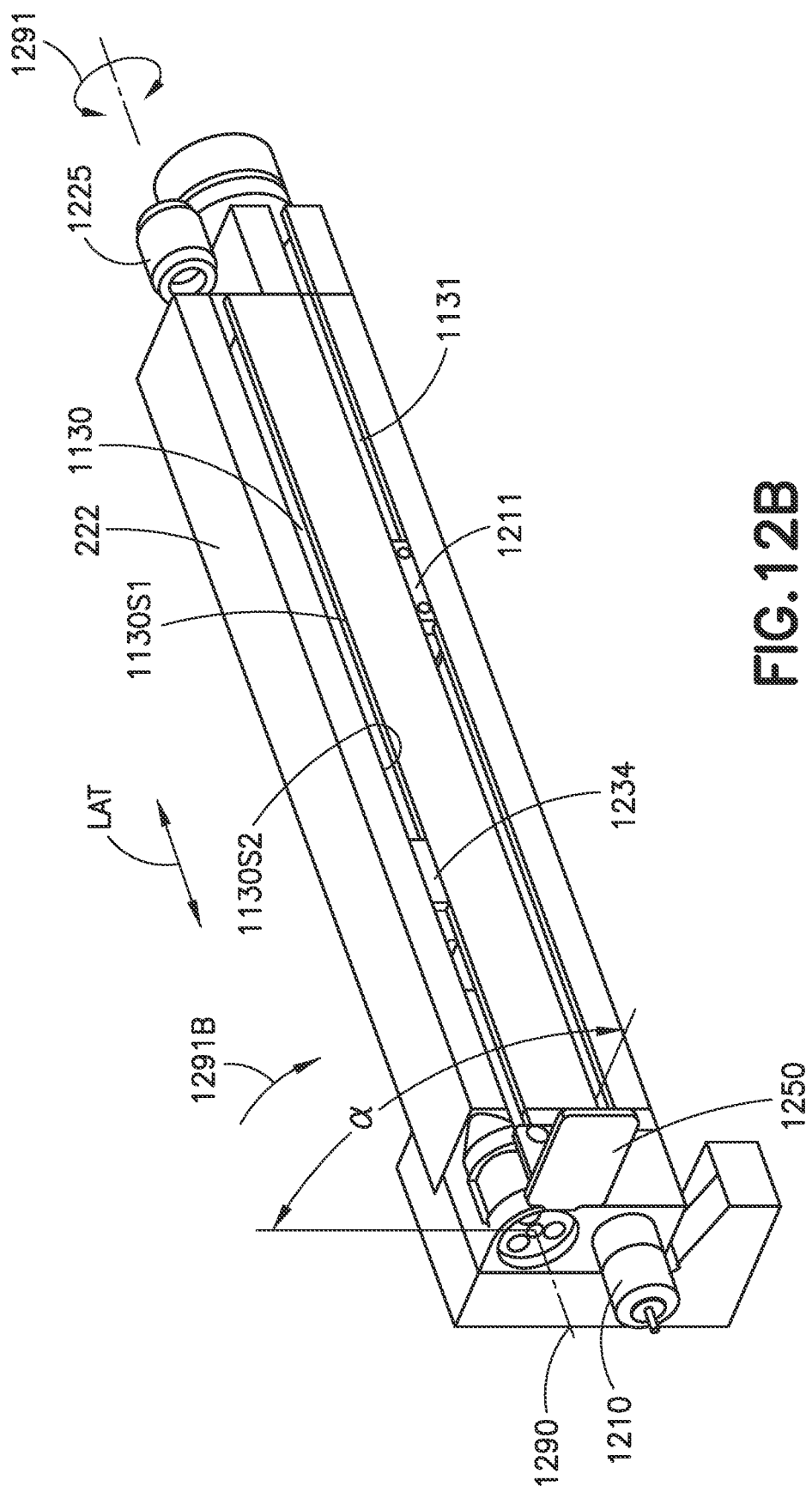
Figure 12C:
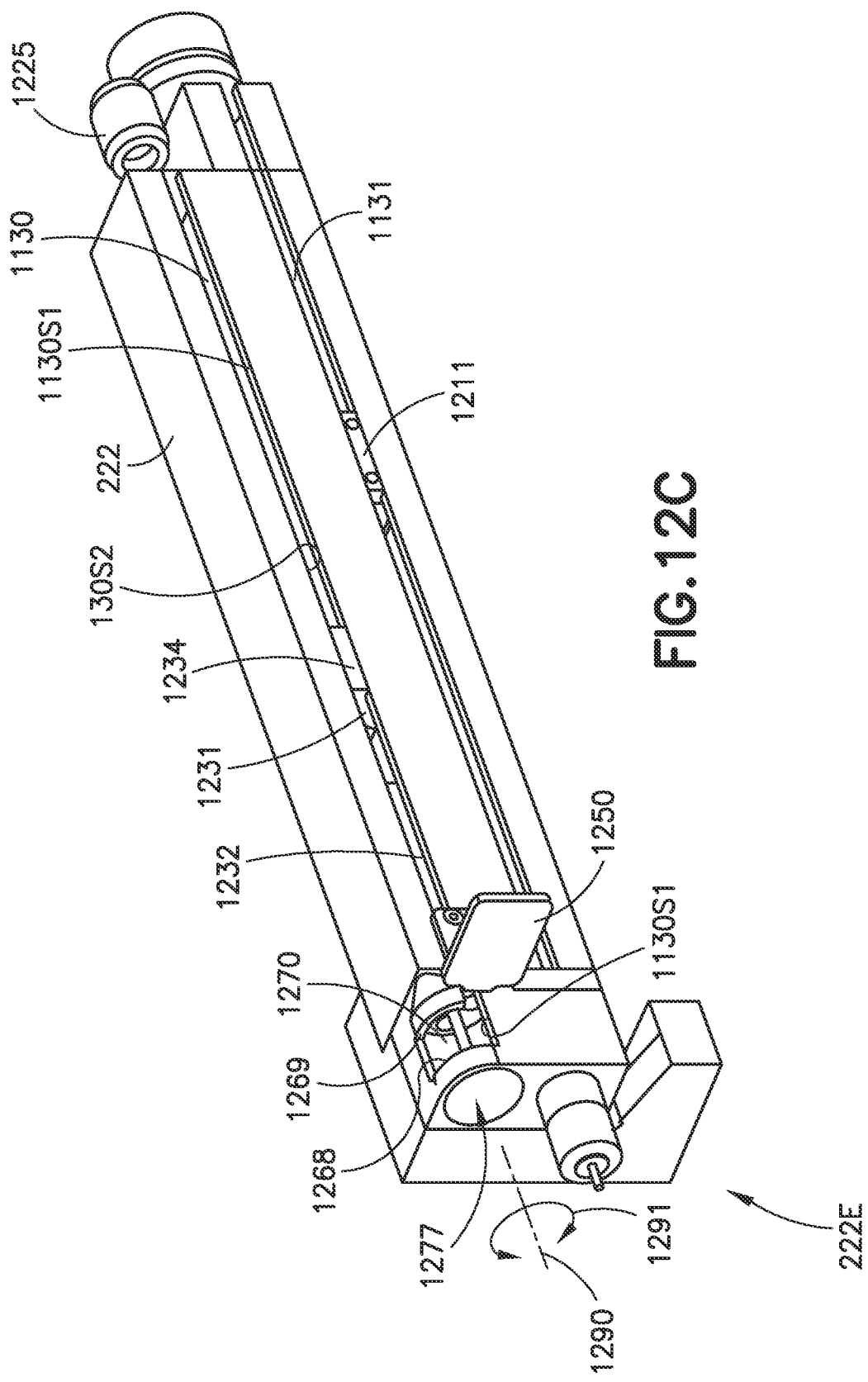

Referring to FIGS. 11A-11C and 12A-12H each justification bar 222, 223 includes a case pusher assembly 1110 and a case puller assembly 1120. The case pusher assembly 1110 and case puller assembly 1120 will be described with respect to justification bar 222 noting that the case pusher assembly 1110 and case puller assembly 1120 of justification bar 223 are substantially similar. Here the justification bar 222 includes slots 1130, 1131 disposed one above the other and extending in direction LAT along the justification bar 222. In FIG. 11A the pusher assembly 1110 is associated with the slot 1130 and the puller assembly 1120 is associated with the slot 1131; however, in other aspects, such as illustrated in FIG. 12A, the pusher assembly 1110 is associated with the slot 1131 and the puller assembly 1120 is associated with the slot 1130. The case pusher assembly 1110 and the case puller assembly 1120 are, in one or more aspects, used in combination to grip case units transported by the bot 110. In one or more aspects, one or more of the case pusher assembly 1110 and the case puller assembly 1120 are employed for justification of case units CU in direction LAT where the case units are supported by the fingers 210AF and/or justification tray 600. The case puller assembly 1120 is employed for pulling case units CU into the payload bed 210B to substantially prevent case unit overhang (e.g., a portion of a case unit extends outside of the payload bed 210B through the transfer opening 1199 of the payload bed 210B).

The pusher assembly 1110 includes any suitable linear actuator 1210 (e.g., lead screw drive, belt drive, piston, etc. driven by any suitable actuator such as stepper motor, servo motor, pneumatics, hydraulics, etc.) (see FIGS. 12A, 12B), a slider 1211 (see FIGS. 12A, 12B) coupled to the linear actuator 1210, and a pusher arm or tab 1150 coupled to the slider 1211 through the slot 1131 (or 1130 depending on whether the pusher assembly is associated with slot 1131 or slot 1130). The linear actuator 1210 is configured to move the slider 1211 in direction LAT along the channel or slot 1131 in any suitable manner. The pusher arm 1150 is coupled to the slider 1211 with any suitable mechanical or chemical fasteners (or is integrally formed with the slider 1211) and is configured with a case interface surface 1150S that contacts a side of a case unit CU for pushing the case unit towards a transfer opening 1199 of the payload bed 210B through which case units CU pass for transfer to and from the payload bed 210B.

The puller assembly 1120 includes any suitable linear actuator 1225 (e.g., lead screw drive, belt drive, piston, etc. driven by any suitable actuator such as stepper motor, servo motor, pneumatics, hydraulics, etc.), a rotating slider assembly 1230 coupled to the linear actuator 1225, and a pusher arm or tab 1250 coupled to the rotating slider assembly 1230. The linear actuator 1210 is configured to move the rotating slider assembly 1230 in direction LAT along the slot 1131 in any suitable manner. The rotating slider assembly 1230 includes a non-rotating plug 1231 and a rotating carrier 1232. A puller arm or tab 1250 is coupled to the rotating carrier 1232 as described herein. The non-rotating plug 1231 is configured to linearly slide in direction LAT, within a channel 1277 of the justification bar 222, under impetus of the linear actuator 1225. For example, the non-rotating plug 1231 includes a channel engagement portion 1233 that includes one or more riding surfaces 1233S (four are shown for exemplary purposes but in other aspects there are more or less than four riding surfaces—such as one surface illustrated in FIG. 12E) and an anti-rotation tab 1234 that is configured to extend at least partially through the slot 1130 (or slot 1131 depending on which slot 1130, 1131 the rotating slider assembly 1230 is associated with). Engagement between the slot 1130 and the anti-rotation tab 1234 prevents rotation of the non-rotating plug 1231 within the channel 1277 in direction 1291 about rotation axis 1290. The non-rotating plug 1231 also includes a carrier engagement portion 1235 configured to interface with the rotating carrier 1232 so as to effect rotation of the rotating carrier 1232 in direction 1291 and linear movement of the rotating carrier 1232 in direction LAT within the channel 1277, where both the rotation and linear movement of the rotating carrier 1232 (and tab 1250 coupled thereto) is driven by a single motor/linear actuator 1225. The non-rotating plug 1231 is coupled (e.g., with mechanical and/or chemical fasteners) to the linear actuator 1225 in any suitable manner (such as coupled to one side of a belt/chain loop of the linear actuator 1225, coupled to an actuating rod/screw of the linear actuator, coupled to a magnetic driven member of the linear actuator 1225, etc.) for reciprocating sliding movement in direction LAT along the channel 1277.

The rotating carrier 1232 includes a tab mount portion 1260 and a cam portion 1261 coupled to (or integrally formed therewith) the tab mount portion 1260. The tab mount portion 1260 is shaped and sized to as to slide or otherwise pass within the channel 1277. The tab 1250 is coupled to the tab mount portion 1260 at coupling 1262 so that the tab 1250 extends away from and is cantilevered from the tab mount portion 1260. The cam portion 1261 is a cylindrical tube having an aperture 1263 into which the carrier engagement portion 1235 of the non-rotating plug 1231 is inserted for reciprocal movement within the aperture 1263. While the cam portion 1260 is illustrated as having the aperture 1263 into which the carrier engagement portion 1235 of the non-rotating plug 1231 is inserted, in other aspects, the carrier engagement portion 1235 includes the aperture and the cam portion 1261 is inserted into the carrier engagement portion 1235.

Figure 12D:
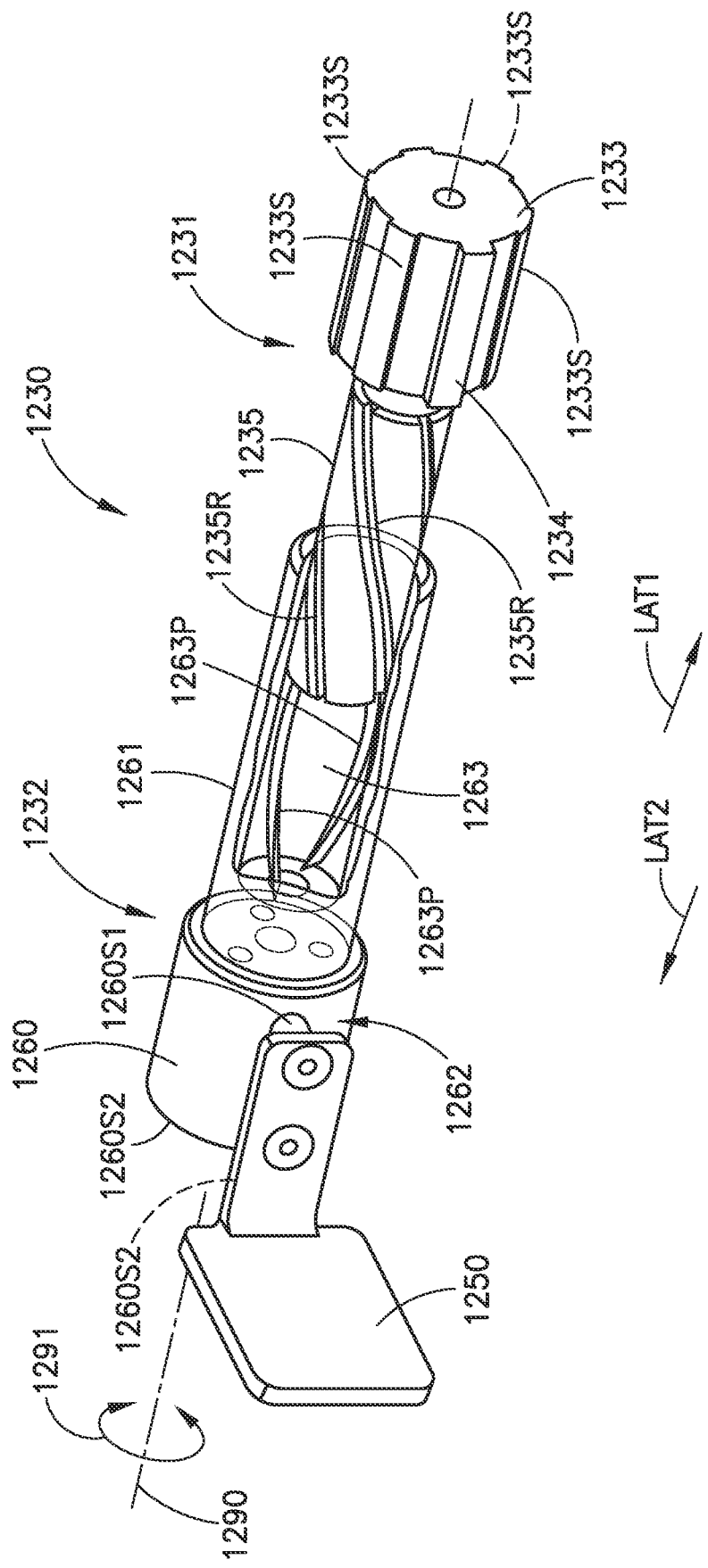
Figure 12E:
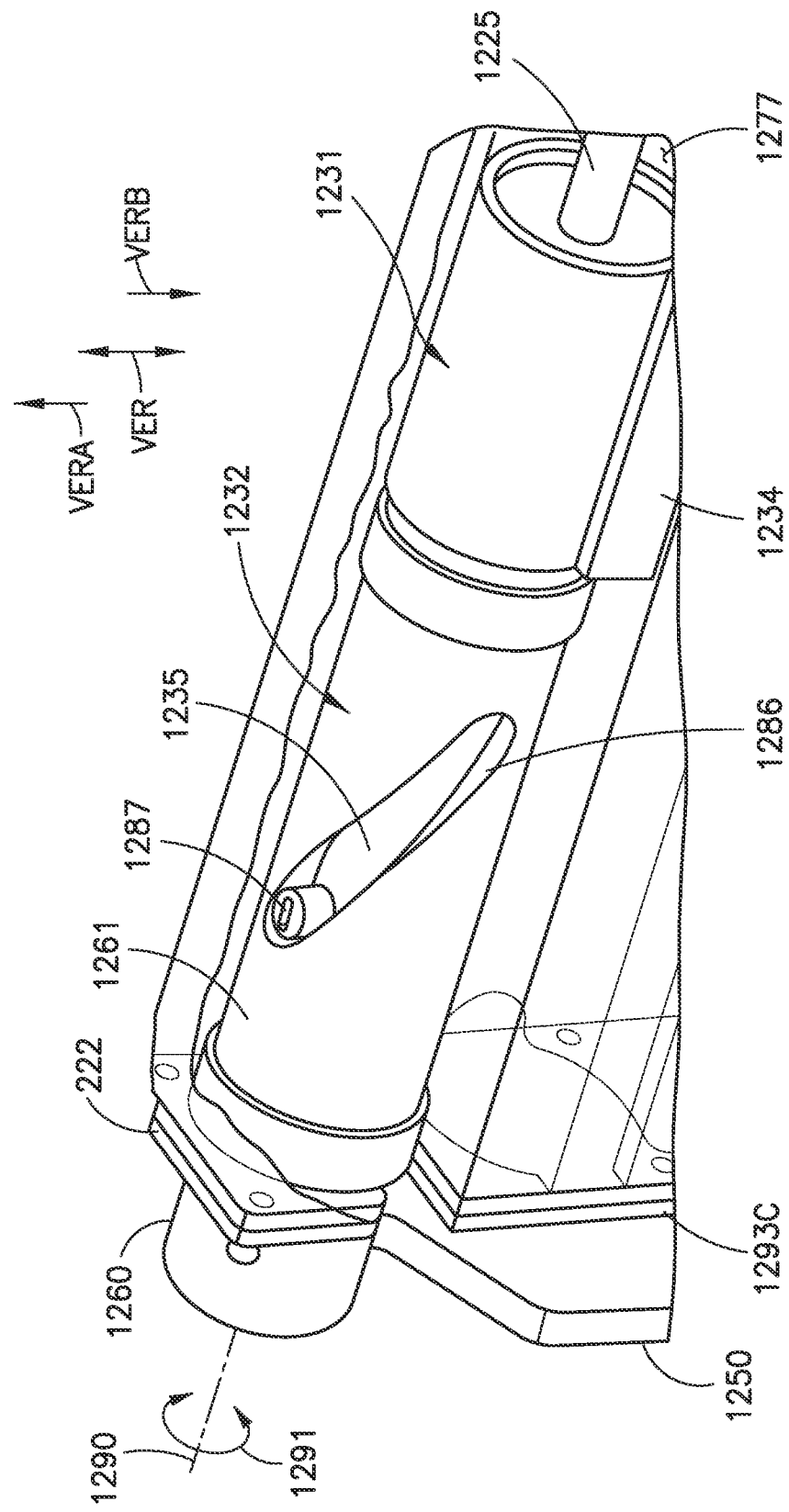
Figure 12G:
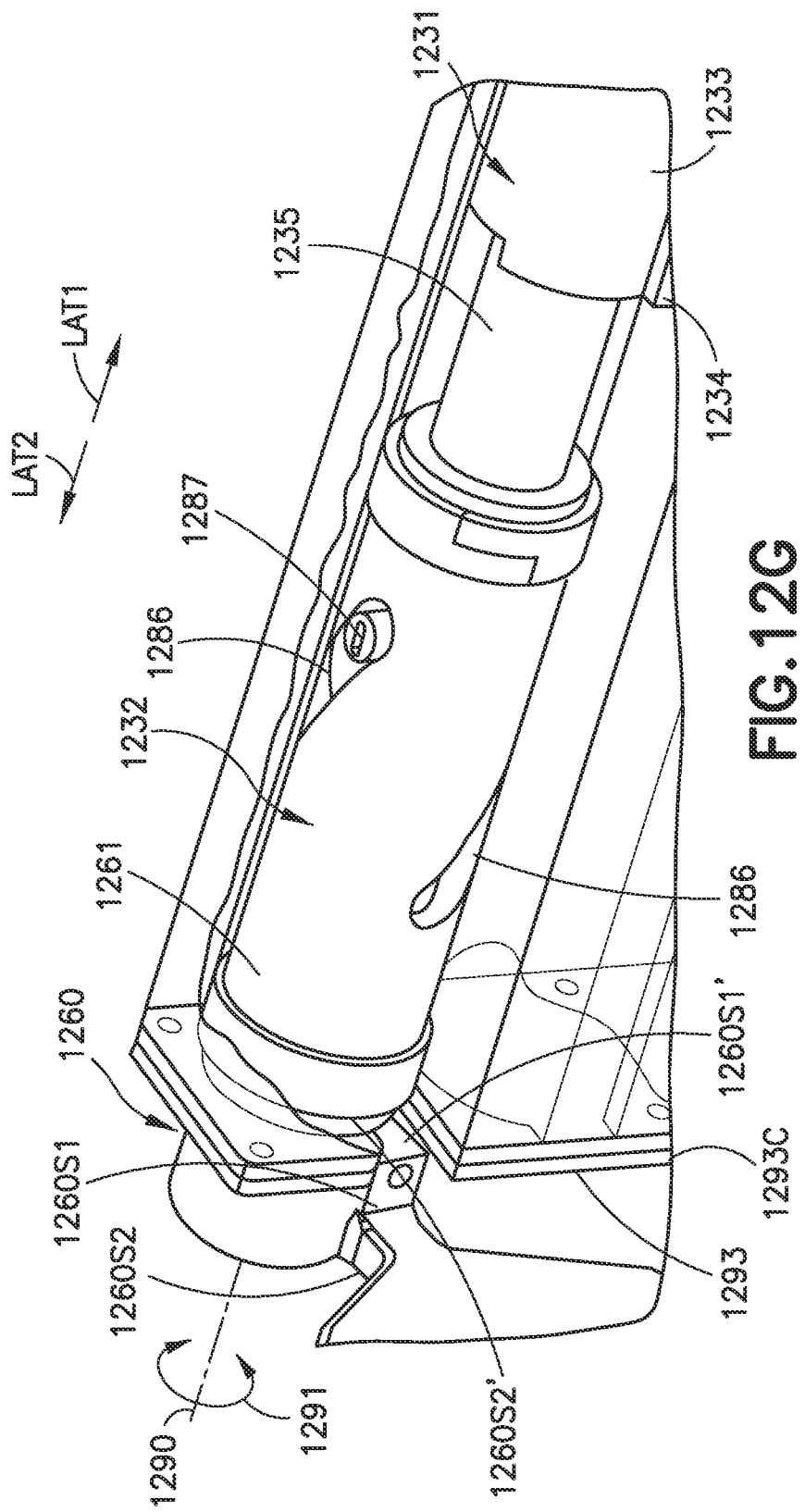
Figure 12H:
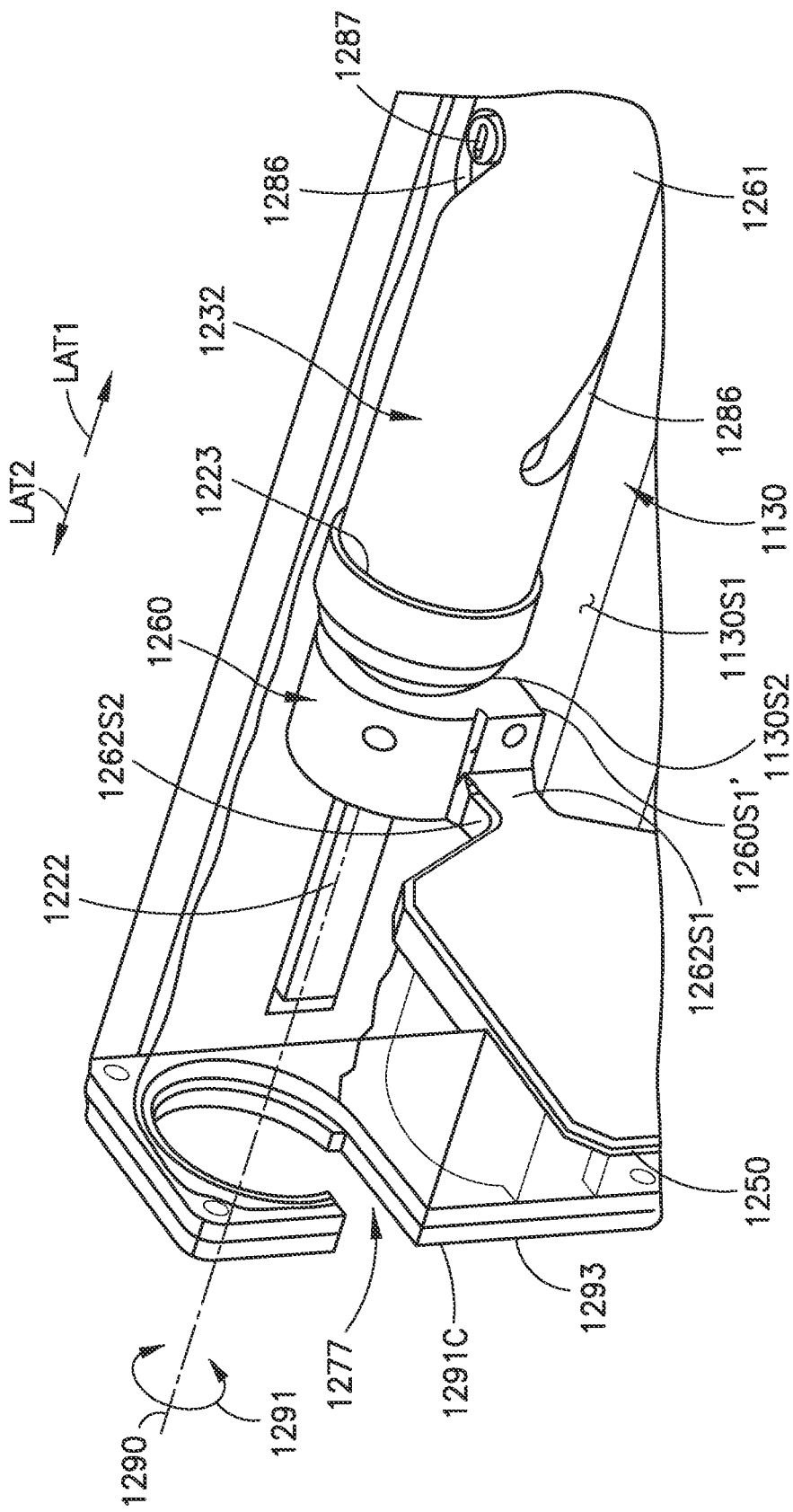

In the aspect illustrated in FIG. 12D, the surface of the aperture 1263 includes one or more protrusions 1263P that extend radially inward (e.g., towards rotation axis 1290). The protrusions 1263P form cam surfaces that engage corresponding recesses 1235R of the carrier engagement portion 1235. Here protrusions spirally extend along the length of the aperture 1263 and around the rotation axis 1290. The mating recesses 1235R spirally extend around the carrier engagement portion 1235 and around the rotation axis 1290 so as to engage or otherwise mate with the protrusions 1263P. The protrusions 1263P and recesses 1235R are configured so that movement of the non-rotating plug 1231 in direction LAT1 (so that a portion of the carrier engagement portion 1235 outside of the aperture 1263 increases) by a predetermined distance (e.g., with the non-rotating plug held from movement in direction LAT1) causes, via camming action of the engaged protrusions 1263P and recesses 1235R, rotation of the tab 1250 in direction 1291 about rotation axis 1290 by an angle α as illustrated by a comparison between FIGS. 12A and 12B. In one or more aspects the angle α is about 90° while in other aspects the angle α is more or less than about 90°. As may be realized, the protrusions 1263P and recesses 1235R are configured so that movement of the non-rotating plug 1231 in opposite direction LAT2 (so that a portion of the carrier engagement portion 1235 outside of the aperture 1263 decreases) by the predetermined distance (e.g., with the non-rotating plug held from movement in direction LAT2) causes, via camming action of the engaged protrusions 1263P and recesses 1235R, an opposite rotation of the tab 1250 in direction 1291 about rotation axis 1290 by the angle α.

To effect rotation of the rotating carrier 1232 relative to the non-rotating plug 1231 (which is held from rotation by engagement of anti-rotation tab 1234 and slot 1130), the rotating carrier 1232 is held stationary in direction LAT at least in part by stop surfaces 1260S1, 1260S2 of the rotating carrier 1232. The stop surfaces 1260S1, 1260S2 extend from the rotating carrier 1232 so as to engage a respective one of stop surfaces 1268, 1269 of the channel 1277. For example, the channel 1277 includes a slot or aperture 1270 disposed adjacent an end 222E, 223E of the justification bar 222 (and 223) closest the transfer opening 1199 of the payload bed 210B. The slot 1270 intersects slot 1130. Here, movement of the non-rotating plug 1231 in direction LAT1 under impetus of linear actuator 1225 causes rotation the stop surfaces 1260S1, 1260S2 (and tab 1250 of the rotating carrier 1232) towards the slot 1130 in direction 1291A (via camming engagement of the one or more protrusions 1263P and the corresponding recesses 1235R) where the rotating carrier 1232 is held from movement in direction LAT1 by engagement of stop surface 1260S1 of the rotating carrier 1232 with stop surface 1269 of the channel 1277. Continued rotation of the rotating carrier 1232 effected by movement of the non-rotating plug 1231 in direction LAT1 causes disengagement of the stop surfaces 1260S1, 1269 and alignment of stop surfaces 1260S1, 1260S2 with slot 1130. With the stop surfaces 1260S1, 1260S2 aligned with slot 1130, rotation of the rotating carrier 1232 is arrested (via abutting contact between stop surfaces 1260S1, 1260S2 with side 1130S1 of slot 1130) and the rotating carrier 1232 moves with the non-rotating plug 1231 in direction LAT1. It is noted that with the rotation of the rotating carrier 1232 arrested by the slot 1130 the cammed engagement between the one or more protrusions 1263P and the corresponding recesses 1235R become locked effecting movement of the non-rotating plug 1231 and the rotating carrier 1232 as a unit in direction LAT.

To effect rotation of the stop surfaces 1260S1, 1260S2 (and tab 1250 of the rotating carrier 1232) in direction 1291B, the linear actuator 1255 moves the non-rotating plug 1231 (and rotating carrier 1232) in direction LAT2 so that stop surfaces 1260S1, 1260S2 move into the slot 1270 (and are disengaged from the sides 1130S1, 1130S2 of the slot 1130) and stop surface 1260S2 engages stop surface 1268 of the slot 1270. Engagement of stop surfaces 1260S2, 1268 stop movement of the rotating carrier 1232 in direction LAT2 while disengagement of stop surfaces 1260S1, 1260S2 from the side 1130S2 of the slot 1130 allows rotation of the rotating carrier 1232 in direction 1291B. With the stop surfaces 1260S2, 1268 engaged and with the disengagement of stop surfaces 1260S1, 1260S2 from the sides 1130S2 of the slot 1130, further movement of the non-rotating plug 1231 in direction LAT2 under impetus of the linear actuator 1225 causes (via camming engagement of the one or more protrusions 1263P and the corresponding recesses 1235R) rotation of the stop surfaces 1260S1, 1260S2 (and tab 1250 of the rotating carrier 1232) away from the slot 1130 in direction 1291B by the angle α. As will be described herein, rotation of the tab 1250 from what may referred to as a retracted position (shown in FIGS. 2B, 11A, 12A and 12E) to what may be referred to as an extended position (shown in FIGS. 2A, 11B, 12B, 12C, 12G, and 12H) orients the tabs 1250 of the justification bars 222, 223 for case unit engagement for pulling case units held in the payload bed 210B in direction LAT1 (FIGS. 2A and 11A).

Referring to FIGS. 12E-12H, a portion of the puller assembly 1120 is illustrated in accordance with an aspect of the disclosed embodiment. What is illustrated in FIGS. 12E-12H is substantially similar to that described above with respect to FIGS. 12A-12D except where noted. In FIGS. 12A-12D the rotating slider assembly 1230 is configured so that the retracted configuration of the tab 1250 is with the tab 1250 extending towards a vehicle riding surface VRS of the transfer deck 130B or picking aisle 130A (e.g., in direction VERB) whereas the retracted configuration of the tab 1250 in FIGS. 12A-12D is with the tab 1250 extending away from the vehicle riding surface VRS of the transfer deck 130B or picking aisle 130A (e.g., in direction VERA); however, in other aspects the rotating slider assembly 1230 is configured retracted position of the tab 1250 at any suitable position that provides for substantially unhindered passage of case units through the transfer opening 1199 (see, e.g., FIG. 11A) and the tab 1250 is rotated through any suitable rotation angle α that orients the tab 1250 for engagement with case units CU as described herein.

In FIGS. 12E-12H at least one of the stop surfaces 1260S1, 1260S2 is integrated into the tab 1250. The stop surface 1260S1, 1260S2 as well as the minor of the tab 1250 engage the surfaces 1268, 1269, and sides 1130S1, 1130S2 of the slot 1130 in a manner similar to that described above, noting that the stop surfaces 1260S1, 1260S2 include both the major surfaces of the tab 1250 for engaging surfaces 1268, 1269 of slot 1270 as well as minor surfaces of the tab 1250 for engaging sides 1130S1, 1130S2 of slot 1130. In the aspect shown in FIGS. 12E-12H, the configuration of the cammed engagement between the non-rotating plug 1231 and the rotating carrier 1232 is in the form of at least one slot 1286 and at least one pin or post 1287. Here the cam portion 1261 includes at least one cammed slot 1286 and the carrier engagement portion 1235 includes at least one pin 1287 that engages the at least one slot 1286. In the aspect illustrated there are two cammed slots 1286 and two respective pins 1287; however, in other aspects there may be one or more than two respective sets of cammed slots 1286 and pins 1287. As the non-rotating plug 1231 is moved in direction LAT1 the rotating carrier 1232 is held from movement in direction LAT1 by engagement of at least one of the stop surfaces 1260S1, 1269 in a manner similar to that described above. Movement of non-rotating plug 1231 in direction LAT1 causes relative movement of the at least one pin 1287 relative to the at least one slot 1286 effecting rotation of the tab 1250 and rotating carrier 1232 in direction 1291 until rotation of the tab 1250 is arrested through engagement of one or more of the stop surfaces 1260S1, 1260S2 with one or more of the sides 1130S1, 1130S2 of the slot 1130 in a manner similar to that described above. When stop surfaces 1260S1, 1260S2 are aligned with slot 1130 and rotation of the rotating carrier 1232 is arrested, the cammed engagement of the at least one pin 1287 and the at least one slot 1286 is locked and the rotating carrier 1232 and non-rotating plug 1231 move in direction LAT1 as a unit under impetus of the linear actuator 1225.

In one or more aspects, the at least one slot 1286 is configured such that engagement of the at least one pin 1287 with an end 1286E of the at least one slot 1286 locks cammed engagement of the at least one pin and slot and arrests rotation of the tab 1250 and rotating carrier 1232. In still other aspects, at least one stop surface 1260S1', 1260S2' for holding movement of the rotating carrier 1232 in direction LAT is integral with the cam portion 1261 and/or tab mount portion 1260. For example, the tab mount portion 1260 includes a protrusion or stop surface 1260S1' substantially in-line with the tab 1250 that extends past the perimeter of the channel 1277 and engages outer surface 1293 of the justification bar so as to hold the rotating carrier 1232 from movement in direction LAT1 as the non-rotating plug 1231 moves in direction LAT1 and tab 1250 rotates in direction 1291B. When the stop surface 1260S1 (and tab 1250) is aligned with the slot 1130 the rotating carrier 1232 moves in direction LAT1 with the non-rotating plug 1231 as described herein (noting rotation between the rotating carrier 1232 and non-rotating plug 1231 locked by engagement of pin 1287 with end 1286E of cammed slot 1286). Stop surface 1260S2' for holding movement of the rotating carrier 1232 in direction LAT2 is integral with the cam portion 1261 and engages an interior surface of channel 1277 (e.g., such as an end cap 1293C that forms surface 1293 that extends inward past the bounds of the channel 1277 (see FIG. 12H) to keep the cam portion 1261 from moving out of the channel 1277 (though tab mount portion 1260 extends from the channel 1277) in direction LAT2.

In one or more aspects, the rotating carrier 1232 is held from movement in direction LAT1 by a detent mechanism 1222 (e.g., biased ball or plate) that engages a portion of the rotating carrier 1232 (such as shoulder 1223) where the engagement of the detent mechanism with the rotating carrier 1232 provides for rotation of the rotating carrier 1232 about axis 1290 while substantially preventing linear movement of the rotating carrier 1232 with the non-rotating plug 1231 in direction LAT1. With locking of the cammed engagement of the at least one pin 1287 and at least one slot 1286 (or cammed engagement of the at least one protrusion 1263P and at least one recess 1235R) the linear actuator 1225 overcomes the bias force of the detent mechanism 1222 for moving the rotating carrier 1232 in direction LAT1.

An exemplary illustration of the tab 1250 rotation and linear movement described above is illustrated in FIGS. 11A-11C. The justification bars 222, 223 are moved towards each other in direction LON so as to substantially contact case unit(s) CU held at least partially within the payload bed 210B. As can be seen in FIG. 11A the tabs 1250 of each respective justification bar 222, 223 are rotated in direction 1291 (e.g., through relative movement between the non-rotating plug 1231 and rotating carrier 1232 effected by the respective linear actuator 1225) about a respective rotation axis 1290 from the retracted position (FIG. 11A) to the extended position (FIG. 11B). The linear actuator 1225 of each respective justification bar 222, 223 continues to operate so that the non-rotating plug 1231 and rotating carrier 1232 (e.g., the rotating slider assembly 1230) are moved as a unit in direction LAT1 to pull case units into the payload bed 210B. Movement of the rotating slider assembly in direction LAT2 and rotation of the tabs 1250 from the extended position to the retracted position occurs in a substantially opposite manner.

Referring to FIGS. 13A-13F, in one or more aspects, the puller assembly 1120 is substantially similar to that describe above; however, instead of the rotating slider assembly 1230 the puller assembly includes sliding rack assembly 1320. The sliding rack assembly 1320 will be described with respect to justification bar 222 but it should be understood that that justification bar 222 is similarly configured (however, in some aspects justification bar 222 includes the sliding rack assembly 1320 and justification bar 223 includes the rotating slider assembly 1230 or vice versa).

Figure 13A:
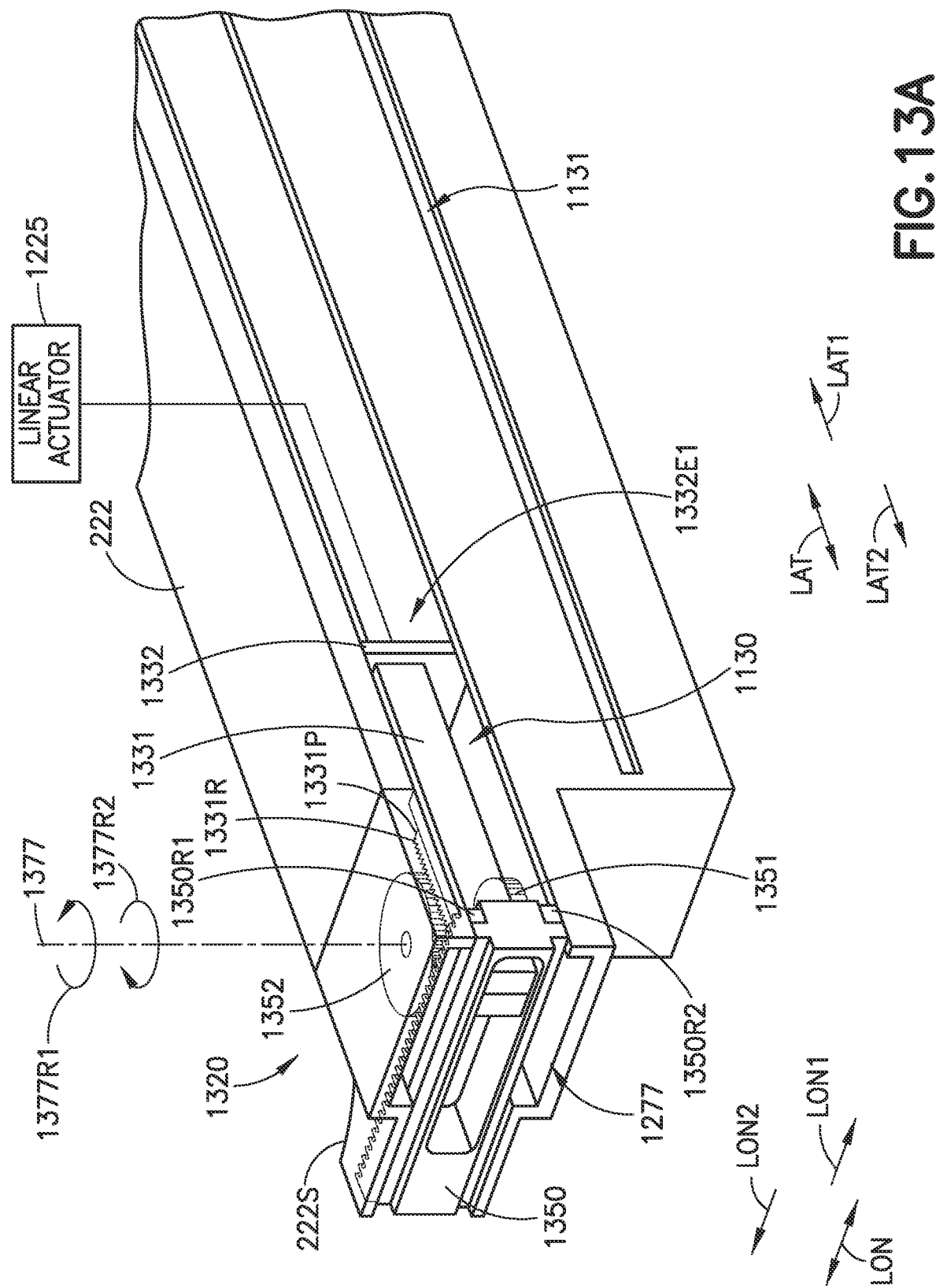
FIGS. 13A, 13B, 13C, 13D, 13E, and 13F are schematic perspective illustrations of portions of the case handling assembly of FIGS. 7A and 7B in accordance with aspects of the disclosed embodiment.
Figure 13B:
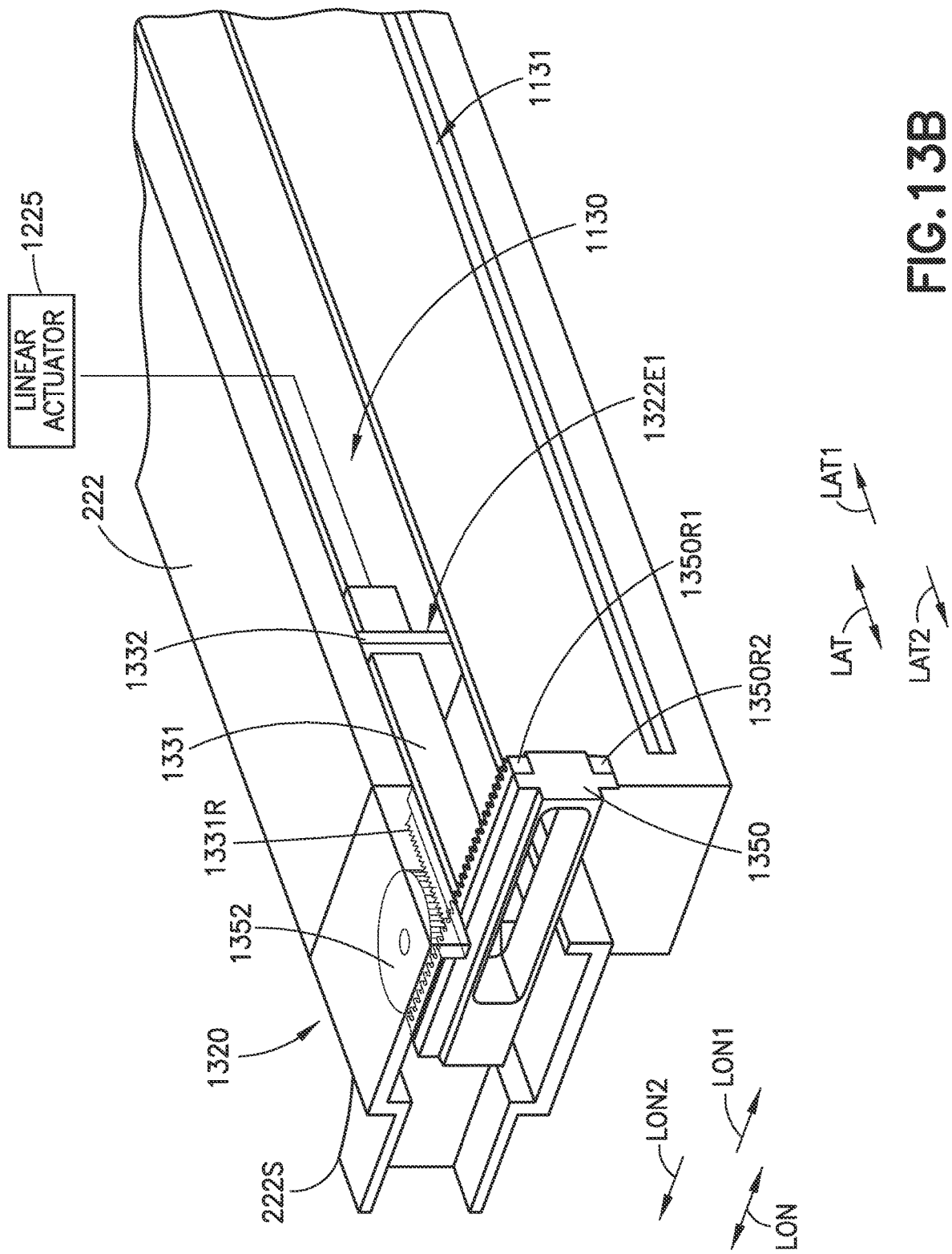

The sliding rack assembly includes a sliding frame 1332 that is shaped and sized to reciprocate in direction LAT within the slot 1130 (or slot 1131). In the aspect illustrated the sliding frame 1332 has a rectangular cross section (and the slot 1130 or 1131 has a mating cross section) but in other aspects the sliding frame 1332 and slot 1130 (or slot 1131) have any suitable mating cross sections the provide for reciprocating movement of the sliding frame 1332 in direction LAT. The sliding frame 1332 includes a first end 1332E1 and a second end 1332E2. The sliding frame 1332 includes a channel 1332C (FIG. 13D) that extends through at least a portion of the sliding frame 1332 and opens through the first end 1332E1. A rack gear 1331 extends through the channel 1332C so as to reciprocate in direction LAT within the channel, where the rack gear 1331 extends out of the channel 1332C at the first end 1332E1 for coupling with the linear actuator 1225. As can be seen in FIG. 13E the rack gear 1331 includes a frame 1331F, a gear portion 1331R coupled to the frame 1331F, and a stepped portion 1331P.

A rotating gear set 1378 is coupled to the sliding frame 1332 at or adjacent the second end 1332E2 about axis 1377. The rotating gear set 1378 includes at least one pinion gear 1351, 1352, 1353 (see FIG. 13D). In the example illustrated the at least one pinon gear 1351, 1352, 1353 is three pinion gears stacked one on the other (or integrally formed with each other). Here a lower pinion gear 1351, a middle pinion gear 1353, and an upper pinion gear 1352 are coupled about axis 1377 between tines TN1, TN2 (FIG. 13D) of the sliding frame 1332. It is noted that the terms upper, lower, and middle are used here for convenience and any other spatial identifiers may be used in their place. The rack gear 1331 is aligned with the middle pinon gear 1353 so that the gear portion 1331R meshes with the middle pinion 1353 so as to drivingly rotate the upper pinion gear 1352 and the lower pinion gear 1351. The upper pinion gear 1352 and the lower pinion gear 1351 are aligned with and mesh with respective rack gears 1350R1, 1350R2 disposed on (or integral with) the tab 1350 as described herein.

Figure 13C:
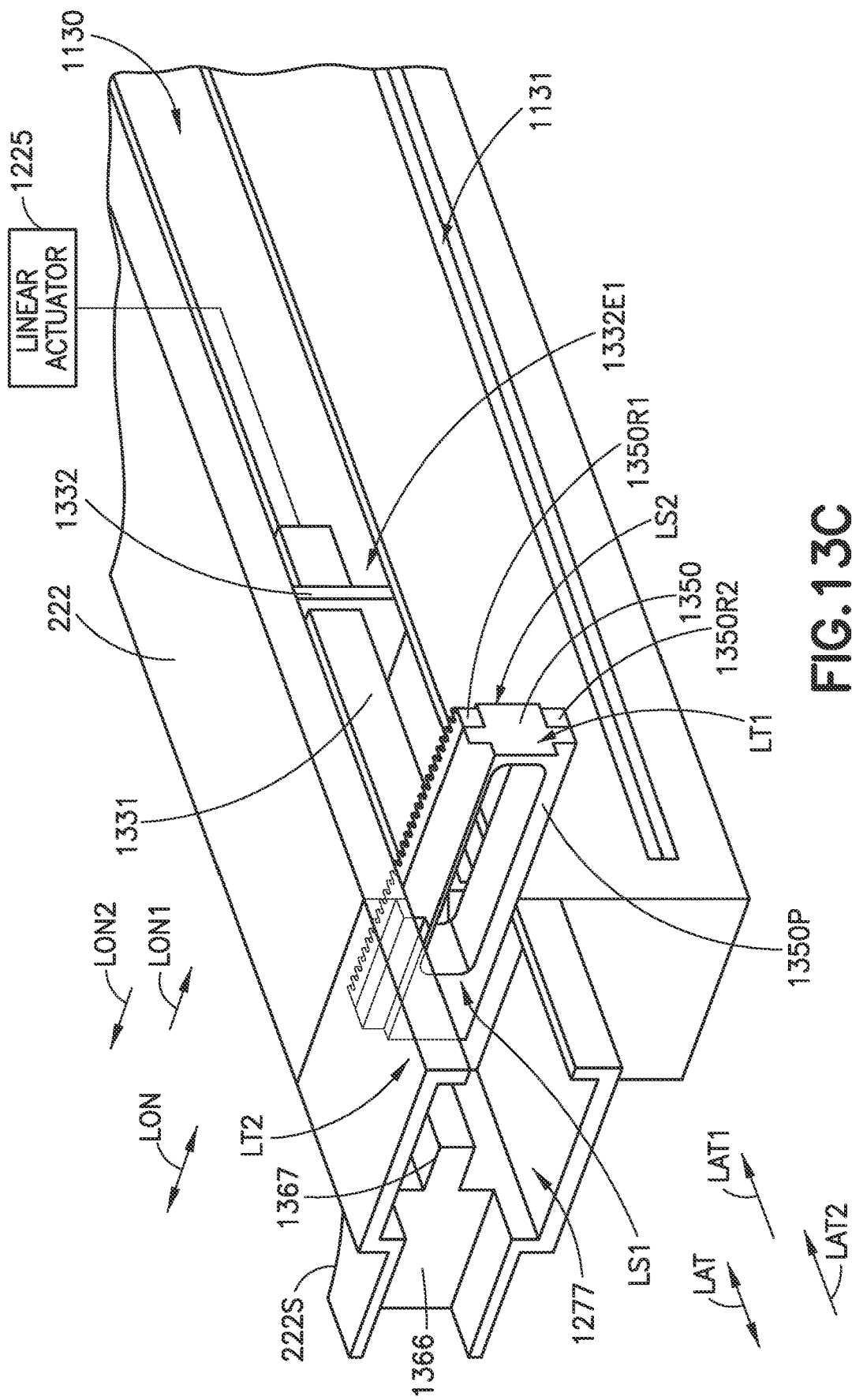
Figure 13D:
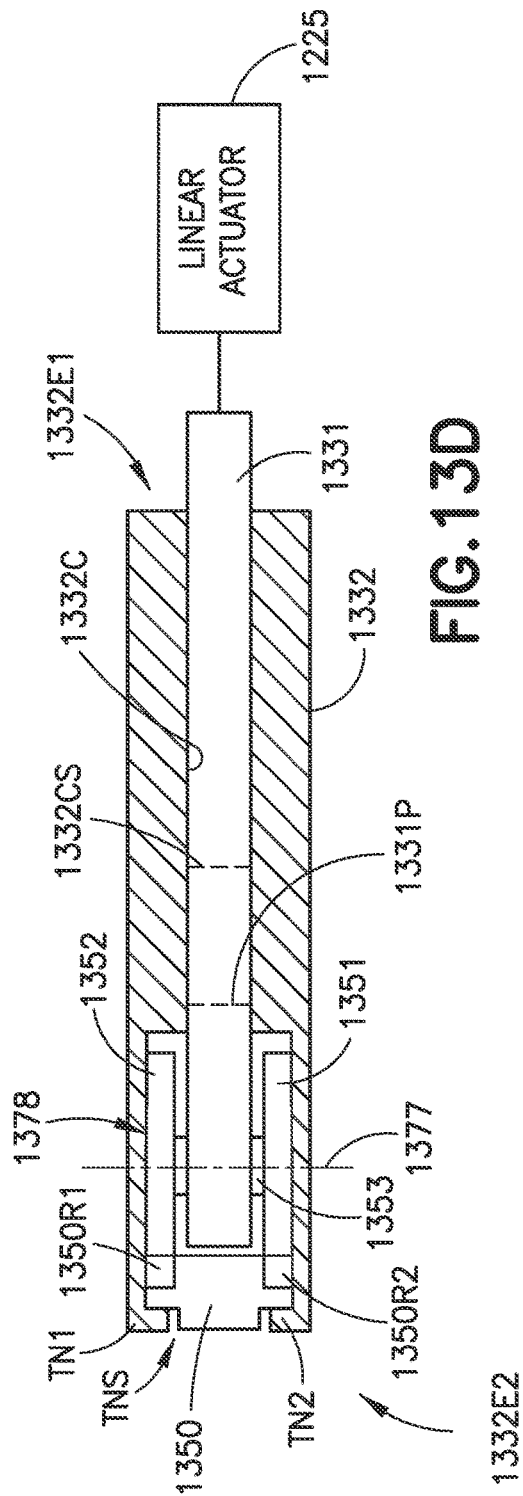
Figure 13E:
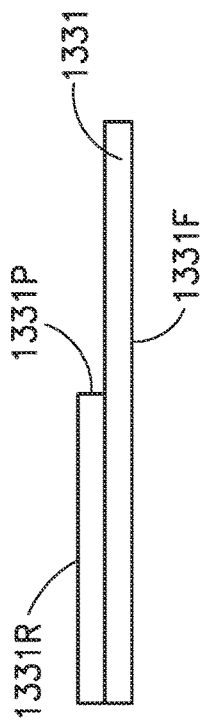

As can be seen best in FIGS. 13C and 13D, the tines TN1, TN2 of the sliding frame and the rotating gear set 1378 form a channel in which the tab 1350 reciprocates in direction LON. For example, the tab 1350 includes lateral sides LS1, LS2 and longitudinal ends LT1, LT2 (see FIG. 13C). The tab 1350 includes a protrusion 1350P that extends from the lateral side LS1 and at least partially into a slot TNS formed by the tines TN1, TN2 at the second end 1332E2 of the sliding frame 1332. The slot TNS and protrusion 1350P are sized relative to each other so that the slot TNS at least in part guides reciprocating movement of the tab 1350 in direction LON. The lateral side LS2 includes at least one rack gear 1350R1, 1350R2 that meshes with the at least one pinion gear 1351, 1352, 1353. In the example, shown an upper rack gear 1350R1 meshes with the upper pinion gear 1352 and a lower rack gear 1350R2 meshes with the lower pinion gear 1351 so that rotation of the upper and lower pinion gears 1352, 1351 causes movement of the tab 1350 in direction LON. The dual rack gears may 1350R1, 1350R2 maintain alignment of the protrusion 1350P within the slot TNS.

In a manner similar to that described above, reciprocating movement of the tab 1350 in both directions LON, LAT is effected with a single linear actuator 1225. For example, FIG. 13A illustrates the tab 1350 in a retracted position and FIG. 13B illustrates the tab 1350 in an extended position. FIG. 13C illustrates the movement of the extended tab 1350 in direction LAT. Here, to extend the tab 1350 the linear actuator 1225 is operated to move the rack gear 1331 in direction LAT1. Movement of the rack gear 1331 in direction LAT1 causes rotation of the rotating gear set in a first rotation direction 1377R1 about axis 1377, where the rotation of the upper and lower pinion gears 1352, 1351 in the first rotation direction 1377R1 causes movement of rack gears 1350R1, 1350R2 (and the tab 1350) in direction LON1 to extend the tab 1350. In a manner similar to that described above, the sliding frame 1332 is held from movement in direction LAT1 so that the rack gear 1331 moves relative to the sliding frame 1332 effecting extension of the tab 1350.

Figure 13F:
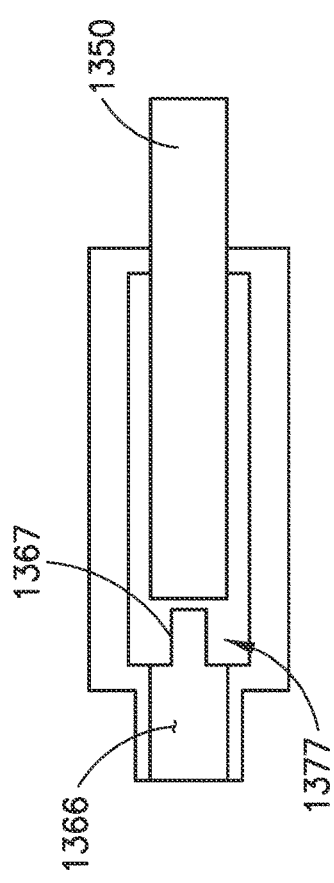

The sliding frame 1332 is held from movement so that movement of the rack gear 1331 in direction LAT1 causes extension of the tab 1350. As described herein, extension of the tab 1350 releases the sliding frame 1332 for movement in direction LAT1 and further movement of the rack gear 1331 in direction LAT1 moves the rack gear 1331 and the sliding frame 1332 (and tab 1350) as a single unit in direction LAT1 (See FIG. 13C). Here the sliding frame 1332 is held from movement in any suitable manner such as by one or more of a detent mechanism 1222 substantially similar to that described above and a hard stop (e.g., abutting) engagement between the tab 1350 and the justification bar 222 (noting that the justification bar 222 includes the shroud 222S that at least partially surrounds the sliding rack assembly 1320 where the shroud 222S forms a portion of the channel 1277). In the example illustrated the shroud 222S includes a stop surface 1366 (FIGS. 13C and 13F) that substantially abuts the lateral side LS of the tab 1350 with the tab 1350 in at least the retracted position. The stop surface 1366 includes a protrusion 1367 that extends into and along a length of the channel 1277. As the tab 1350 is extended the lateral side LS1 of the tab 1350 rides along the stop surface 1366 (so that the sliding frame 1322 is held from movement in direction LAT1) until the tab 1350 extends past the protrusion 1367 (as shown in FIG. 13F). Extension of the tab 1350 past the protrusion 1367 of the stop surface 1366 frees the sliding frame 1322 (and tab 1350) for movement in direction LAT1. As may be realized, the middle pinion gear 1353 has a diameter that prevents interference with a portion of the protrusion 1367 that extends along the channel 1277 (and the upper and lower pinion gears 1351, 1352 are disposed respectively above and below the protrusion 1367).

In one or more aspects, the running clearance and/or lubricity between sliding frame 1332 and the channel 1277 is such that any friction between the sliding frame 1332 and the channel 1277 is insufficient to cause relative movement between the rack gear 1331 and the sliding frame 1332 (e.g., so that further extension of the tab 1350 is precluded). In one or more aspects, a clutch is provided in the rotating gear set 1378 and/or a detent mechanism (substantially similar to detent mechanism 1222) is provided between the sliding frame 1332 and the rack gear 1331 so that a force required to effect relative movement between the sliding frame 1332 and the rack gear 1331 is greater than the friction forces between the sliding frame 1332 and the channel 1277. In one or more aspects, relative movement between the rack gear 1331 and the sliding frame 1332 is arrested by suitable hard (e.g., abutting) stops between a surface of the rack gear 1331 (e.g., such as protruding surface or stepped portion 1331P) and a mating stop surface (e.g., such as a stepped surface 1332CS—FIG. 13D) within the channel 1332C. In still other aspects, the above are combined in any suitable manner so that there is substantially no relative movement between the rack gear 1331 and the sliding frame 1332.

Movement of the tab 1350 from the extended position to the retracted position occurs in a manner substantially opposite to that described above. For example, the linear actuator operates to move the rack gear 1331 in direction LAT2. Abutment of the tab 1350 against the protrusion 1367 prevents movement of tab 1350 in direction LON2 and substantially locks (e.g., prevents) relative movement between the rotating gear set 1378 and the rack gear 1331 so that the sliding frame 1332, rack gear 1331, rotating gear set 1378, and tab 1350 (e.g., sliding rack assembly 1320) move as a unit in direction LAT2. Here, the rack gear(s) 1350R1, 1350R2 of the tab 1350 that are meshed with the pinion gears 1351, 1352 of the rotating gear set 1378 prevent rotation of the rotating gear set 1378 and, via meshing of the rack gear 1331 with pinion gear 1353, relative movement between the rack gear 1331 and rotating gear set 1378 is prevented. The sliding rack assembly 1320 continues to move in direction LAT2 until the tab 1350 moves past the protrusion 1367 (and stop surface 1366), at which point relative movement between the rack gears 1331, 1350R1, 1350R2 and the rotating gear set 1378 is released such that movement of the sliding frame 1332 in direction LAT2 is arrested in any suitable manner and rack gear 1331 continues to move in direction LAT2 relative to the sliding frame 1332. Movement of the rack gear 1331 in direction LAT2 relative to the sliding frame 1332 causes rotation of the rotating gear set 1378 in direction 1377R2. Rotation of the rotating gear set 1378 in direction 1377R2 causes movement of the tab 1350 in direction LON2 so that the tab 1350 is moved to the retracted position. Movement of the sliding frame 1332 in direction LAT2 is in one or more aspects arrested by suitable hard (e.g., abutting) stops between a surface of the sliding frame 1332 and the channel 1277, by the detent mechanism 1222 (FIG. 12H, or in any other suitable manner. The retracted position of the tab 1350 is in one or more aspects set by an end of stroke of the linear actuator 1225 in direction LAT2, the end of stroke being defined by one or more of a hard stop (current sensor of the linear actuator may detect when the hard stop is reached), encoder position, switch, etc. where the linear actuator 1225 is controlled, such as by bot controller 1220 (FIG. 1) in response to signals received from one or more sensors/switches indicated the end of stroke.

Referring to FIGS. 2A-2D, 9A, 14A-14F, and 16, at least the case unit support surface 610, the pusher arms 1150, 1250, and the justification bars 222, 223 form payload registration facets that, as described herein, are mounted to the frame 200F so as to engage the payload held in the payload bed 210B. The registration facets are disposed to provide, upon engagement with the payload, at least two degrees of registration capturing and securing the payload in a predetermined position in the payload bay 210B, and are configured to effect payload engagement with the at least two degrees of registration registering the payload substantially coincident with seating of the payload on the payload support plane 610P of the payload bay 210B. In one or more aspects, the seating of the payload or case unit CU, on the payload support plane 610P, is effected with a common seating motion between the end effector or arm 210A and the payload support plane 610P for each pick of the arm 210A from each different support plane height CUSH1, CUSH2 (see FIG. 16) of the storage space 130S. The common seating motion is effected, as described herein, by moving both the arm 210A and payload support plane 610P in a common direction VER (e.g., VERU, VERL) with the lift towers 211, 212 (as described herein, where the motion of the justification tray is arrested by the frame 200F). The common seating motion is a minimum or minimized motion (e.g., in direction VER that is only so much as to allow movement of the case unit CU above the arcuate support surfaces 621 of the justification tray 600 without contact) closing a (common) clearance air gap CAG (sized according to the minimized motion; see FIGS. 6B and 6E) between the payload support plane 610P and the underpick end effector 210A at a payload pick height PCKH1, PCKH2 of the underpick end effector 210A for each different support plane height CUSPH of the storage space 130S.

Figure 16:
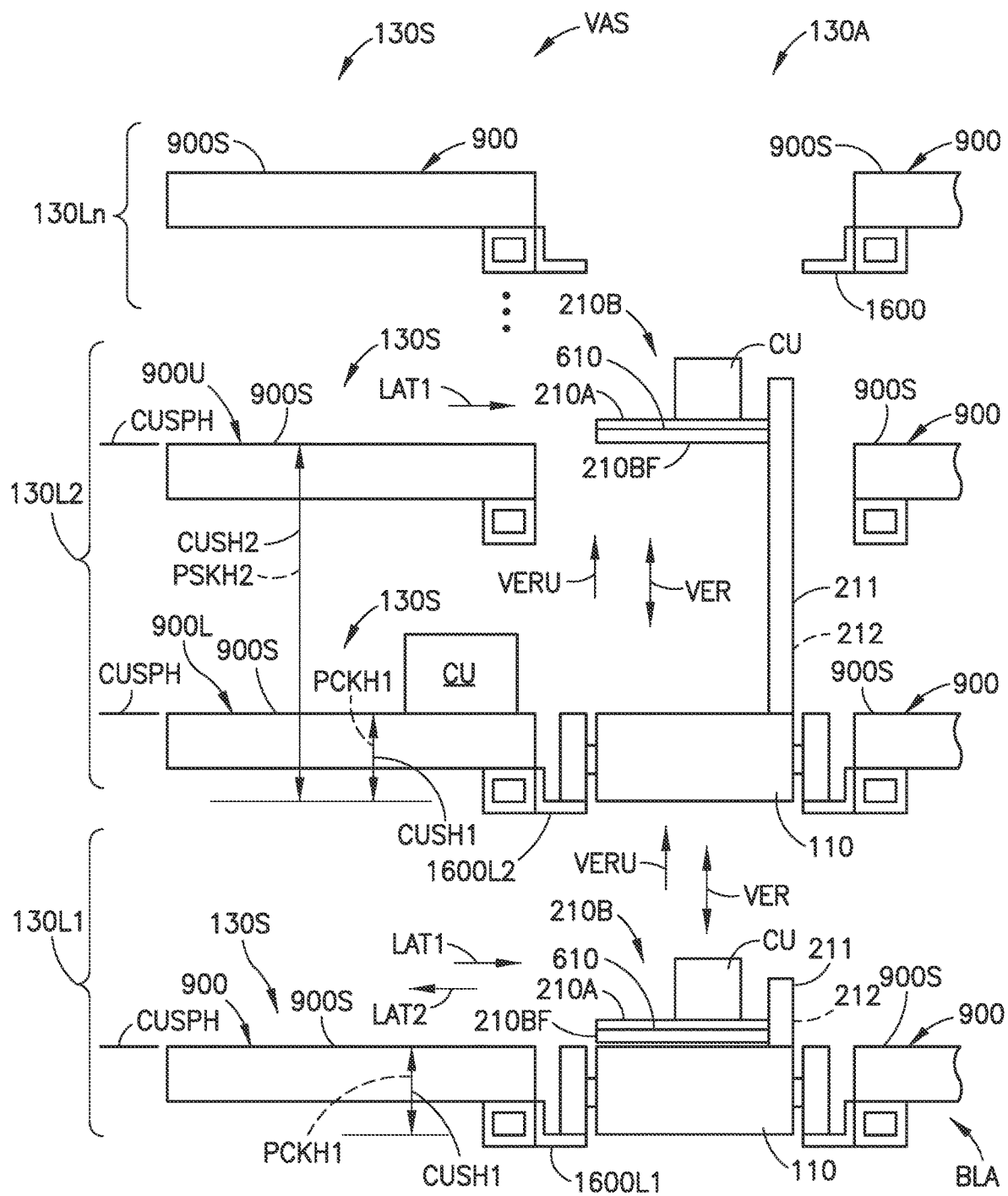
FIG. 16 is an exemplary schematic illustration of a portion of the storage and retrieval system of FIG. 1 in accordance with aspects of the disclosed embodiment.

As will be described herein, effecting the at least two degrees of registration of the case unit CU substantially coincident with loading the payload bay 21B with the case unit CU enables initiation of vehicle 110 travel (transporting the loaded case unit CU) substantially coincident with loading the case unit on the vehicle 110 for each case unit CU loaded on the vehicle 110. As an example, an exemplary case unit pick operation of the bot 110 within a picking aisle 130A will be described in accordance with the aspects described herein. It should be understood that the case unit pick operation of the bot 110 on the transfer deck is substantially similar. As described herein, the picking aisles include rails 1600 (and/or solid decks) on which the bot 110 travels. Each level 130L of the storage structure includes the rails 1600 providing the bots 110 on that level 130L access to the storage locations 130S of case unit supports 900 within the picking aisles 130A. As can be seen in FIG. 16, each level 130L includes at least one level of case unit supports 900 that are accessible from the rails 1600 of the respective level. For example, level 130L1 includes a single level of case unit supports 900 accessible from rails 1600L1, while level 130L2 includes two levels of case unit supports 900 accessible from common rails 1600L2 (i.e., the rails 1600L2 are common to both upper and lower case unit supports 900U, 900L of level 130L2 so that a bot 110 on the common rails 1600L2 can access both the upper and lower case unit supports 900U, 900L).

The bot 110 on a predetermined level 130L is commanded, such as by control server 120 or warehouse management system 2500, to pick a predetermined case unit CU. The bot 110 travels along the transfer deck 130B on the predetermined level 130L to a picking aisle 130A in which the case unit CU is located, where bot travel and bot picking/placing operations are under control of, for example, bot controller 1220 or other suitable controller in communication with the bot 110. The bot 110 is configured as described herein so that the articulated underpick end effector or arm 210A extends and retracts (e.g., in direction LAT) loading the payload or case unit CU at each predetermined pick height PCKH1, PCKH2 (e.g., corresponding to a height CUSH1, CUSH2 of a predetermined case unit support 900, 900U, 900L) of the articulated underpick end effector 210A. In one or more aspects, each pick height of the end effector 210A is selectable from different predetermined pick heights, and the payload support plane 610P is disposed so that seating of the payload CU is substantially constant and independent of the pick height PCKH1, PCKH2 of the articulated underpick end effector 210A loading the payload CU. In one or more aspects, each pick height PCKH1, PCKH2 is selectable from different predetermined pick heights PCKH1, PCKH2, and the registration facets register the payload CU loaded (and deregister an unloading payload) independent or decoupled from the pick height PCKH1, PCKH2 of the articulated underpick end effector 210A loading (or unloading) the payload CU. As can be seen in FIG. 16, the articulated underpick end effector 210A extends and retracts loading the payload CU at each payload storage shelf height CUSH1, CUSH2 in a vertical array of storage shelves VAS at different heights (from a base level BLA of the vertical array of storage shelves VAS), and the registration facets register the payload CU loaded (and deregister an unloading payload) independent or decoupled from the payload storage shelf height CUSH1, CUSH2. Here, the payload support plane 610P is movable relative to the frame 200F in at least one degree of freedom (e.g., at least in direction VER) commensurate with motion of the articulated underpick end effector 210A with respect to the frame 200F and/or the payload support plane 610P is movable relative to a pick height PCKH1, PCKH2 of the articulated underpick end effector 210A (see, e.g., FIGS. 6A-6F—such as where the movement of the justification tray 600 is arrested by the frame 200F or moved in direction VERT by actuator 666A).

Figure 18:
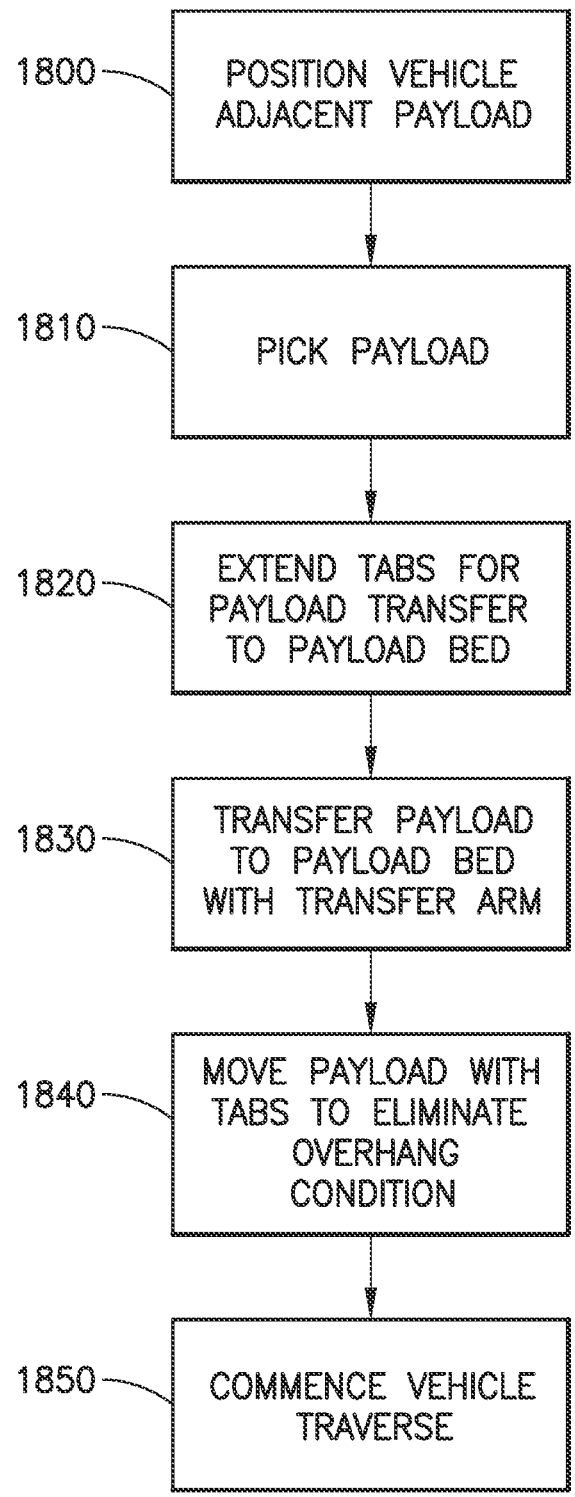
FIG. 18 is an exemplary flow diagram for an exemplary method in accordance with aspects of the disclosed embodiment.

As an example of the above-mentioned picking/placing operations, bot 110 on level 130L1, the bot 110 enters the picking aisle 130A and with any suitable bot odometry and/or sensor guidance stops in the picking aisle 130A at the location of the case unit CU (FIG. 18, Block 1800). The distance between the fingers 210AF (or finger segments 210S1-210S7) is adjusted according to a size of the case unit in the manner described herein. The distance between the fingers 210AF (or finger segments 210S1-210S7) is adjusted on-the-fly as the bot 110 is in transit to the case unit CU storage location 130S and/or when the bot 110 is stopped adjacent the case unit CU storage location 130S. As can be seen in FIGS. 9A and 14A, the fingers 200AF are aligned with slats 900S of the picking aisle storage location 130S so that the fingers 210AF are moved/extended in direction LAT2 and positioned underneath the case unit CU for picking the case unit CU (FIG. 18, Block 1810).

In the manner described above, the fingers 210AF are moved in direction VERU to a predetermined pick height PCKH1, PCKH2 to pick (or place) the case unit CU from (or to) the storage location 130S. Here, the fingers 210AF are moved in direction VERU by lifting the payload bed 210B (and the payload support plane 610P thereof) with the lift towers 211, 212. With the case unit CU supported on the fingers 210AF the fingers 210AF are moved/retracted in direction LAT1 to transfer the case unit CU into the payload bed 210B (e.g., or move/extend in direction LAT2 to transfer the case unit CU from the payload bed 210B) as illustrated in FIGS. 14B and 16. Here, the registration facets are configured to effect payload or case unit CU engagement with the at least two degrees of registration (as described herein) registering the payload substantially coincident with the arm 210A positioning the case unit CU on the payload contact support surface 610 loading the payload bay 210B. For example, as described above, the distance or gap CAG between the case unit support surface 210AFS of the fingers 210AF and the arcuate support surface 621 of the justification tray 600 is only so much (i.e., minimized) as to allow movement of the case unit CU above the arcuate support surfaces 621 without contact. Here, seating of the case unit CU on the justification tray 600 is substantially immediately proximate to the end effector 210A positioning the underpick case unit CU within the payload bay 210B loading the payload bay 210B. For example, required movement of the payload bed 210B and fingers 210AF carried thereby in direction VERL so that the arcuate support surfaces 621 protrudes above the case unit support surface 210AFS of the fingers 210AF is minimized such that the movement occurs (and is completed) substantially immediate upon the movement of the payload bed 210B and fingers 210AF in direction VERL (such as where the movement of justification tray is arrested by the frame 200F); while in other aspects, the actuator 666A causes movement of the arcuate support surfaces 621 protrudes above the case unit support surface 210AFS of the fingers 210AF. Here, seating of the case unit or payload CU on the arcuate support surfaces 621 of the support surface 610 (i.e., of the justification tray 600) registers the payload CU in the two degrees of registration (e.g., vertically in direction VER and planar in directions LON/LAT) substantially coincident with a completed retraction of the fingers 210AF into the payload bed 210B. The arcuate support surfaces 621 are configured to stably hold the payload and allow the vehicle 110 to begin traverse movement (e.g., along the picking aisle 130A or transfer deck 130B) substantially coincident with seating of the payload on the justification tray 600.

With the case unit or payload CU seated on the justification tray 600, and substantially coincident with placement of the case unit CU on the support surface 610 of the justification tray 600 (and with the vehicle already traversing along the picking aisle 130A or transfer deck 130B), the justification bars 222, 223 are moved in direction LON so that the justification bars 222, 223 are located adjacent to respective sides of the case unit CU. Movement of the justification bars 222, 223 may begin in direction LON prior to or after the case unit is transferred to the payload bed 210B. Where the justification bars 222, 223 are moved in direction LON to be adjacent the respective sides of the case unit CU before the case unit CU is transferred into the payload bed 210B, the justification bars 222, 223 are moved base upon an expected size of the case unit to be picked.

Figure 14C:
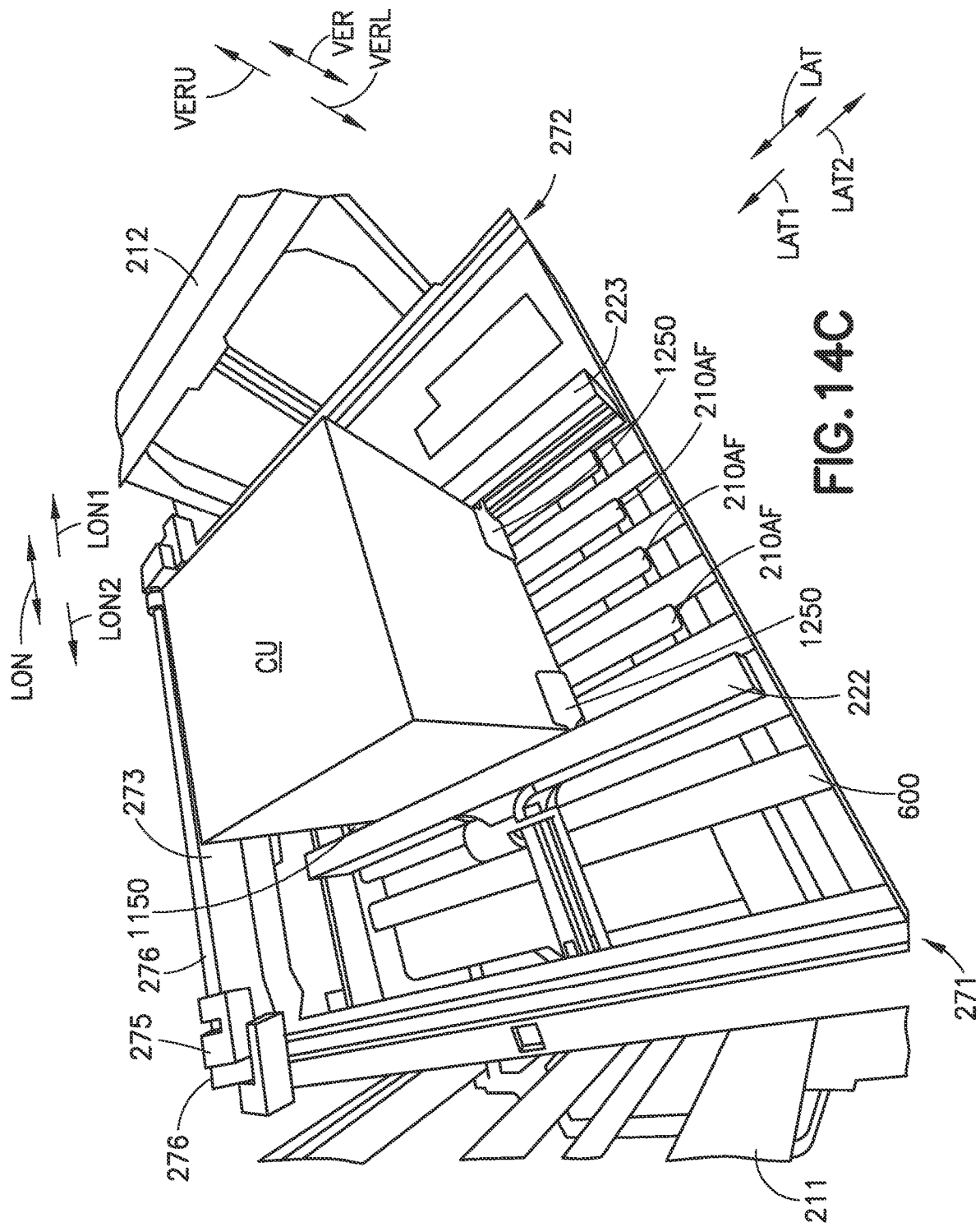
Figure 17A:
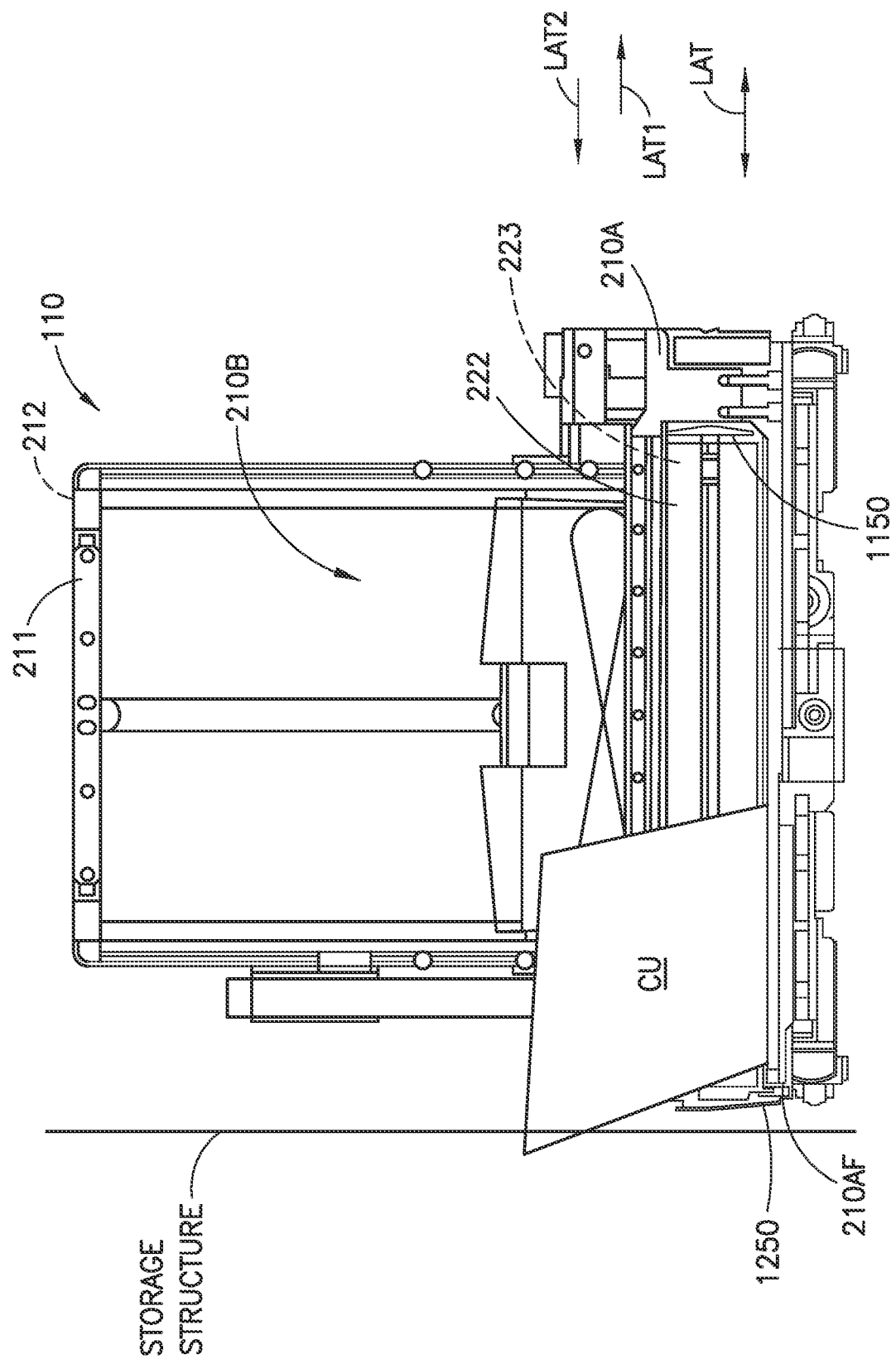
FIGS. 17A and 17B are schematic sectional illustrations of the autonomous transport vehicle of FIGS. 2A-2D with the payload bed in a lowered position in accordance with aspects of the disclosed embodiment.
Figure 17B:
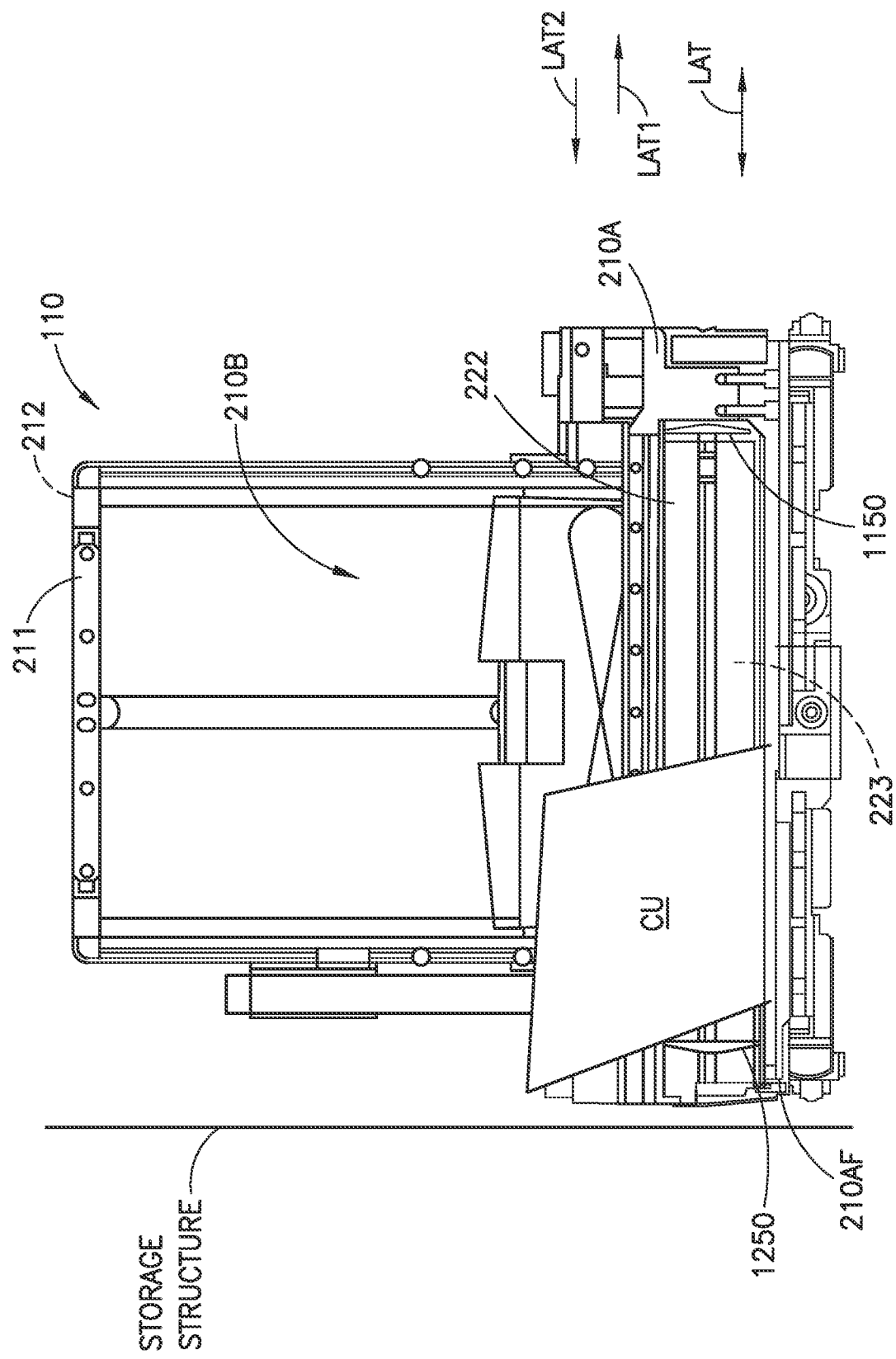

It is also noted that the tabs 1250 are also extended but in a retracted position (FIG. 18, Block 1820), such as in FIG. 14A, to allow substantially unhindered transfer of the case unit CU into the payload bed 210B with the transfer arm 210A in a manner similar to that described above (FIG. 18, Block 1830). Referring also to FIGS. 17A and 17B, with the case unit CU in the payload bed 210B, and substantially coincident with placement of the case unit CU on the support surface 610, the tabs 1250 are rotated in direction 1291 about the respective rotation axis 1290 so as to extend the tabs 1250 into a case unit engagement position as illustrated in FIG. 14B. The tabs 1250 are moved in direction LAT1 in the manner described above so that the case unit CU is pulled into the payload bed 210B, as shown in FIG. 14C, to remediate any case overhang condition (e.g., the case unit CU extends at least partially out of the payload bed 210B past the payload bed frame 210BF and/or cantilevered tips of the fingers 210AF—see FIG. 17A).

A case overhang position may be present where the vehicle 110 picks a case unit CU from a "deep" pick position (the deep pick position may be a position on the storage shelf where the predetermined storage position of the case unit partially extends beyond the physical reach of the transfer arm 210A but only so much that the case unit CU in the "deep" pick position can still be stably picked and placed by the transfer arm 210A). The case overhang condition may be such that the case unit CU may contact the storage structure if the vehicle 110 were to traverse along the picking aisle 130A or transfer deck 130B. Here, as the case unit CU is being retracted into the payload bed 210B, the tabs 1250 engage the case unit CU and pull the case unit into the payload bed 210B so as to substantially eliminate the case overhang position (see FIG. 17B) substantially coincident with the seating of the case unit CU on the support surface 610 so as to facilitate traverse movement of the vehicle 110, as described herein, substantially simultaneously with the registration of the case unit CU on the support surface 610 in the two degrees of registration (FIG. 18, Block 1840). As may be realized, the tabs 1250 may pull the case unit (e.g., from the overhang condition) into the payload bed 210B just enough to clear the storage and retrieval structure so that with the case unit CU seated in the payload bed 210B with the two degrees of registration, the vehicle 110 commences traverse movement (FIG. 18, Block 1850) along the picking aisle 130A or transfer deck 130B substantially coincident with and immediately upon seating of the case unit in the payload bed 210B.

In one or more aspects, substantially coincident with placement of the case unit CU on the support surface 610, the pusher arms 1150 are moved in direction LAT2 to push the case unit against the tabs 1250 for gripping the case unit. Here, the case unit may be registered with at least two degrees of registration into the position illustrated in FIG. 14C, from the skewed position illustrated in FIG. 2D.

As another example of the above-mentioned picking/placing operations, bot 110 on level 130L2 enters the picking aisle 130A and stops in the picking aisle 130A at the location of the case unit CU in a manner similar to that described above (FIG. 18, Block 1800). The distance between the fingers 210AF (or finger segments 210S1-210S7) is adjusted according to a size of the case unit in the manner described above. Also, in the manner described above, and with the bot 110 on the common rails 1600L2 the fingers 210AF are moved in direction VERU to pick the case unit CU from the storage location 130S of one or more of the upper case unit supports 900U and the lower case unit supports 900L of level 130L2 respectively disposed at heights CUSH2, CUSH1 (FIG. 18, Block 1810). Here, the fingers 210AF are moved in direction VERU to a predetermined one or more of pick heights PCKH1, PCKH2 by lifting the payload bed 210B (and the case unit support plane 610P thereof) with the lift towers 211, 212. With the case unit CU supported on the fingers 210AF, the fingers 210AF are moved/retracted in direction LAT1 to transfer the case unit into the payload bed 210B (or moved/extended in direction LAT2 to transfer the case unit from the payload bed 210B) as illustrated in FIGS. 14B and 16 (FIG. 18, Block 1830). Here, the registration facets are configured to effect payload or case unit CU engagement with the at least two degrees of registration registering the payload substantially coincident with the arm 210A positioning the case unit CU on the payload contact support surface 610 loading the payload bay 210B. Again, the distance or gap CAG between the case unit support surface 210AFS of the fingers 210AF and the arcuate support surface 621 of the justification tray 600 is only so much (i.e., minimized) as to allow movement of the case unit CU above the arcuate support surfaces 621 without contact. Here, seating of the case unit CU on the justification tray 600 is substantially immediately proximate to the end effector 210A positioning the underpick case unit CU within the payload bay 210B loading the payload bay 210B as described above. In this example, the actuator 666A is employed to move the arcuate support surfaces 621 so the arcuate support surfaces 621 protrude above the case unit support surface 210AFS of the fingers 210AF. Here, seating of the case unit or payload CU on the arcuate support surfaces 621 of the support surface 610 (i.e., of the justification tray 600) registers the payload CU in the two degrees of registration (e.g., vertically in direction VER and planar in directions LON/LAT) substantially coincident with and substantially immediately upon a completed retraction of the fingers 210AF into the payload bed 210B. As described above, the arcuate support surfaces 621 are configured to stably hold the payload and allow the vehicle 110 to begin traverse movement (e.g., along the picking aisle 130A or transfer deck 130B) substantially coincident with seating of the payload on the justification tray 600.

In a manner similar to that described above, substantially coincident with placement of the case unit CU on the support surface 610 the justification bars 222, 223 are moved in direction LON so that the justification bars 222, 223 are located adjacent to respective sides of the case unit CU. The justification bars 222, 223 may be moved in direction LON prior to or after the case unit being transferred to the payload bed 210B. Where the justification bars 222, 223 are moved in direction LON to be adjacent the respective sides of the case unit CU before the case unit CU is transferred into the payload bed 210B, the justification bars 222, 223 are moved base upon an expected size of the case unit to be picked. As described above, the tabs 1250 are extended but in a retracted position with the case unit CU being transferred to the payload bed 210B by the transfer arm 210A (FIG. 18, Block 1820), such as in FIG. 14A, to allow substantially unhindered transfer of the case unit CU into the payload bed 210B (FIG. 18, Block 1830). With the case unit in the payload bed 210B, and substantially coincident with placement of the case unit CU on the support surface 610, the tabs 1250 are rotated in direction 1291 about the respective rotation axis 1290 so as to extend the tabs 1250 into a case unit engagement position as illustrated in FIG. 14B. The tabs 1250 are moved in direction LAT1 in the manner described above so that the case unit CU is pulled into the payload bed 210B, as shown in FIG. 14C, to substantially remediate/eliminate any case overhang condition (e.g., the case unit CU extends at least partially out of the payload bed 210B past the payload bed frame 210BF and/or cantilevered tips of the fingers 210AF—see FIGS. 17A and 17B) (FIG. 18, Block 1840). In one or more aspects, substantially coincident with placement of the case unit CU on the support surface 610, the pusher arms 1150 are moved in direction LAT2 to push the case unit against the tabs 1250 for gripping the case unit. Here, the case unit may be registered with at least two degrees of registration into the position illustrated in FIG. 14C, from the skewed position illustrated in FIG. 2D.

Figure 14D:
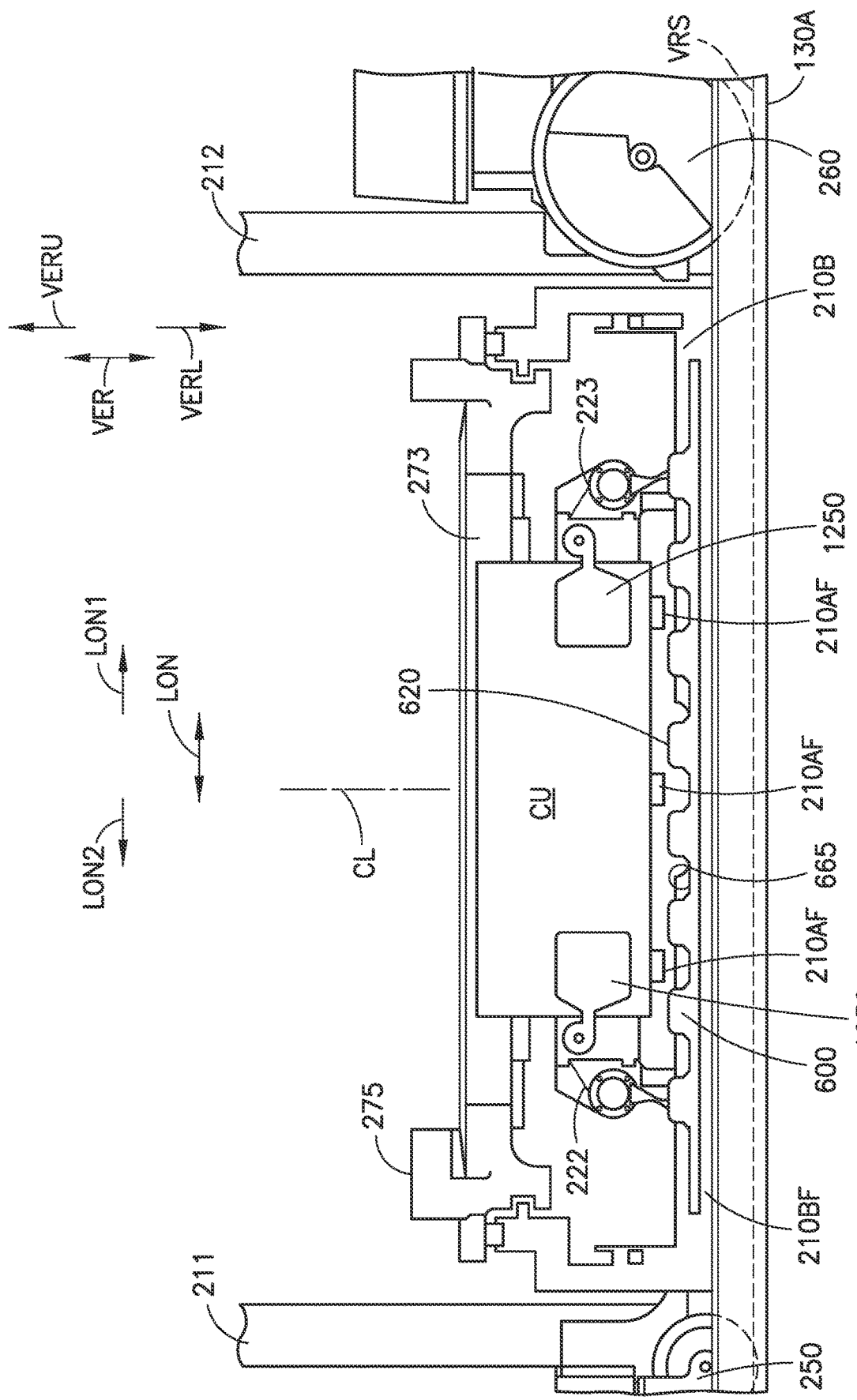
Figure 14F:
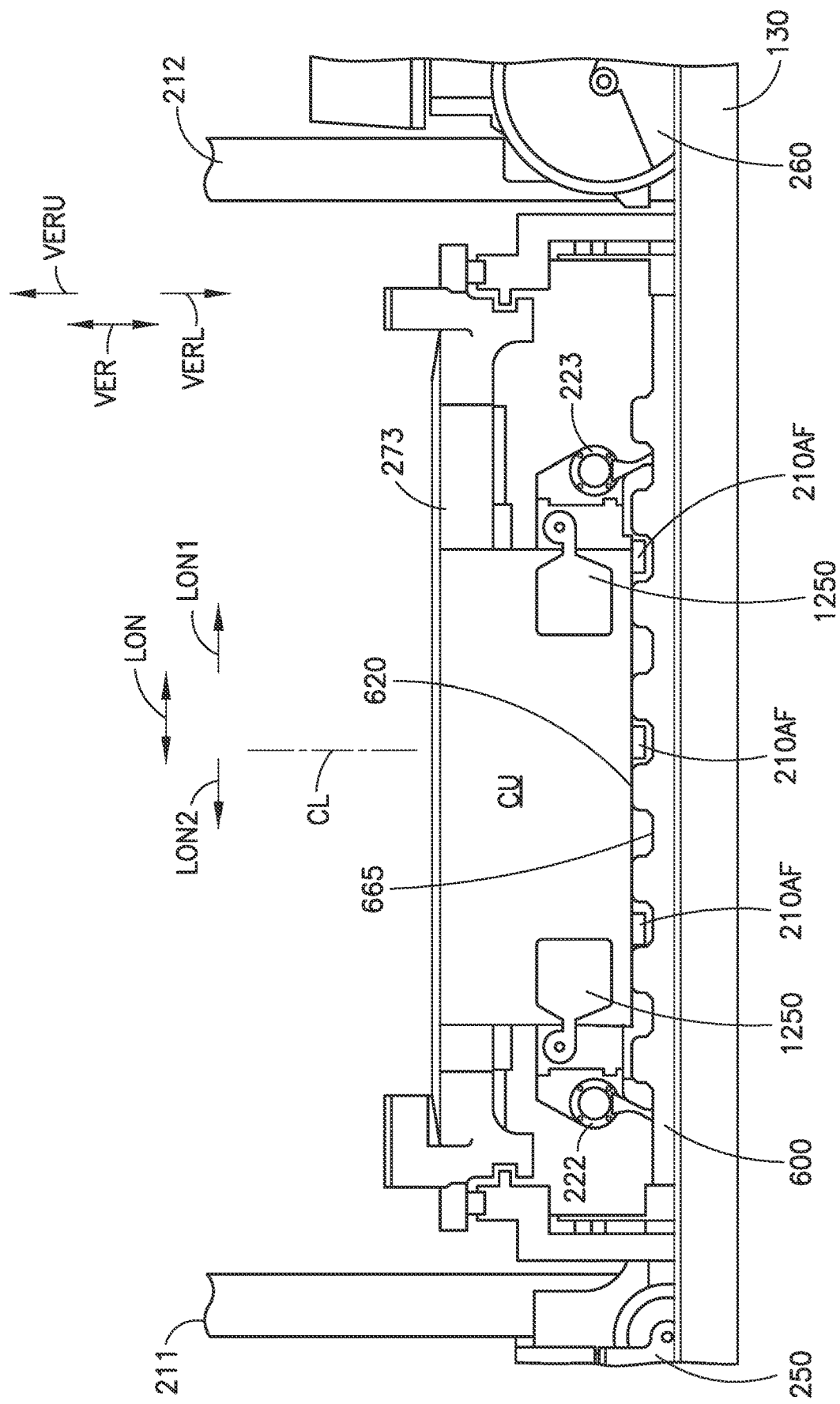

In one or more aspects, the justification bars 222, 223 (e.g., of the bot 110 located on any of the levels 130L illustrated in FIG. 16 and transferring a case unit) are moved in direction LON to grip and or justify the case unit CU within the payload bed 210B. FIGS. 14C, 14D, and 14E illustrate a center justification of the case unit where the case unit is positioned by the justification bars 222, 223 substantially at or along a centerline CL of the payload bed. However, in other aspects, the case unit is justified to a location that is off-center relative to the centerline CL. As described above, the case unit CU is moved in direction LON, with the case unit CU held in the payload bed 210B, with the case unit CU being supported by the fingers 210AF and/or by the justification tray 600. FIG. 14E illustrates placement of the case unit CU onto the protrusions 620 of justification tray 600 for justification to a position off-center relative to centerline CL (see FIG. 14F) where the off-center position still allows the case unit CU to be lifted with all of the fingers 210AF substantially underneath the case unit CU. Placing a case unit from the justified location within the payload bed occurs in a manner substantially opposite to that described above.

In accordance with the aspects of the disclosed embodiment, and as described herein, the at least two degrees of registration include registration on the support surface 610, registration in direction LON and in direction LAT. For example, the arm 210A seating the case unit CU on the payload support plane 610P (e.g., on the justification tray 600) effects registration of the case unit CU in the at least two degrees of registration relative to the bot frame 200F. As described herein, the arm 210A seating of the case unit CU on the payload support plane 610P is substantially immediately proximate to the end effector positioning the underpick case unit CU within the payload bay 210B loading the payload bay 210B. It is noted that effecting at least two degrees of registration of the case unit CU substantially coincident with loading the payload bay 21B with the case unit CU enables initiation of vehicle 110 travel (transporting the loaded case unit CU along a licking aisle 130A or transfer deck 130B) substantially coincident with loading the case unit on the vehicle 110 for each case unit CU loaded on the vehicle 110, regardless of the case unit support plane CUSPH height CUSH1, CUSH2 relative to the bot frame 200F or rails 1600 (i.e., regardless of whether the case unit CU is picked from an upper case unit support 900U or a lower case unit support 900L of a level 130L) (FIG. 18, Block 1850).

Figure 17C:
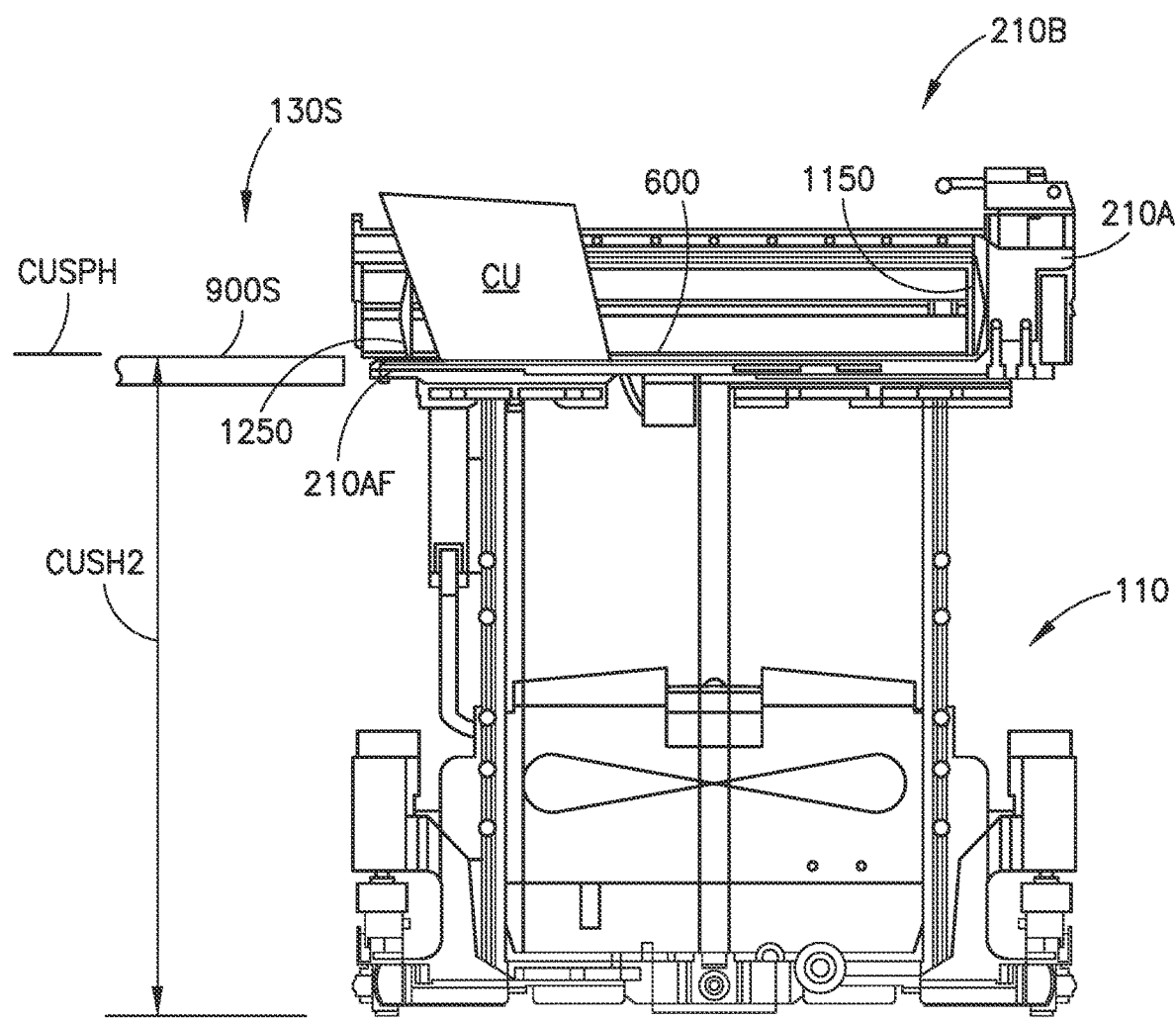
FIGS. 17C and 17D are schematic sectional illustrations of the autonomous transport vehicle of FIGS. 2A-2D with the payload bed in a raised position in accordance with aspects of the disclosed embodiment.
Figure 17D:
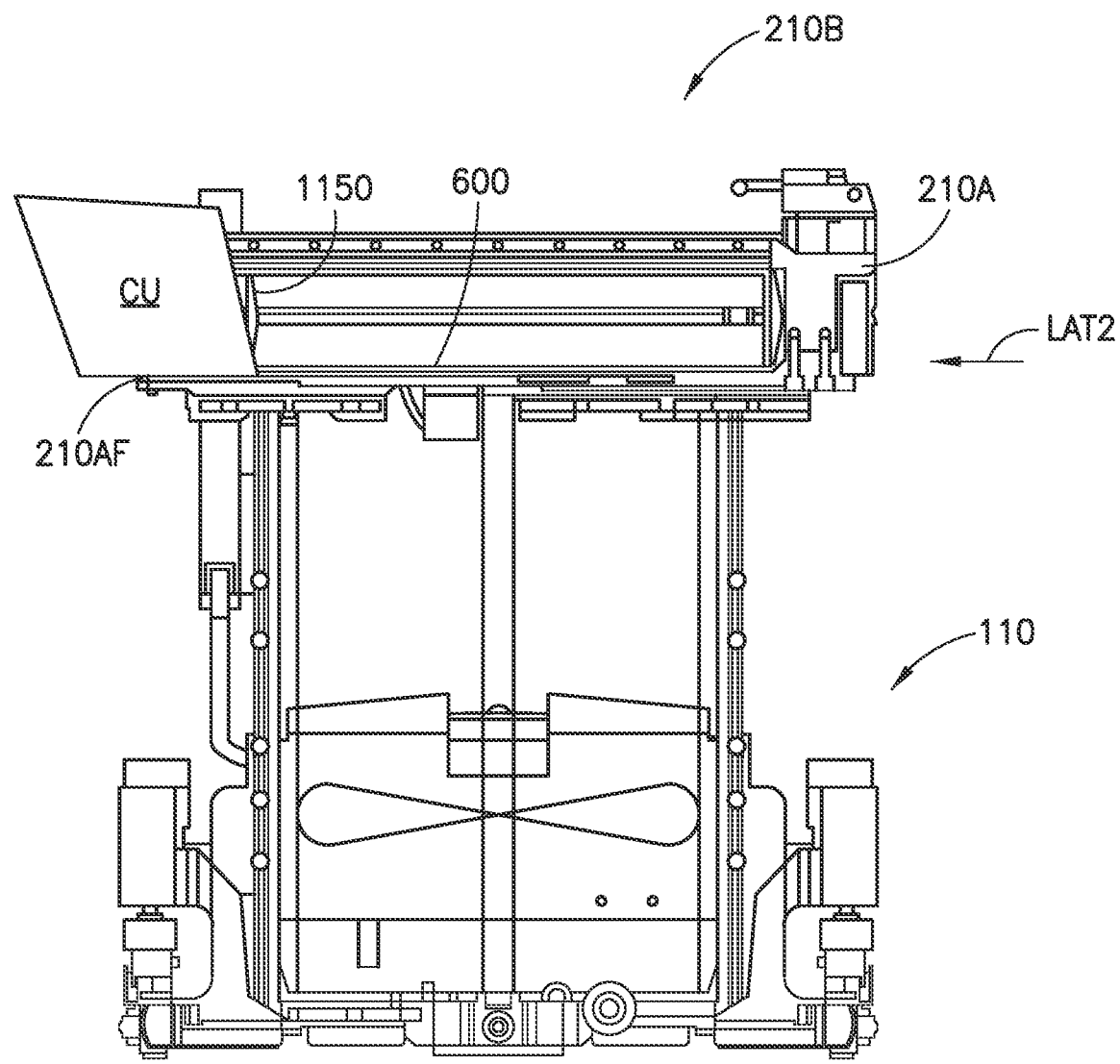
Figure 19:
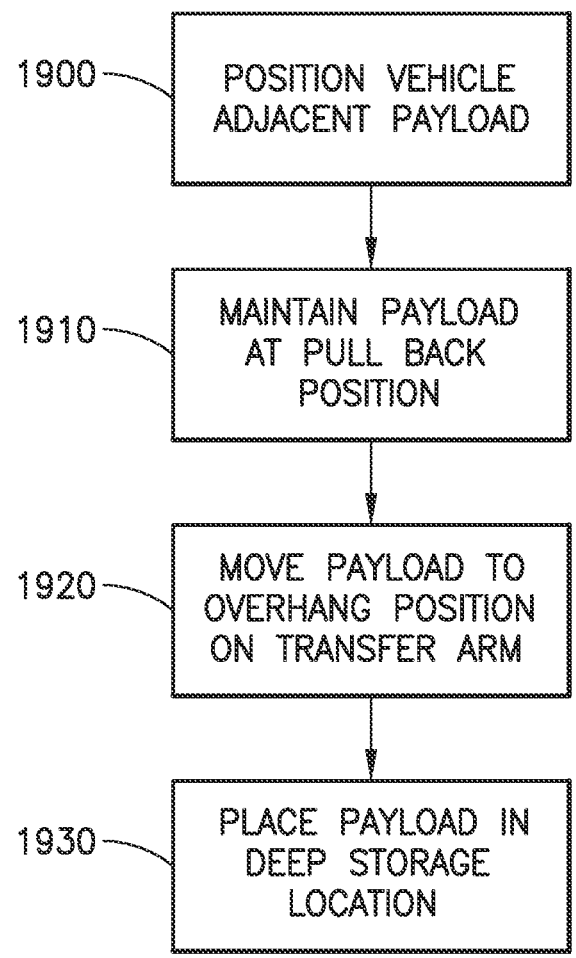
FIG. 19 is an exemplary flow diagram for an exemplary method in accordance with aspects of the disclosed embodiment.

Placement of a case unit CU onto a support shelf (e.g., in a storage space 130S or other suitable location of the storage and retrieval system) from the autonomous transport vehicle 110 may occur in a manner substantially opposite to that described above. For example, the vehicle 110 is positioned at a predetermined location adjacent a storage space 130S (or other holding location) at which the case unit CU is to be placed (FIG. 19, Block 1900). With placement of a case unit CU to a storage location 130S of one or more of the upper case unit supports 900U of, for example, level 130L2 disposed at height CUSH2, the tab 1250 is employed to maintain the case unit CU in a "pulled back position" so that the case unit CU does not contact structure (e.g., shelving, etc.) of the storage and retrieval system 100 (see FIG. 17C) as the case unit CU is lifted (with the payload bed 210B) to the predetermined pick/place height PCKH2 (FIG. 19, Block 1910). Where the case unit CU is to be stored/placed at a "deep" storage space 130S, the pusher arms 1150 move in direction LAT2 (e.g., with the payload bed 210B and transfer arm 210A at the predetermined pick/place height PCKH2) so as to place the case unit in an overhang position (see FIG. 17D) (FIG. 19, Block 1920) to facilitate the placement of the case unit CU by the transfer arm 210A in the "deep" storage location 130S (FIG. 19, Block 1930).

Also, in the manner described above, and with the bot 110 on the common rails 1600L2 the fingers 210AF are moved in direction VERU to pick the case unit CU from the storage location 130S of one or more of the upper case unit supports 900U and the lower case unit supports 900L of level 130L2 respectively disposed at heights CUSH2, CUSH1. Here, the fingers 210AF are moved in direction VERU to a predetermined one or more of pick heights PCKH1, PCKH2 by lifting the payload bed 210B (and the case unit support plane 610P thereof) with the lift towers 211, 212. With the case unit CU supported on the fingers 210AF, the fingers 210AF are moved/retracted in direction LAT1 to transfer the case unit into the payload bed 210B (or moved/extended in direction LAT2 to transfer the case unit from the payload bed 210B) as illustrated in FIGS. 14B and 16.

Still referring to FIG. 2C, the autonomous transport vehicle 110 includes a vision system configured to effect case handling by verifying a correct size case is picked, verify the case dimensions, and to verify the case orientation and location. The vision system substantially continuously monitors case unit CU position in the payload bay 210B and provides the controller 1220 with update case unit CU position data at any suitable time intervals. Here, the case handling assembly 210 includes one or more of case edge detection sensor(s) CED, case yaw detection sensor(s) CYD, case overhand sensor(s) COH, shelf sensor(s) SS, three-dimensional image sensor(s) IMF, and extension cameras EXT, each of which is communicably coupled to controller 1220 for informing the controller of case/shelf positions to effect pick and place of case units CU as described herein. It is noted that the term "camera" described herein is a still imaging or video imaging device that includes one or more of a two-dimensional camera, a two dimensional camera with RGB (red, green, blue) pixels, a three-dimensional camera with XYZ+A definition (where XYZ is the three-dimensional reference frame of the camera and A is one of a radar return strength, a time of flight stamp, or other distance determination stamp/indicator), and an RGB/XYZ camera which includes both RGB and three-dimensional coordinate system information, non-limiting examples of which are provided herein.

The case edge detection sensor(s) CED are any suitable sensors such as laser measurement sensors configured to scan the shelves of the storage and retrieval system to verify the shelves are clear for placing case units CU, or to verify the case unit size and position before picking the case unit CU. While, on case edge detection sensor CED illustrated on each side of the payload bay 210B there may be more or less than two case edge detection sensors placed at any suitable locations on the vehicle 110 so that the vehicle 110 can traverse by and scan case units CU with the front end 200E1 leading a direction of vehicle travel or the rear/back end 200E2 leading the direction of vehicle travel.

The case yaw detection sensor CYD are mounted to, for example, the inside of the payload bay 210B. The case yaw detection sensors are any suitable sensors such as laser measurement sensors. The case yaw detection sensors CYD are positioned so as to be aimed or directed at a case unit CU being picked so as to measure the yaw or skew of the case unit CU (see FIG. 2D) and inform the controller 1220 of the orientation of the case unit CU.

The case overhang sensor(s) COH are in one aspect a through beam sensor having an emitter and receiver located on opposite sides of the payload bay 210B in an opposing manner; while in other aspects reflective sensors or other suitable detection/proximity sensor may be employed. The case overhang sensor(s) COH are positioned adjacent the transfer opening 1199 such as with the case overhang sensor(s) COH detecting a case unit CU/obstruction the controller 1120 is informed that a case unit is extending out of the payload bay 210B through the transfer opening 1199.

The shelf sensors SS are disposed at any suitable location of the case handling assembly (such as one sensor located on each side of the payload bay 210B) to sense a shelf and verify shelf hat positions (see FIG. 9A) for picking case units CU and placement of the fingers of the transfer arm 210A between the shelf hats.

The three-dimensional image sensor(s) IMF (e.g., time-of-flight cameras, imaging radar systems, light detection and ranging (LIDAR), etc.) are suitably positioned relative to the payload bay 210B and are employed to measure the position and orientation of the case unit CU in the payload bay 210B. While one three-dimensional image sensor(s) IMF is illustrated there may be more than one.

The extension camera(s) EXT are positioned at the rear of the payload bay 210B (opposite the transfer opening 1199) and are positioned so that a field of view of the extension camera(s) EXT is within the payload bay 210B to record case unit pick and places. The extension camera(s) EXT may be employed by the controller 1220 or operators of the storage and retrieval system for debugging and/or teaching (e.g., to automation of the storage and retrieval system) pick place operations.

Figure 15:
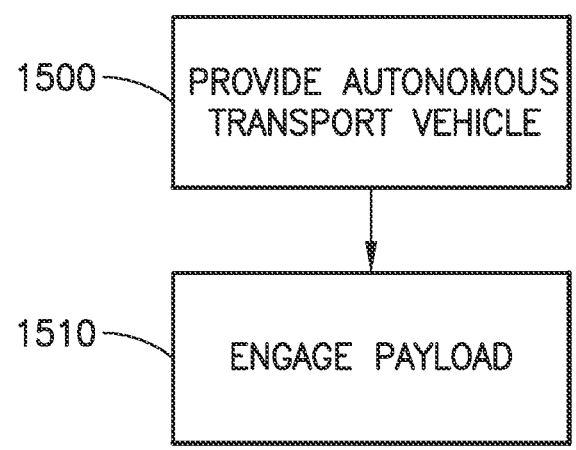
FIG. 15 is an exemplary flow diagram for an exemplary method(s) in accordance with aspects of the disclosed embodiment.

Referring to FIGS. 2A-2D, 9A, 14A-14F, and 15 an exemplary method will be described in accordance with aspects of the disclosed embodiment. Here, an autonomous transport vehicle 110 is provided (FIG. 15, Block 1500). The autonomous transport vehicle has a frame 200F forming a transport payload area or bay 210B of the vehicle 110, the payload bay 210B includes a payload contact support surface 610 that defines a payload support plane 610P (FIG. 14E) that supports the payload (e.g., case unit CU) held in the payload bay 210B with vehicle 110 traverse. The payload bay 210B further includes an (articulated) underpick end effector or arm 210A configured to engage and underpick (as described herein) the payload CU with respect to the payload support plane 610P, and extend and retract with respect to the payload bay 21B effecting payload CU transfer to and from the payload bay 210B unloading and loading the payload bay 21B. Payload registration facets (as described herein) are also mounted to the frame 200F. The payload CU held in the payload area is engaged with the payload (FIG. 15, Block 1510) registration facets. The registration facets are disposed to provide, upon engagement with the payload CU, at least two degrees of registration capturing and securing the payload CU in a predetermined position in the payload bay 210B, and are configured to effect payload engagement with the at least two degrees of registration registering the payload substantially coincident with seating of the payload on the payload support plane 610P of the payload bay 210B. In one or more aspects, as described herein, the seating of the payload or case unit CU, on the payload support plane 610P, is effected with a common seating motion between the end effector or arm 210A and the payload support plane 610P for each pick of the arm 210A from each different support plane height CUSH1, CUSH2 (see FIG. 16) of the storage space 130S.

The method may further include effecting, with the registration facets, payload CU engagement with the at least two degrees of registration registering the payload CU substantially coincident with the end effector 210A positioning the payload CU on the payload contact support surface 610 loading the payload area 210B. The method may include effecting, with the end effector 210A seating the payload CU on the payload support plane 610P, registration of the payload CU and the registration facets in at least one degree of registration of the at least two degrees of registration of the payload CU relative to the autonomous transport vehicle 110 frame 200F. The method may include effecting, with the end effector 210A seating the payload CU on the payload contact support surface 610, registration of the payload CU and the registration facets in at least one degree of registration of the at least two degrees of registration of the payload CU relative to the autonomous transport vehicle 110 frame 200F. The end effector 210A seating of the payload CU on the payload support plane 610P is substantially immediately proximate to the end effector 210A positioning the payload CU within the payload area 210B loading the payload area 210B. Effecting at least two degrees of registration of the payload CU substantially coincident with loading the payload area 210B with the payload CU enables initiation of vehicle 110 travel substantially coincident with loading the payload CU on the vehicle 110 for each payload CU loaded on the vehicle 110.

In accordance with one or more aspects of the disclosed embodiment an autonomous transport vehicle for transporting a payload comprises:
- a frame forming a transport payload area of the vehicle, the payload area includes a payload contact support surface that defines a payload support plane that supports the payload held in the payload area with vehicle traverse;
- the payload area further includes an articulated underpick end effector configured to engage and underpick the payload with respect to the support plane, and extend and retract with respect to the payload area effecting payload transfer to and from the payload area unloading and loading the payload area; and
- payload registration facets mounted to the frame so as to engage the payload held in the payload area;
- wherein the registration facets are disposed to provide, upon engagement with the payload, at least two degrees of registration capturing and securing the payload in a predetermined position in the payload area, and are configured to effect payload engagement with the at least two degrees of registration registering the payload substantially coincident with seating of the payload on the payload support plane of the payload area.

In accordance with one or more aspects of the disclosed embodiment the articulated underpick end effector extends and retracts loading the payload at each predetermined pick height of the articulated underpick end effector, and each pick height is selectable from different predetermined pick heights, and the payload support plane is disposed so that seating of the payload is substantially constant and independent of the pick height of the articulated underpick end effector loading the payload.

In accordance with one or more aspects of the disclosed embodiment the articulated underpick end effector extends and retracts loading the payload at each predetermined pick height of the articulated underpick end effector, and each pick height is selectable from different predetermined pick heights, and the registration facets register the payload loaded (and deregister an unloading payload) independent or decoupled from the pick height of the articulated underpick end effector loading (or unloading) the payload.

In accordance with one or more aspects of the disclosed embodiment the articulated underpick end effector extends and retracts loading the payload at each payload storage shelf height in a vertical array of storage shelves at different heights (from a base level of the vertical array of storage shelves), and the registration facets register the payload loaded (and deregister an unloading payload) independent or decoupled from the payload storage shelf height.

In accordance with one or more aspects of the disclosed embodiment the payload support plane is movable relative to the frame in at least one degree of freedom commensurate with motion of the articulated underpick end effector with respect to the frame.

In accordance with one or more aspects of the disclosed embodiment the payload support plane is movable relative to the frame in at least one degree of freedom and movable relative to a pick height of the articulated underpick end effector.

In accordance with one or more aspects of the disclosed embodiment the registration facets are configured to effect payload engagement with the at least two degrees of registration registering the payload substantially coincident with the end effector positioning the payload on the payload contact support surface loading the payload area.

In accordance with one or more aspects of the disclosed embodiment the articulated underpick end effector seating the payload on the payload support plane effects registration of the payload and the registration facets in at least one degree of registration of the at least two degrees of registration of the payload relative to the frame.

In accordance with one or more aspects of the disclosed embodiment the articulated underpick end effector seating the payload on the payload contact support surface effects registration of the payload and the registration facets in at least one degree of registration of the at least two degrees of registration of the payload relative to the frame.

In accordance with one or more aspects of the disclosed embodiment the articulated underpick end effector seating of the payload on the payload support plane is substantially immediately proximate to the articulated underpick end effector positioning the payload within the payload area loading the payload area.

In accordance with one or more aspects of the disclosed embodiment effecting at least two degrees of registration of the payload substantially coincident with loading the payload area with the payload enables initiation of vehicle travel substantially coincident with loading the payload on the vehicle for each payload loaded on the vehicle.

In accordance with one or more aspects of the disclosed embodiment the articulated underpick end effector is configured to engage an underside of the payload and pick up the payload therefrom effecting transfer of the payload by the autonomous transport vehicle.

In accordance with one or more aspects of the disclosed embodiment an autonomous transport vehicle for transporting a payload comprises:

a frame forming a transport payload area of the vehicle, the payload area includes a payload contact support surface that defines a payload support plane of the vehicle that supports the payload held in the payload area with vehicle traverse;

the payload area further includes an underpick end effector configured to engage and underpick the payload with respect to a support plane of a storage space and effect payload transfer to and from the support plane of the storage space unloading and loading the payload area; and payload registration facets mounted to the frame so as to engage the payload held in the payload area;

wherein the registration facets are disposed to provide, upon engagement with the payload, at least two degrees of registration capturing and securing the payload in a predetermined position in the payload area, and are configured to effect payload engagement with the at least two degrees of registration registering the payload substantially coincident with seating of the payload, on the payload support plane of the payload area, effected with a common seating motion between the underpick end effector and payload support plane for each pick of the end effector from each different support plane height of the storage space.

In accordance with one or more aspects of the disclosed embodiment the common seating motion is a minimum motion closing a (common) clearance air gap between the payload support plane and the underpick end effector at a payload pick height of the underpick end effector for each different support plane height of the storage space.

In accordance with one or more aspects of the disclosed embodiment the underpick end effector extends and retracts loading the payload at each predetermined pick height of the underpick end effector, and each pick height is selectable from different predetermined pick heights, and the payload support plane is disposed so that seating of the payload is substantially constant and independent of the pick height of the underpick end effector loading the payload.

In accordance with one or more aspects of the disclosed embodiment the underpick end effector extends and retracts loading the payload at each predetermined pick height of the underpick end effector, and each pick height is selectable from different predetermined pick heights, and the registration facets register the payload loaded (and deregister an unloading payload) independent or decoupled from the pick height of the underpick end effector loading (or unloading) the payload.

In accordance with one or more aspects of the disclosed embodiment the underpick end effector extends and retracts loading the payload at each payload storage shelf height in a vertical array of storage shelves at different heights (from a base level of the vertical array of storage shelves), and the registration facets register the payload loaded (and deregister an unloading payload) independent or decoupled from the payload storage shelf height.

In accordance with one or more aspects of the disclosed embodiment the payload support plane is movable relative to the frame in at least one degree of freedom commensurate with motion of the underpick end effector with respect to the frame.

In accordance with one or more aspects of the disclosed embodiment the payload support plane is movable relative to the frame in at least one degree of freedom and movable relative to a pick height of the underpick end effector.

In accordance with one or more aspects of the disclosed embodiment the registration facets are configured to effect payload engagement with the at least two degrees of registration registering the payload substantially coincident with the end effector positioning the payload on the payload contact support surface loading the payload area.

In accordance with one or more aspects of the disclosed embodiment the underpick end effector seating the payload on the payload support plane effects registration of the payload and the registration facets in at least one degree of registration of the at least two degrees of registration of the payload relative to the frame.

In accordance with one or more aspects of the disclosed embodiment the underpick end effector seating the payload on the payload contact support surface effects registration of the payload and the registration facets in at least one degree of registration of the at least two degrees of registration of the payload relative to the frame.

In accordance with one or more aspects of the disclosed embodiment the underpick end effector seating of the payload on the payload support plane is substantially immediately proximate to the underpick end effector positioning the payload within the payload area loading the payload area.

In accordance with one or more aspects of the disclosed embodiment effecting at least two degrees of registration of the payload substantially coincident with loading the payload area with the payload enables initiation of vehicle travel substantially coincident with loading the payload on the vehicle for each payload loaded on the vehicle.

In accordance with one or more aspects of the disclosed embodiment the underpick end effector is configured to engage an underside of the payload and pick up the payload therefrom effecting transfer of the payload by the autonomous transport vehicle.

In accordance with one or more aspects of the disclosed embodiment a method comprises:

providing an autonomous transport vehicle with: a frame forming a transport payload area of the vehicle, the payload area includes a payload contact support surface that defines a payload support plane that supports the payload held in the payload area with vehicle traverse, the payload area further includes an articulated underpick end effector configured to engage and underpick the payload with respect to the support plane, and extend and retract with respect to the payload area effecting payload transfer to and from the payload area unloading and loading the payload area, and payload registration facets mounted to the frame; and engaging the payload held in the payload area with the payload registration facets;

wherein the registration facets are disposed to provide, upon engagement with the payload, at least two degrees of registration capturing and securing the payload in a predetermined position in the payload area, and are configured to effect payload engagement with the at least two degrees of registration registering the payload substantially coincident with seating of the payload on the payload support plane of the payload area.

In accordance with one or more aspects of the disclosed embodiment the articulated underpick end effector extends and retracts loading the payload at each predetermined pick height of the articulated underpick end effector, and each pick height is selectable from different predetermined pick heights, and the payload support plane is disposed so that seating of the payload is substantially constant and independent of the pick height of the articulated underpick end effector loading the payload.

In accordance with one or more aspects of the disclosed embodiment the articulated underpick end effector extends and retracts loading the payload at each predetermined pick height of the articulated underpick end effector, and each pick height is selectable from different predetermined pick heights, and the registration facets register the payload loaded (and deregister an unloading payload) independent or decoupled from the pick height of the articulated underpick end effector loading (or unloading) the payload.

In accordance with one or more aspects of the disclosed embodiment the articulated underpick end effector extends and retracts loading the payload at each payload storage shelf height in a vertical array of storage shelves at different heights (from a base level of the vertical array of storage shelves), and the registration facets register (and deregister an unloading payload) the payload loaded independent or decoupled from the payload storage shelf height.

In accordance with one or more aspects of the disclosed embodiment the payload support plane is movable relative to the frame in at least one degree of freedom commensurate with motion of the articulated underpick end effector with respect to the frame.

In accordance with one or more aspects of the disclosed embodiment the payload support plane is movable relative to the frame in at least one degree of freedom and movable relative to a pick height of the articulated underpick end effector.

In accordance with one or more aspects of the disclosed embodiment the method further comprises effecting, with the registration facets, payload engagement with the at least two degrees of registration registering the payload substantially coincident with the end effector positioning the payload on the payload contact support surface loading the payload area.

In accordance with one or more aspects of the disclosed embodiment the method further comprises effecting, with the articulated underpick end effector seating the payload on the payload support plane, registration of the payload and the registration facets in at least one degree of registration of the at least two degrees of registration of the payload relative to the frame.

In accordance with one or more aspects of the disclosed embodiment the method further comprises effecting, with the articulated underpick end effector seating the payload on the payload contact support surface, registration of the payload and the registration facets in at least one degree of registration of the at least two degrees of registration of the payload relative to the frame.

In accordance with one or more aspects of the disclosed embodiment the articulated underpick end effector seating of the payload on the payload support plane is substantially immediately proximate to the articulated underpick end effector positioning the payload within the payload area loading the payload area.

In accordance with one or more aspects of the disclosed embodiment effecting at least two degrees of registration of the payload substantially coincident with loading the payload area with the payload enables initiation of vehicle travel substantially coincident with loading the payload on the vehicle for each payload loaded on the vehicle.

In accordance with one or more aspects of the disclosed embodiment the articulated underpick end effector engages an underside of the payload and pick up the payload therefrom effecting transfer of the payload by the autonomous transport vehicle.

In accordance with one or more aspects of the disclosed embodiment a method comprises:
providing an autonomous transport vehicle with: a frame forming a transport payload area of the vehicle, the payload area includes a payload contact support surface that defines a payload support plane of the vehicle that supports the payload held in the payload area with vehicle traverse, the payload area further includes an underpick end effector configured to engage and underpick the payload with respect to a support plane of a storage space and effect payload transfer to and from the support plane of the storage space payload area unloading and loading the payload area, and payload registration facets mounted to the frame; and
engaging the payload held in the payload area with the payload registration facets;
wherein the registration facets are disposed to provide, upon engagement with the payload, at least two degrees of registration capturing and securing the payload in a predetermined position in the payload area, and are configured to effect payload engagement with the at least two degrees of registration registering the payload substantially coincident with seating of the payload, on the payload support plane of the payload area, effected with a common seating motion between the underpick end effector and payload support plane for each pick of the end effector from each different support plane height of the storage space.

In accordance with one or more aspects of the disclosed embodiment the common seating motion is a minimum motion closing a (common) clearance air gap between the payload support plane and the underpick end effector at a payload pick height of the underpick end effector for each different support plane height of the storage space.

In accordance with one or more aspects of the disclosed embodiment the underpick end effector extends and retracts loading the payload at each predetermined pick height of the underpick end effector, and each pick height is selectable from different predetermined pick heights, and the payload support plane is disposed so that seating of the payload is substantially constant and independent of the pick height of the underpick end effector loading the payload.

In accordance with one or more aspects of the disclosed embodiment the underpick end effector extends and retracts loading the payload at each predetermined pick height of the underpick end effector, and each pick height is selectable from different predetermined pick heights, and the registration facets register the payload loaded (and deregister an unloading payload) independent or decoupled from the pick height of the underpick end effector loading (or unloading) the payload.

In accordance with one or more aspects of the disclosed embodiment the underpick end effector extends and retracts loading the payload at each payload storage shelf height in a vertical array of storage shelves at different heights (from a base level of the vertical array of storage shelves), and the registration facets register the payload loaded (and deregister an unloading payload) independent or decoupled from the payload storage shelf height.

In accordance with one or more aspects of the disclosed embodiment the payload support plane is movable relative to the frame in at least one degree of freedom commensurate with motion of the underpick end effector with respect to the frame.

In accordance with one or more aspects of the disclosed embodiment the payload support plane is movable relative to the frame in at least one degree of freedom and movable relative to a pick height of the underpick end effector.

In accordance with one or more aspects of the disclosed embodiment the method further comprises effecting, with the registration facets, payload engagement with the at least two degrees of registration registering the payload substantially coincident with the end effector positioning the payload on the payload contact support surface loading the payload area.

In accordance with one or more aspects of the disclosed embodiment the method further comprises effecting, with the underpick end effector seating the payload on the payload support plane, registration of the payload and the registration facets in at least one degree of registration of the at least two degrees of registration of the payload relative to the frame.

In accordance with one or more aspects of the disclosed embodiment the method further comprises effecting, with the underpick end effector seating the payload on the payload contact support surface, registration of the payload and the registration facets in at least one degree of registration of the at least two degrees of registration of the payload relative to the frame.

In accordance with one or more aspects of the disclosed embodiment the underpick end effector seating of the payload on the payload support plane is substantially immediately proximate to the underpick end effector positioning the payload within the payload area loading the payload area.

In accordance with one or more aspects of the disclosed embodiment effecting at least two degrees of registration of the payload substantially coincident with loading the payload area with the payload enables initiation of vehicle travel substantially coincident with loading the payload on the vehicle for each payload loaded on the vehicle.

In accordance with one or more aspects of the disclosed embodiment the underpick end effector engages an underside of the payload and pick up the payload therefrom effecting transfer of the payload by the autonomous transport vehicle.

In accordance with one or more aspects of the disclosed embodiment an autonomous transport vehicle for transport a payload is provided. The autonomous transport vehicle comprises:
a frame forming a transport payload area of the vehicle, the payload area includes a payload contact support surface that defines a payload support plane that supports the payload held in the payload area with vehicle traverse;
at least one lift tower connected to the frame;
a movable payload carriage that is movably mounted to the at least one lift tower and configured to raise and lower the payload within the payload area; and
a drive section with at least one degree of freedom movement coupled to the movable payload carriage by a flexible transmission, where flexible transmission movably couples the movable payload carriage to the at least one lift tower and the drive section is configured to raise and lower the movable payload carriage relative to the at least one lift tower;
wherein the flexible transmission is configured to effect torsional stability of the movable payload carriage, and the payload held thereon, with respect to the frame and independent of each other interface between the movable payload carriage and the at least one lift tower than the flexible transmission coupling the movable payload carriage to the at least one lift tower.

In accordance with one or more aspects of the disclosed embodiment the flexible transmission is configured to effect torsional stability of the movable payload carriage throughout an entire range of motion of the movable payload carriage relative to the at least one lift tower.

In accordance with one or more aspects of the disclosed embodiment the flexible transmission is configured to effect torsional stability of the movable payload carriage throughout a range of motion of the movable payload carriage, relative to the at least one lift tower, that effects a payload transfer from the movable payload carriage to a payload support shelf.

In accordance with one or more aspects of the disclosed embodiment the flexible transmission is configured to effect torsional stability of the movable payload carriage throughout a range of motion of the movable payload carriage, relative to the at least one lift tower, that effects a payload transfer from a payload support shelf to the movable payload carriage.

In accordance with one or more aspects of the disclosed embodiment the at least one lift tower comprises a guide rail that guides movement of the movable payload carriage and an interface between the guide rail and the movable payload carriage is undeterministic with respect to a torsional position of the movable payload carriage relative to the guide rail.

In accordance with one or more aspects of the disclosed embodiment the autonomous transport vehicle further comprises an end effector movably coupled to and carried by the movable payload carriage, the end effector being configured to extend and retract relative to the torsionally stable movable payload carriage.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. An autonomous transport vehicle for transporting a payload comprising:
a frame forming a transport payload area of the vehicle, the payload area includes a payload contact support surface that defines a payload support plane that supports the payload held in the payload area with vehicle traverse;
the payload area further includes an articulated underpick end effector configured to engage and underpick the payload with respect to the payload support plane, and extend and retract with respect to the payload area effecting payload transfer to and from the payload area unloading and loading the payload area; and
payload registration facets mounted to the frame so as to engage the payload held in the payload area;
wherein the registration facets are disposed to provide, upon engagement with the payload, at least two degrees of registration capturing and securing the payload in a predetermined position in the payload area where the at least two degrees of registration are effected substantially coincident so that registration in each of the at least two degrees of registration is substantially coincident with registration in each other of the at least two degrees of registration, and the registration facets are configured to effect payload engagement with the effected at least two degrees of registration registering the payload substantially coincident with seating of the payload on the payload support plane of the payload area.

2. The autonomous transport vehicle of claim 1, wherein the articulated underpick end effector extends and retracts loading the payload at each predetermined pick height of the articulated underpick end effector, and each pick height is selectable from different predetermined pick heights, and the payload support plane is disposed so that seating of the payload is substantially constant and independent of the pick height of the articulated underpick end effector loading the payload.

3. The autonomous transport vehicle of claim 1, wherein the articulated underpick end effector extends and retracts loading the payload at each predetermined pick height of the articulated underpick end effector, and each pick height is selectable from different predetermined pick heights, and the registration facets register the payload loaded independent or decoupled from the pick height of the articulated underpick end effector loading the payload.

4. The autonomous transport vehicle of claim 1, wherein the articulated underpick end effector extends and retracts loading the payload at each payload storage shelf height in a vertical array of storage shelves at different heights, and the registration facets register the payload loaded independent or decoupled from the payload storage shelf height.

5. The autonomous transport vehicle of claim 1, wherein the payload support plane is movable relative to the frame in at least one degree of freedom commensurate with motion of the articulated underpick end effector with respect to the frame.

6. The autonomous transport vehicle of claim 1, wherein the payload support plane is movable relative to the frame in at least one degree of freedom and movable relative to a pick height, in a direction of the pick height, of the articulated underpick end effector.

7. The autonomous transport vehicle of claim 1, wherein the registration facets are configured to effect payload engagement with the at least two degrees of registration registering the payload substantially coincident with the end effector positioning the payload on the payload contact support surface loading the payload area.

8. The autonomous transport vehicle of claim 1, wherein the articulated underpick end effector seating the payload on the payload support plane effects registration of the payload and the registration facets in at least one degree of registration of the at least two degrees of registration of the payload relative to the frame.

9. The autonomous transport vehicle of claim 1, wherein the articulated underpick end effector seating the payload on the payload contact support surface effects registration of the payload and the registration facets in at least one degree of registration of the at least two degrees of registration of the payload relative to the frame.

10. The autonomous transport vehicle of claim 1, wherein the articulated underpick end effector seating of the payload on the payload support plane is substantially immediately proximate to the articulated underpick end effector positioning the payload within the payload area loading the payload area.

11. The autonomous transport vehicle of claim 1, wherein effecting at least two degrees of registration of the payload substantially coincident with loading the payload area with the payload enables initiation of vehicle travel substantially coincident with seating of the payload on the payload support plane of the vehicle for each payload loaded on the vehicle.

12. The autonomous transport vehicle of claim 1, wherein the articulated underpick end effector is configured to engage an underside of the payload and pick up the payload therefrom effecting transfer of the payload by the autonomous transport vehicle.

13. An autonomous transport vehicle for transporting a payload comprising:
a frame forming a transport payload area of the vehicle, the payload area includes a payload contact support surface that defines a payload support plane of the vehicle that supports the payload held in the payload area with vehicle traverse;
the payload area further includes an underpick end effector configured to engage and underpick the payload with respect to a support plane of a storage space and effect payload transfer to and from the support plane of the storage space unloading and loading the payload area; and
payload registration facets mounted to the frame so as to engage the payload held in the payload area;
wherein the registration facets are disposed to provide, upon engagement with the payload, at least two degrees of registration capturing and securing the payload in a predetermined position in the payload area where the at least two degrees of registration are effected substantially coincident so that registration in each of the at least two degrees of registration is substantially coincident with registration in each other of the at least two degrees of registration, and the registration facets are configured to effect payload engagement with the effected at least two degrees of registration registering the payload substantially coincident with seating of the payload, on the payload support plane of the payload area, effected with a common seating motion of and between the underpick end effector and payload support plane for each pick of the end effector from each different support plane height of the storage space.

14. The autonomous transport vehicle of claim 13, wherein the common seating motion is a minimum motion closing a clearance air gap between the payload support plane and the underpick end effector at a payload pick height of the underpick end effector for each different support plane height of the storage space.

15. The autonomous transport vehicle of claim 13, wherein the underpick end effector extends and retracts loading the payload at each predetermined pick height of the underpick end effector, and each pick height is selectable from different predetermined pick heights, and the payload support plane is disposed so that seating of the payload is substantially constant and independent of the pick height of the underpick end effector loading the payload.

16. The autonomous transport vehicle of claim 13, wherein the underpick end effector extends and retracts loading the payload at each predetermined pick height of the underpick end effector, and each pick height is selectable from different predetermined pick heights, and the registration facets register the payload loaded independent or decoupled from the pick height of the underpick end effector loading the payload.

17. The autonomous transport vehicle of claim 13, wherein the underpick end effector extends and retracts loading the payload at each payload storage shelf height in a vertical array of storage shelves at different heights, and the registration facets register the payload loaded independent or decoupled from the payload storage shelf height.

18. The autonomous transport vehicle of claim 13, wherein the payload support plane is movable relative to the frame in at least one degree of freedom commensurate with motion of the underpick end effector with respect to the frame.

19. The autonomous transport vehicle of claim 13, wherein the payload support plane is movable relative to the frame in at least one degree of freedom and movable relative to a pick height, in a direction of the pick height, of the underpick end effector.

20. The autonomous transport vehicle of claim 13, wherein the registration facets are configured to effect payload engagement with the at least two degrees of registration registering the payload substantially coincident with the end effector positioning the payload on the payload contact support surface loading the payload area.

* * * * *